(12) United States Patent
Ogawa et al.

(10) Patent No.: US 7,564,588 B2
(45) Date of Patent: Jul. 21, 2009

(54) IMAGE FORMING DEVICE, IMAGE FORMING METHOD, AND RECORDING MEDIUM THAT PROVIDE MULTI-LEVEL ERROR DIFFUSION

(75) Inventors: Takeshi Ogawa, Kanagawa (JP); Hiroshi Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1265 days.

(21) Appl. No.: 10/347,447

(22) Filed: Jan. 21, 2003

(65) Prior Publication Data

US 2003/0151773 A1 Aug. 14, 2003

(30) Foreign Application Priority Data

Jan. 24, 2002 (JP) ............................. 2002-015862
Jan. 24, 2002 (JP) ............................. 2002-015863
Mar. 15, 2002 (JP) ............................. 2002-073014

(51) Int. Cl.
  G06K 15/00 (2006.01)
(52) U.S. Cl. .............. 358/3.03; 358/3.04; 358/3.05; 358/3.06; 358/3.21; 358/3.22; 358/3.23; 382/252; 345/616
(58) Field of Classification Search .............. 358/3.03, 358/3.04, 3.05, 3.06, 3.21, 3.22, 3.23; 382/252; 345/616
See application file for complete search history.

(56) References Cited

U.S. PATENT DOCUMENTS

| | | | |
|---|---|---|---|
| 5,226,096 A * | 7/1993 | Fan | 382/237 |
| 5,374,997 A * | 12/1994 | Eschbach | 358/466 |
| 5,414,481 A | 5/1995 | Fujioka et al. | |
| 5,471,277 A | 11/1995 | Fujioka et al. | |
| 5,548,358 A | 8/1996 | Takahashi | |
| 5,583,607 A | 12/1996 | Fujioka et al. | |
| 5,583,662 A | 12/1996 | Takahashi et al. | |
| 5,587,811 A | 12/1996 | Liguori | |
| 5,689,348 A | 11/1997 | Takahashi et al. | |
| 5,798,841 A | 8/1998 | Takahashi | |
| 5,847,845 A | 12/1998 | Takahashi et al. | |
| 5,936,684 A * | 8/1999 | Murayama | 348/673 |
| 6,055,036 A | 4/2000 | Takahashi | |
| 6,173,081 B1 * | 1/2001 | Nishikawa | 382/252 |
| 6,271,936 B1 | 8/2001 | Yu et al. | |

(Continued)

FOREIGN PATENT DOCUMENTS

EP 0 631 427 12/1994

(Continued)

OTHER PUBLICATIONS

U.S. Appl. No. 10/095,473, filed Mar. 13, 2002, Unknown.

(Continued)

*Primary Examiner*—Twyler L Haskins
*Assistant Examiner*—Jacky X Zheng
(74) *Attorney, Agent, or Firm*—Oblon, Spivak, McClelland, Maier & Neustadt, P.C.

(57) ABSTRACT

An image forming device includes a quantization unit which quantizes each pixel of an M-level gradation input image into one of N levels (M>N≧2) through an error diffusion process. An operation unit performs a predetermined operation according to a position of a target pixel to a gradation value of the target pixel before quantization when the gradation value of the target pixel is equal to a specific concentration.

7 Claims, 42 Drawing Sheets

U.S. PATENT DOCUMENTS

| | | | |
|---|---|---|---|
| 6,281,990 B1 | 8/2001 | Takahashi | |
| 6,323,963 B1 | 11/2001 | Takahashi | |
| 6,330,050 B1 | 12/2001 | Takahashi et al. | |
| 6,424,429 B1 | 7/2002 | Takahashi et al. | |
| 6,501,566 B1 * | 12/2002 | Ishiguro et al. | 358/3.05 |
| 6,529,918 B2 | 3/2003 | Takahashi | |
| 6,678,073 B1 * | 1/2004 | Jewitt | 358/3.04 |
| 6,750,983 B1 * | 6/2004 | Miyake | 358/3.03 |
| 6,917,446 B2 * | 7/2005 | Tanaka et al. | 358/1.9 |
| 7,079,289 B2 * | 7/2006 | Loce et al. | 358/3.03 |
| 2002/0039199 A1 * | 4/2002 | Nose et al. | 358/3.03 |

FOREIGN PATENT DOCUMENTS

| | | |
|---|---|---|
| EP | 0 820 187 | 1/1998 |
| EP | 0 903 932 | 3/1999 |
| EP | 1 133 162 | 9/2001 |
| JP | 9-98290 | 4/1997 |
| JP | 9-284552 | 10/1997 |
| JP | 11-88665 | 3/1999 |
| JP | 2000-270210 | 9/2000 |
| JP | 2001-144961 | 5/2001 |
| JP | 2001-339607 | 12/2001 |

OTHER PUBLICATIONS

U.S. Appl. No. 09/722,270, filed Nov. 28, 2000, Unknown.
U.S. Appl. No. 09/177,378, filed Oct. 23, 1998, Suzuki et al.
U.S. Appl. No. 09/415,061, filed Oct. 12, 1999, Takahashi et al.
U.S. Appl. No. 09/695,992, filed Oct. 26, 2000, Takahashi et al.
U.S. Appl. No. 09/956,911, filed Sep. 21, 2001, Takahashi.
U.S. Appl. No. 10/006,377, filed Dec. 10, 2001, Tonami et al.
U.S. Appl. No. 10/347,447, filed Jan. 21, 2003, Ogawa et al.

* cited by examiner

ERROR DIFFUSION MATRIX

VACANCY:$O_1$   :$O_2$   ■:$O_3$

VACANCY:$O_1$   ▪:$O_2$   ■:$O_3$

16 × 16

|    | GRADATION VALUE 85 | GRADATION VALUE 170 |
|----|--------------------|---------------------|
| 1  | MIDDLE DOT         | LARGE DOT           |
| 0  | SMALL DOT          | MIDDLE DOT          |
| -1 | BLANK DOT          | SMALL DOT           |

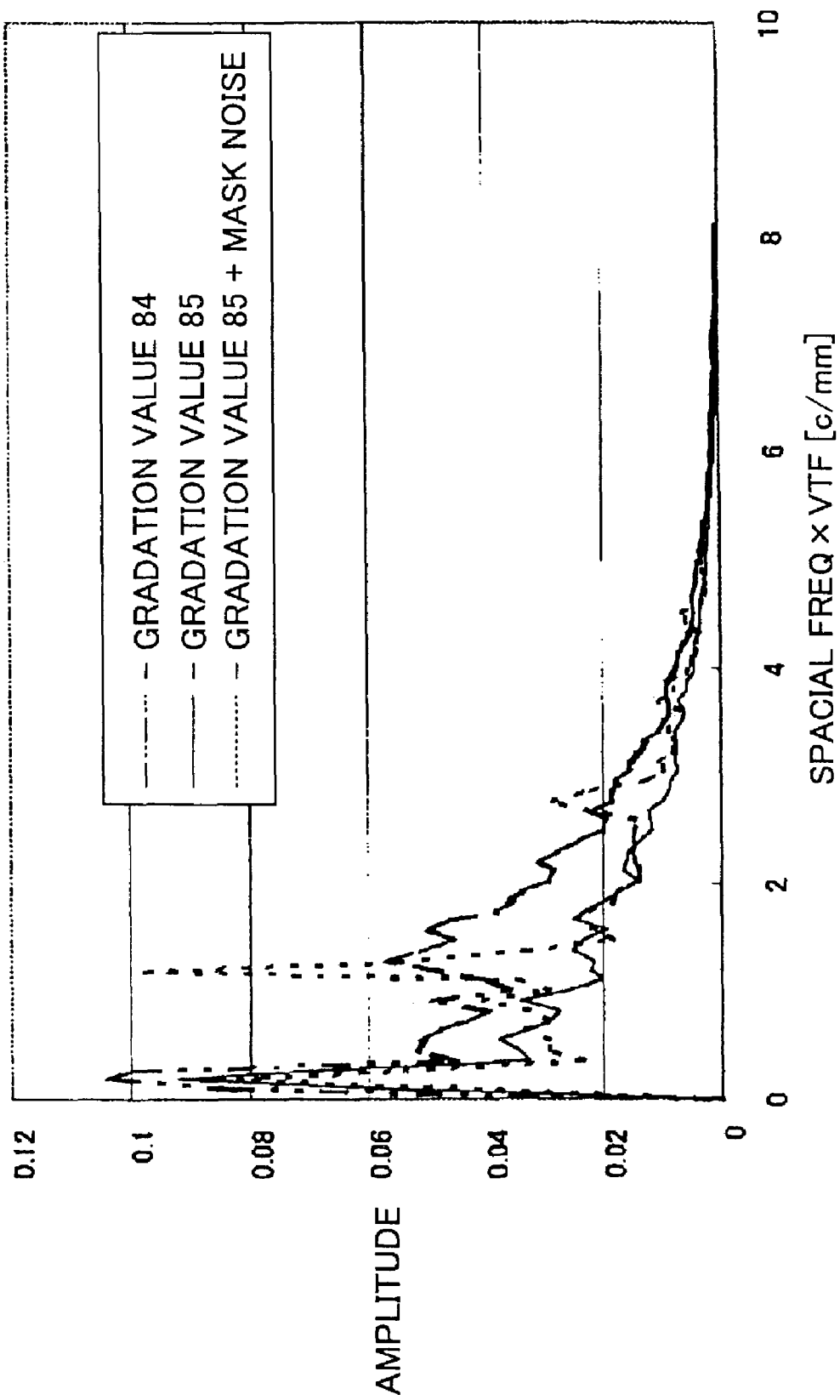

FIG.18

$$\begin{pmatrix} 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0\text{-}O_2 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0\text{-}O_2 & 0 & 0 & 0 & 0 & 0 & 0 & 0\text{-}O_2 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \end{pmatrix}$$

FIG.19

$$\begin{pmatrix} 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & O_2 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & O_2 & 0 & 0 & 0 & 0 & 0 & 0 & O_2 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \end{pmatrix}$$

FIG.20

$$\begin{pmatrix} 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & O_2 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0-O_2 & 0 & 0 & 0 & 0 & 0 & 0 & 0 & O_2 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \end{pmatrix}$$

FIG.21

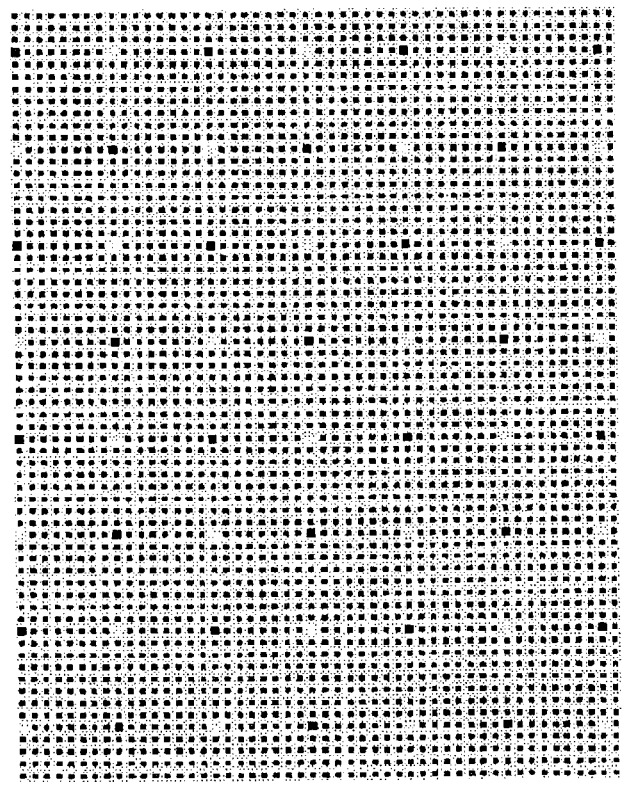

VACANCY:$O_1$      -:$O_2$      ■:$O_3$

VACANCY: $O_1$   $\cdot : O_2$   $\blacksquare : O_3$

16 × 16

VACANCY: o₁    -: O₂    ■: O₃

VACANCY:○, •:○₂, ■:○₃

VACANCY: $o: O_1$   $\cdot : O_2$   $\blacksquare : O_3$

VACANCY: O₁     •:O₂     ■:O₃

VACANCY: O₁     •:O₂     ■:O₃

$$L_8(x, y) = \begin{bmatrix} -1 & -1 & -1 \\ -1 & 8 & -1 \\ -1 & -1 & -1 \end{bmatrix}$$

VACANCY: $O_1$   $\cdot : O_2$   $\blacksquare : O_3$ $$L_4(x, y) = \begin{bmatrix} -1 & -1 & -1 \\ -1 & 4 & \end{bmatrix}$$

VACANCY:$O_1$     •:$O_2$     ■:$O_3$

FIG.59

$$\begin{pmatrix} 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 85 & 0 & 0 & 0 & 0 & 0 & 0 & 0 & -85 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & -85 & 0 & 0 & 0 & 0 & 0 & 0 & 0 & 85 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \end{pmatrix}$$

FIG.60

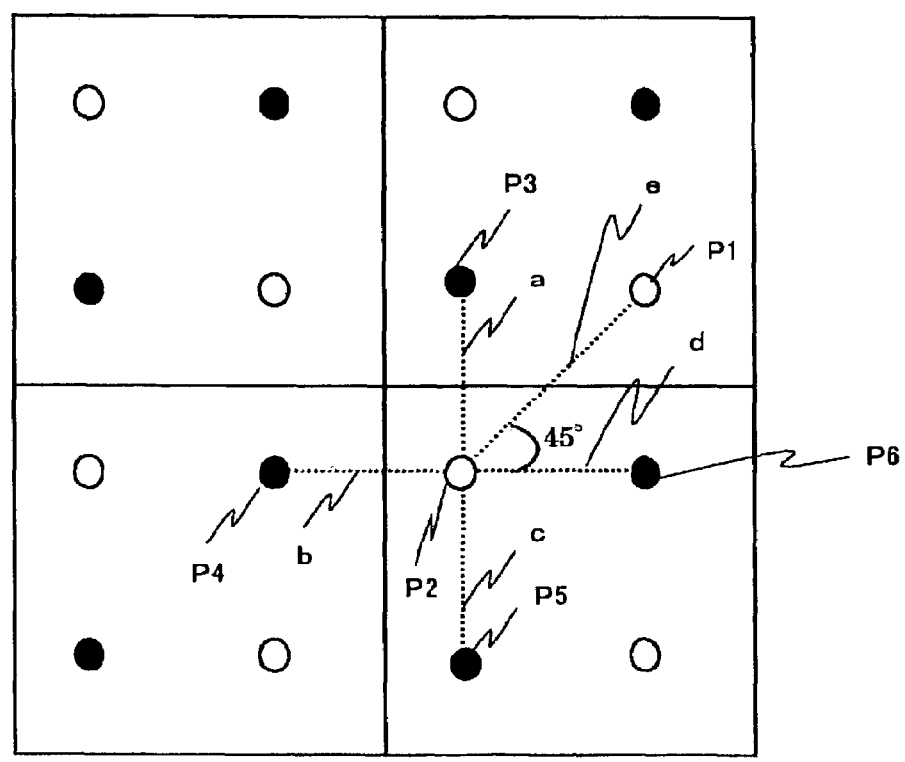

$$\begin{pmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 85 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & -85 & 0 \\ 0 & 0 & 0 & 0 & 0 & 0 & 0 & 0 \end{pmatrix}$$

VACANCY: BLANK DOT   ·: SMALL DOT    •: MIDDLE DOT

IMAGE FORMING DEVICE, IMAGE FORMING METHOD, AND RECORDING MEDIUM THAT PROVIDE MULTI-LEVEL ERROR DIFFUSION

BACKGROUND OF THE INVENTION

1. Field of the Invention

The present invention relates to an image forming device and method which converts each pixel of an M-level gradation image into one of N levels (M>N) through an N-level error diffusion process, and the image forming device is appropriate for use in printers, digital copiers and facsimiles.

2. Description of the Related Art

In recent years, the improvements of high-quality printers and high-speed PCs are remarkable. The output resolution of a certain model in the recent printers has become the high resolution of 1200 ×1200 dpi and the size of dots which are outputted in 1200 dpi resolution can be changed to one of three different sizes: small, middle and large.

With the high-resolution of ink jet printers, high-density ink-jet heads for discharging the ink are provided, and the precision of paper conveyance is raised. The use of high-viscosity ink prevents the spreading of the ink discharged onto the paper, and the amount of the ink discharged is controlled to vary the size of dots in order to print one of the small, middle and large dots.

In the electro-photographic process, the high-resolution printing is achieved by increasing the diameter of the laser beam exposed to the photoconductor medium and decreasing the diameter of toner particles developed on the paper.

Furthermore, the high-resolution printing is achieved by using the optical intensity modulation technique or the pulse-width modulation technique.

In the ink jet printer, an N-level intensity image is reproduced using inks with different concentrations (or intensities).

Concentration (or intensity) is divided into light ink and dark ink (the concentration of light ink is usually diluted to ⅓-⅙ of dark ink), light ink is used in the highlight portion, and dark ink is used in the middle or high-concentration portion when the image is reproduced.

The multi-level gradation representation in the shade ink of the ink-jet printing process and the multi-level gradation representation by the dot diameter modulation in the electro-photographic process are useful techniques especially for output devices which quantize each pixel of an M-level gradation image into one of N levels (2<N<M) so that a reconstructed image is formed.

When producing a reconstructed image, it is important to raise the graininess of the image. The graininess in the highlight portion is increased by using the arrangement of high-density dots needed for printing, the dot diameter modulation, and the dark and light inks.

Generally, in order to improve the graininess, a measure for making the distribution of small dots that are had to notice by the human eyes uniform has been taken.

As for the printer with no capability of performing the dot diameter modulation, the technique of the area gradation is selected which carries out the gradation representation by the area that is occupied by the number of output dots. In such a printer, the representation of the middle-concentration portion is achieved with the output dots having a uniform distribution, and the periphery of each dot is not easily visible and the graininess is good. This is the case for the printer having a high resolution.

However, in the case of the printer having a low resolution, the large dots are outputted in the highlight portion, the intervals of such dots become large, the isolated dots are conspicuous, and the graininess becomes poor. In the case of the printer having a high resolution, the dot diameter becomes small, a large number of output dots are outputted, and the graininess is improved.

In the dot diameter modulation technique, a large number of small dots are outputted to express the concentration, and the graininess is improved. If light ink is used in order to make the small dot appear mostly and to express the concentration, the graininess is further improved.

Generally, in the case where the image data of M-level gradation is outputted to the printer in which the outputting of N (M>N) levels is possible, the quantization processing which reduces the number of the gradation levels of each pixel is performed. The error diffusion process and the average error minimum method are used as the technique of such quantization processing, and they are excellent in gradation nature and image sharpness.

The error diffusion process is a pseudo halftoning technique which makes the weighting the pixel to which the circumference has not quantized yet the quantization error produced at the time of quantization of a certain pixel, and is allotted to the spread portion.

Moreover, the average error minimum method is a pseudo halftoning technique which corrects the image data value of the target pixel with the weighted mean value of the quantization errors produced in the neighboring pixels with which the quantization is already performed.

By such techniques, the quantization errors are stored for all images, and a reconstructed image becomes excellent in gradation nature. The error diffusion process and the average error minimum method are similar to each other since they differ only in the timing of performing the error diffusion. In the following description, the error diffusion process and the average error minimum method are collectively called the error diffusion process.

FIG. 1 shows the composition of a conventional image forming device which performs an error diffusion process.

In the conventional image forming device of FIG. 1, the input buffer 1, the adder 2, the quantization unit 3, the output buffer 4, the subtractor 5, the error memory 6 and the error diffusion matrix 7 are provided. The input value from the input buffer 1, and the error calculated by using the error diffusion matrix 7 are supplied to the adder 2. The resulting input value from the adder 2 is supplied to the quantization unit 3. The input value of the adder 2 supplied to the quantization unit 3, and the quantization threshold of the quantization unit 3 are compared, and the output value is determined. The output value from the quantization unit 3 is supplied to the output buffer 4. The difference between the input value supplied to the quantization unit 3 and the output value supplied to the output buffer 4 is computed by the subtractor 5, and the calculated difference is stored into the error memory 6 as an error of the target pixel.

In the processing of the following pixel, in the error diffusion matrix 7, the error of the target pixel is calculated based on the errors of the 4 neighboring pixels near the target pixel. The error of the target pixel calculated with the error diffusion matrix 7 is supplied to the adder 2, and the sum of the input value and the error is produced by the adder 2.

By repeating the above processing for every pixel, the error diffusion process is carried out so that the concentration of the image is stored.

FIG. 2 shows the ratio of output dots in the 4-level error diffusion process as an example of the multi-level error diffusion process.

Suppose that the 4-level quantization output value is set to 0 (blank dot), 85 (small dot), 170 (middle dot), and 255 (large dot), respectively. The ratio of small dots is increased when the input data level increases from 0 to 85, and the ratio of small dots becomes 100% when the input data level is 85. When the input data level is in the range of 85-170, the ratio of small dots is decreased while the ratio of middle dots is increased. The ratio of middle dots becomes 100% when the input data level is 170. When the input data level is in the range of 170-255, the ratio of middle dots is decreased while the ratio of large dots is increased. The ratio of large dots becomes 100% when the input data level is 255.

The multi-level error diffusion process is excellent in gradation nature, but the quantization output value changes greatly in response to the change of the input data level, which causes a visual level difference to be produced in such changing portions.

Here, the four-level error diffusion process, which converts 256-level gradation input data (each pixel is expressed by 8 bits) into 4-level output data (M=256 and N=4), will be described as a typical example of the multi-level error diffusion process.

The 4-level quantization output value after error diffusion is set to one of O1 (blank dot or vacancy), O2 (small dot), O3 (middle dot) and O4 (large dot). The gradation of each of the four quantization output values is set to 0, 85, 170 and 255, and the threshold is set to the middle of each output value; 43, 128 and 213, respectively. In the following, a case in which O1 (blank dot) is a white dot and O4 (255) is a black dot will be considered. However, the opposite case in which O1 is a black dot and O4 is a white dot may be considered instead.

In a case where a simple 4-level error diffusion process is performed for a 128-level gradation image, when the gradation of the input value is less than 85, the gradation is expressed by O1 (blank dot) and O2 (small dot). When the gradation of the input value is equal to 85, it is expressed by filling O2 (small dot). When the gradation of the input value is larger than 86, the gradation is expressed by O2 (small dot) and O3 (middle dot).

FIG. 3 shows the result of a simple 4-level error diffusion process which is performed for each pixel of a 128-level gradation image. In the case of FIG. 3, the gradation value of the input image changes from 0 to 128. As shown in the FIG. 3, depending on the ratio and the processing direction of changing the gradation, the generation of the output dots O3 (middle dot) is delayed in the gradation value 86, and the portion with the output dots O2 (small dot) will be spread.

Similarly, in a case of another 128-level gradation image in which the gradation value of the image changes from 128 to 0, the same phenomenon takes place when the error diffusion process is performed. The generation of the output dots O1 (blank dot) is delayed in the gradation value 84, and the portion filled with the output dots O2 (small dot) will be spread.

The gradation representation is expressed by filling the output dots O1 (blank dot), O2 (small dot), O3 (middle dot) and O4 (large dot), respectively, when the gradation values of the input are 0, 85, 170 and 255 in the above example (or when the quantization output value and the input value of the N-level error diffusion are the same). It is not mixed with other output values in the portion, and the frequency characteristic of the image becomes uniform and the graininess is good.

On the other hand, in other portions, the gradation representation is expressed by a combination of the N-level quantization output values and the two output values coexist in these portions, and the frequency characteristic of the image will be confused. That is, in the gradation image in which the input gradation value changes from 0 to 128, only the portion with the gradation value 85 will have good graininess and other portions with different gradation values will have poor graininess, and therefore the sense of incongruity arises.

When the gradation value of the input image changes from 0 to 128, the graininess in the vicinity of the portion with the gradation value 85 will be changed in a pattern of the disordered image, the uniform image and the disordered image. The uniform image interposed between the disordered images becomes visible.

Thus, the gradation level difference or the pseudo outline arises in the changing portion (for example, the gradation value 85, the gradation value 170) where the quantization output value changes.

On the other hand, the graininess in the vicinity of the portion with the gradation value 0 will be changed in a pattern of the uniform image and the disordered image, and it becomes invisible.

In the portions near the white background portion (the gradation value 0) or the solidly shaded portion (the gradation value 255), the sense of incongruity will not arise due to the human visual prejudice.

In the neighboring portion (the gradation value 1) of the portion with the gradation value 0, the delay of the dot generation for the gradation value 1 in the error diffusion process, which cause the area of the white background to increase, will be the problem, and the sense of incongruity of the graininess will not be the problem.

As mentioned above, the portions with the gradation values 85 and 86 of FIG. 3 are filled with the output dots O2 (small dot). The portion with the gradation value 86 is originally reproduced with a combination of many output dots O2 (small dot) and some output dots O3 (middle dot). However, in the image of FIG. 3, the output dots O3 (middle dot) are not outputted.

Thus, the delay of the dot generation in the changing portions of the 4-level quantization output causes the gradation-level difference (pseudo outline) to arise in the changing portion (the gradation value 85), and the quality of image will deteriorate. The same problem exists in the changing portion (the gradation value 170).

As a conventional technology directed to overcoming the delay of the dot generation, Japanese Laid-Open Patent Application No. 7-111591 discloses an image processing device. In this image processing device, the threshold is varied according to concentration, in order to eliminate the delay of output dot generation in the highlight portion and the delay of blank dot generation in the solidly shaded portion for the 2-level error diffusion process.

Moreover, Japanese Laid-Open Patent Application No. 10-257302 discloses an image processing device which is directed to overcoming the delay of the dot generation for the multiple-level error diffusion process and raising the sharpness.

The conventional techniques of the above-mentioned documents have solved the problem of image distortion by the delay of the dot generation. However, in the conventional techniques no consideration is given to eliminate the problem of the deterioration of picture quality due to the delay of the dot generation in the changing portions where the N-level quantization output value by the multi-level error diffusion process changes.

A conceivable method to eliminate the above problem is that a certain noise is added to the changing portion where the quantization output value changes, and the middle dots and the blank dots are made to appear there so that the level difference (pseudo outline) will not be conspicuous. FIG. 4 shows the result of adding a random number with the amplitude ±32 to the gradation value 85 when the error diffusion process is performed.

However, according to such method, the middle dots appear in the gradation value 85 more frequently than in the gradation values 86 and 87, and the gradation will be reversed.

Moreover, since the random number is added, the occurrence positions of the blank dots and the middle dots are in disorder, and the graininess may be poor. The use of the random number is not suitable for high-speed processing.

SUMMARY OF THE INVENTION

An object of the present invention is to provide an improved image forming device and method in which the above-described problems are eliminated.

Another object of the present invention is to provide an image forming device and method which carries out an improved multi-level error diffusion process that effectively prevents the occurrence of the gradation level difference or the pseudo outline in the changing portion where the quantization output value changes.

Another object of the present invention is to provide an image forming device and method which carries out an improved multi-level error diffusion process that effectively cancels the delay of the dot generation near the solidly shaded portion and near the highlight portion, and improves the quality of the reproduced image.

Another object of the present invention is to provide an image forming device and method which carries out an improved multi-level error diffusion process that effectively prevents the degradation of the sharpness when the threshold is changed according to the gradation of the input image, and allows the reproduction of a sharp image.

The above-mentioned objects of the present invention are achieved by an image forming device comprising a quantization unit quantizing each pixel of an M-level gradation input image into one of N levels (M>N≧2) through an error diffusion process; and an operation unit performing a predetermined operation according to a position of a target pixel to a gradation value of the target pixel when the gradation value of the target pixel is equal to a specific concentration.

The above-mentioned objects of the present invention are achieved by an image forming device comprising a quantization unit quantizing each pixel of an M-level gradation input image into one of N levels (M>N) through an error diffusion process by using (N−1) threshold values; and a control unit dividing the M-level gradation into (N−1) portions and changing a corresponding one of the threshold values for each portion according to an input gradation value of a target pixel.

The above-mentioned objects of the present invention are achieved by an image forming device comprising a quantization unit quantizing each pixel of an M-level gradation input image into one of N levels (M>N) through an error diffusion process by using (N-1) threshold values; and an operation unit performing addition or subtraction of a predetermined data according to a position of a target pixel to one of a gradation value of the target pixel or a corresponding one of the threshold values when the gradation value of the target pixel is equal to a specific concentration, wherein the operation unit comprises a memory that stores a mask in a matrix formation, the memory being accessed when the predetermined data is added or subtracted, and pixel positions where the predetermined data is added or subtracted are determined based on the position of the target pixel, and the number of pixel positions where the predetermined data is added is the same as the number of pixel positions where the predetermined data is subtracted.

According to the present invention, the following effects are acquired. The mask noise which becomes a frequency lower than the spatial frequency of the image of the neighboring gradation is superimposed to the changing portion where the quantization output value changes, which makes it possible to prevent the occurrence of a pseudo outline which may be produced in the changing portion. The effect of making the pseudo outline conspicuous can be reduced.

The low frequency noise is superimposed near the solidly shaded portion and near the highlight portion, the output dots near the highlight portion appear suitably, the blank dots near the solidly shaded portion appear suitably, and the delay of the dot generation is canceled.

The number of the gradation levels of the input image is divided into a set of portions at which the gradation level difference arises, the threshold is changed in each divided portion according to the input value, and the quantization output value is changed. The delay of the dot generation near the portion is canceled, and the quality of a reconstructed image is improved.

The edge portion is extracted and the threshold is changed according to the amount of edges, the deterioration of the sharpness of a thin line image is prevented so that a sharp image can be reproduced.

BRIEF DESCRIPTION OF THE DRAWINGS

Other objects, features and advantages of the present invention will be apparent from the following detailed description when read in conjunction with the accompanying drawings.

FIG. 17 is a diagram showing the result of the multiplication of the human vision property factor (VTF) to the spatial frequency of the image shown in FIG. 16.

FIG. 18 is a diagram showing the mask which is added to the image with the gradation value 84 when the 4-level error diffusion process is performed.

FIG. 19 is a diagram showing the mask which is added to the image with the gradation value 86 when the 4-level error diffusion process is performed.

FIG. 20 is a diagram showing the mask which causes one blank dot and two middle dots to appear.

FIG. 21 is a diagram showing the result of the error diffusion process in which the mask noise of FIG. 12 is superimposed on the input value.

FIG. 59 is a diagram showing the mask which specifies the occurrence position and the number of the dots.

FIG. 60 is a diagram showing the arrangement of the four masks as shown in FIG. 59.

DETAILED DESCRIPTION OF PREFERRED EMBODIMENTS

Before explaining the preferred embodiments of the present invention, a description will be given with reference to the accompanying drawings of the outline concerning the ink-jet printing device and the laser printer to which the present invention is applied.

Figure 5:
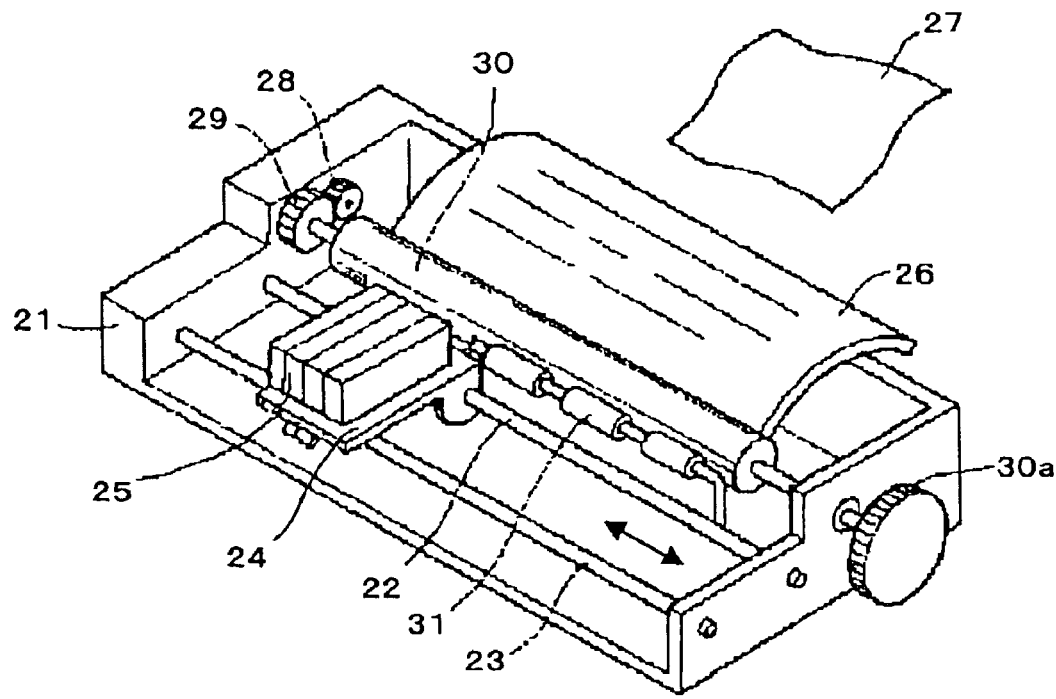
FIG. 5 is a perspective view of a drive mechanism of an ink-jet printing device.

FIG. 5 shows a drive mechanism of an ink-jet printing device.

The ink-jet printing device carries the ink-jet printing head (the printing head) 25 in the carriage 24 fixed possible movement on the guide rails 22 and 23 constructed horizontally across the frame 21.

By the driving sources, such as the motor which is not illustrated, the carriage 24 is moved in the horizontal direction and the scan (horizontal scanning) is made possible.

It takes in to the platen 30 equipped with the delivery knob 30a which rotates through the drive gear 28 and the sprocket gear 29 by the driving source which does not illustrate the sheet 27 set to the guide board 26, and conveys with the pressure roller 31 which carries out the pressure welding to the 30 round side of platens. The printing head 25 carries out the color printing on the sheet 27.

Figure 6:
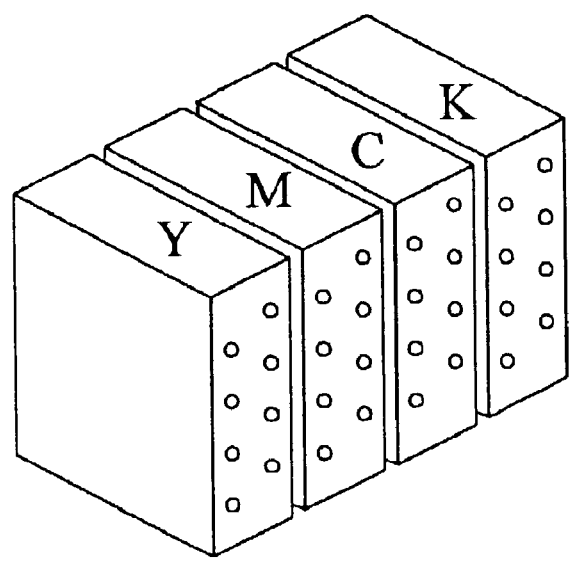
FIG. 6 is a view of a four-color printing head.

For example, FIG. 6 shows a four-color printing head. As shown in FIG. 6, the printing head includes the four ink-jet heads K, Y, M and C for carrying out the discharge of each ink of black (Bk), yellow (Y), magenta (M) and cyan (C), respectively.

Figure 7:
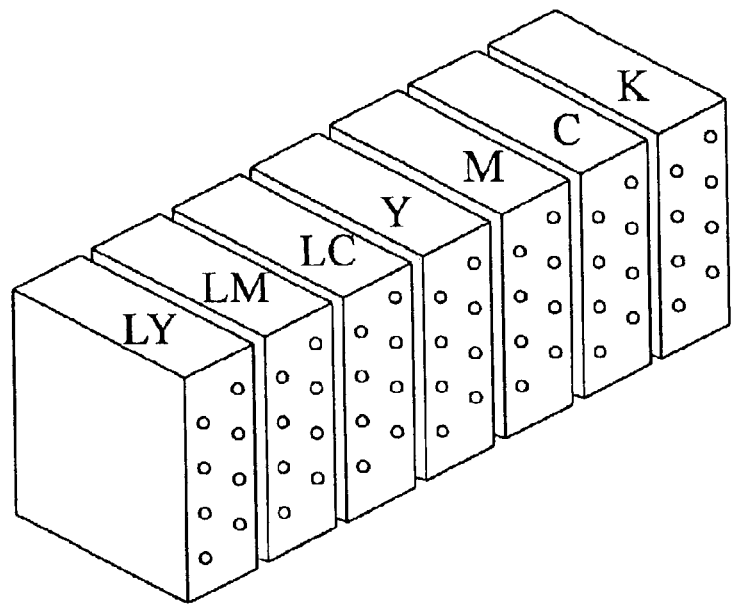
FIG. 7 is a view of a seven-color printing head.

Similarly, FIG. 7 shows a seven-color printing head. As shown in FIG. 7, the printing head includes the seven ink-jet heads K, Y, M, C, LY, LM, and LC for carrying out the discharge of each ink of black (Bk), yellow (Y), magenta (M), cyan (C), light yellow (LY), light magenta (LM) and light cyan (LC), respectively. The ink-jet heads are arranged and constituted on the same line of the direction of horizontal scanning. It is possible to make the number of the ink fluctuate depending on the composition.

Specifically, it is difficult to view the dot of yellow in the highlight portion, and it is possible to exclude light yellow.

Moreover, the printing head may be configured to divide the concentration of each color of the light black, the cyan, the magenta, the yellow and the black into the three steps or the four steps, and high definition printing is possible.

By driving alternatively the actuator which are energy generating means, such as the piezoelectric device and the heater for gassing, and giving pressure to the ink in the liquid chamber, each ink-jet head carries out the discharge flight of the ink drop from the nozzle which is open for free passage to this liquid chamber, and records the image by making it adhere to the sheet 27.

By providing a number of driving signals of the actuators, it becomes possible to control the amount of ink being discharged from one nozzle. The multi-gradation representation on the sheet, such as the large dot, the middle dot and the small dot, is possible.

Figure 8:
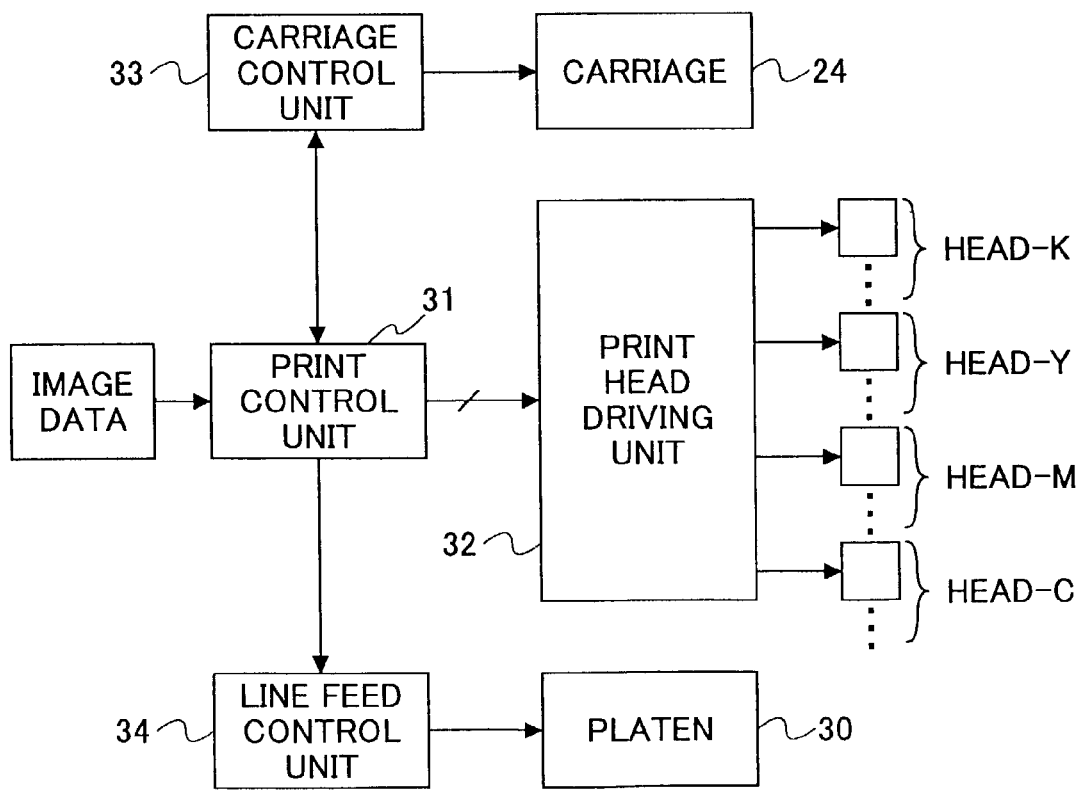
FIG. 8 is a block diagram of a control portion of the ink-jet printing device.

FIG. 8 shows a control portion of the ink-jet printing device.

As shown in FIG. 8, the control unit of the ink-jet printing device includes the line-feed drive control unit 34 which carries out the rotation drive of the printing control unit 31 which served as the printing control means, the head drive unit 32 which drives each actuator of each heads K, Y, M, and C of the printing head 25, the carriage drive control unit 33 which carries out drive control of the carriage 24, and the platen 30.

Although the printing control unit 31 carries out the discharge (injection) of the ink of the predetermined color from each of the heads K, Y, M, and C through the head drive unit 32 based on the received image data is made to printing, the injection control only of the ink of the color defined by the action of the carriage 24 is carried out.

Figure 9:
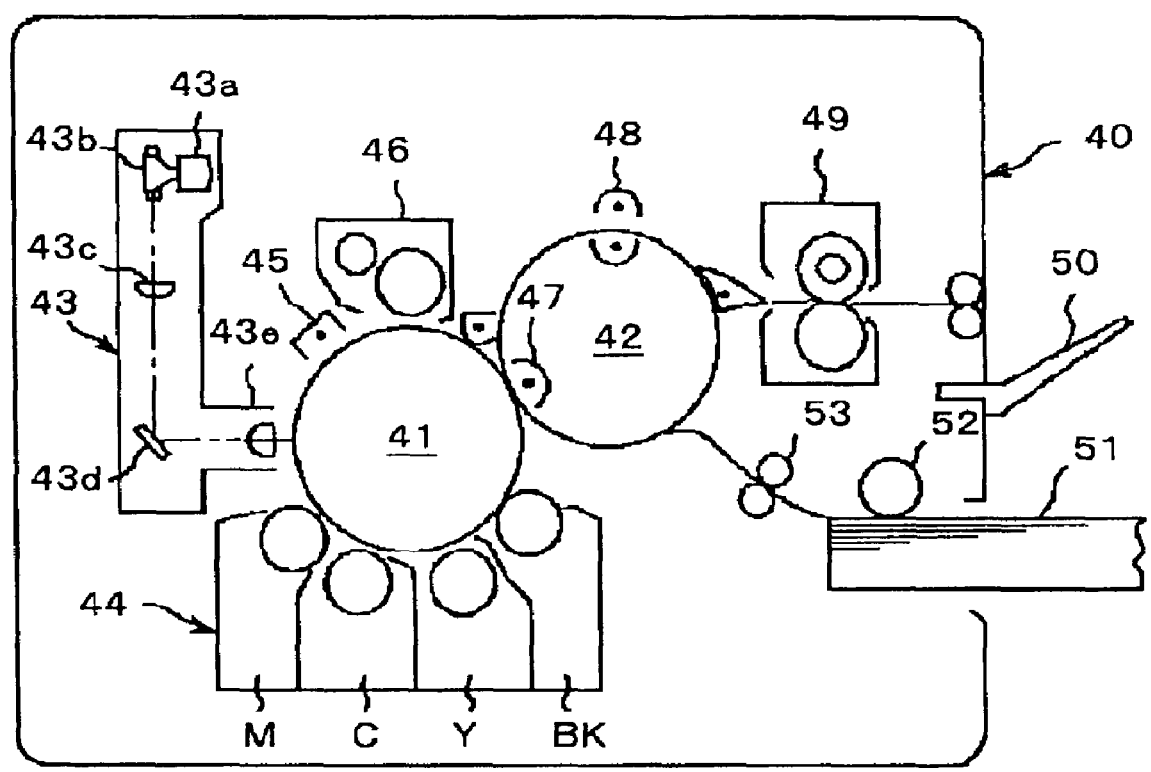
FIG. 9 is a cross-sectional view of a laser printer which includes an image forming unit performing the electro-photographic process.

FIG. 9 shows a laser printer which includes an image forming unit performing the electro-photographic process.

As shown in FIG. 9, the laser printer 40 reproduces the image using the photoconductive drum 41. Around the photoconductive drum 41, the unit 45 which performs a series of electrostatic photograph processes, the electrostatic charger as an electrostatic means, the optical writing unit 43, the development unit 44, the transfer drum 42, and the cleaning unit 46 are arranged.

The optical writing unit 43 is equipped with the semiconductor laser (laser diode LD) which is not illustrated.

The deviation scan is carried out in the direction of horizontal scanning by the rotary polygon-mirror 43b as a deviation scanning means, and the image-formation of the laser beam which is emitted by the LD is carried out to the surface of the photoconductive drum 41 through the lens 43c and the mirror 43d and the lens 43e.

The constant-speed rotation of the rotary polygon-mirror 43b is carried out at high speed by the polygon motor 43a.

The image control unit which is not illustrated controls the driving signal of the LD so that the ON timing of the LD driven by the multi-gradation image signal is synchronized with the laser-beam deviation scan of the rotary polygon-mirror 43b, that is, it controls the laser emission of the LD to scan the photoconductive drum 41 surface in the direction of horizontal scanning by the laser beam from the predetermined starting position where the optical writing is performed.

After the photoconductive drum 41 is charged in high potential uniformly in the corona discharge by the charger 45, the laser beam from the optical writing unit 43 is exposed, and the electrostatic latent image is formed on the surface of the photoconductive drum 41.

The electrostatic latent image on the photoconductive drum 41 is formed into the visible image by the development unit 44. The development unit 44 is equipped with the 4 sets of development devices M, C, Y and Bk which visualize respectively the electrostatic latent image on the photoconductive drum 41 in the image of magenta (M), cyan (C), yellow (Y) and black (Bk). One of the development devices M, C, Y and Bk is energized alternatively, the development operation-is performed, and the electrostatic latent image on the photoconductive drum 41 is visualized into a toner image in each color of M, C, Y and Bk.

On the other hand, the copy sheet contained in the feed cassette 51 is fed out by the feed equipment by the feed roller 52 by taking timing with the resist roller 53. The sheet sent to the surface of the transfer drum 42 is adsorbed by the surface of the transfer drum 42, and it is moved with rotation of the transfer drum 42. The toner image on the photoconductive drum 41 is transferred to the sheet on the transfer drum 42 by the transfer charger 47.

In the case of monochrome copy mode, the monochromatic imaging process is performed, the LD of the optical writing unit 43 is modulated by the image signal of the monochrome, the toner image of the monochrome is formed on the photoconductive drum 41, and after this toner image is transferred to the sheet, the sheet is separated from the transfer drum 42.

The toner image is fixed to the sheet by the fixing assembly 49, and the sheet is delivered to the delivery tray 50.

In the case of the full color mode, the imaging process of each color which forms the image of Bk, M, C, and Y each color one by one on the photoconductive drum 41 is performed one by one, and the image of Bk, M, C, and Y each color formed one by one on the photoconductive drum 41 is imprinted in piles on the sheet.

In this case, the LD of the optical writing unit 43 is modulated by the Bk image signal, and the Bk toner image is formed on the photoconductive drum 41.

Without separating the sheet from the transfer drum 42, after the Bk toner image is transferred to the sheet on the transfer drum 42, the LD of the optical writing unit 43 is modulated by the M image signal, and the M toner image is formed on the photoconductive drum 41. The M toner image is imprinted in piles with the Bk toner image on the sheet by the transfer drum 42.

The LD of the optical writing unit 43 is modulated by the C image signal, and the C toner image is formed on the photoconductive drum 41. After the C toner image is imprinted in piles with the Bk toner image and the M toner image on the sheet by the transfer drum 42, the LD of the optical writing unit 43 is modulated by the Y image signal, and the Y toner image is formed on the photoconductive drum 41. When the Y toner image is imprinted in piles with the Bk toner image, the M toner image and the C toner image on the sheet by the transfer drum 42, the full color image is formed.

After all the transfers of the toner images of Bk, M, C and Y are completed, the sheet on the transfer drum 42 is discharged by the delivery tray 50, after the separation charger 48 dissociates from the transfer drum 42 and being fixed to the toner image by the fixing assembly 49.

As mentioned above, although imaging operation is explained, the color image forming device concerning the present invention is not limited to the composition.

After replacing with the transfer drum 42, forming the toner image of the four colors of Bk, M, C and Y in the photoconductive drum for every color using middle transfer objects, such as the middle transfer belt, laying on top of the middle imprint object one by one and the transferring, the method which transfers the toner image collectively on paper from the middle transfer object may be used. The composition of including only the Bk toner is sufficient for monochrome printing.

Next, the LD multi-level modulation will be described in the following. As a LD multi-level modulation method which performs one-dot multi-level output, there are the pulse-duration-modulation (PWM) method and the optical intensity modulation (PM) method.

Figure 10A:
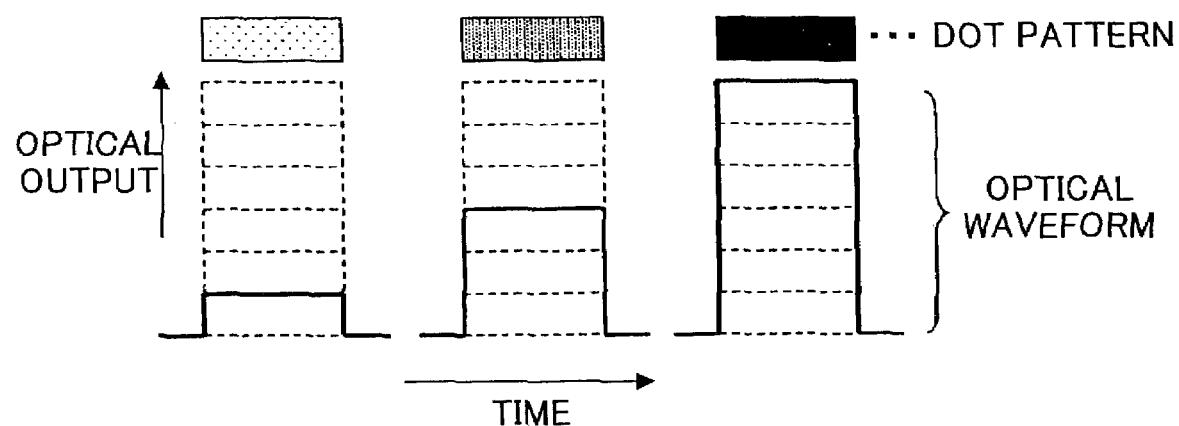
FIG. 10A is a diagram showing the dot pattern and optical waveform of the optical intensity modulation technique.
Figure 10B:
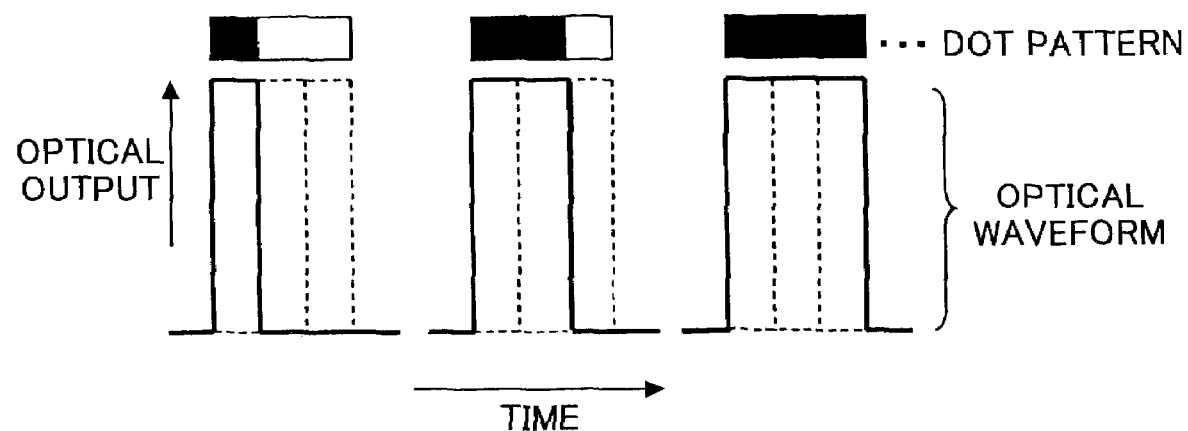
FIG. 10B is a diagram showing the dot pattern and optical waveform of the pulse-width modulation technique.

FIG. 10A and FIG. 10B show the dot pattern and optical waveform of each of the optical intensity modulation technique and the pulse-width modulation technique. In the following, these modulation techniques will be explained.

In order that the optical intensity modulation technique may realize halftone record (halftone image forming) using the middle exposure area, the stabilization of the image forming process is the important requirements, and the demand to the image forming process becomes severe.

The optical intensity modulation technique is the method which the optical-output level itself is changed and performs the optical writing, as shown in FIG. 10A. It is outputted by the pattern as each dot pattern. This method can constitute the control modulation unit of LD that is simple and small.

However, in order to reproduce the halftone image using the middle exposure area, the demand to the stabilization of the image forming process, such as the stabilization of development bias, becomes severe.

Although the pulse-width modulation is binary as optical-output level as shown in FIG. 10B, it is the method which performs the luminescence time, i.e., the pulse-width, and performs the optical writing. It is outputted by the pattern as each dot pattern as shown in FIG. 10B.

This method is binary light writing fundamentally. There are few availabilities of the middle exposure area compared with the optical intensity modulation technique.

It is possible by combining the contiguity dot to reduce the middle exposure area further.

The demand to the image forming process can be reduced. Even if it is which LD multi-level modulation method, the multi-level output is attained in the electro-photographic-process.

Next, the mask addition method used as the principle of the present invention, the threshold gradient method, and the edge threshold changing method will be described in this order.

In the 4-level error diffusion process (the quantization output values: 0, 85, 170, 255), the gradation level difference or the pseudo outline occurs in the changing portions (85, 170) where the quantization output value changes, which causes the problem on the quality of image to arise.

In the present invention, in order not to be conspicuous and to remove the pseudo outline in the portion where the quantization output value changes, the mask noise is superimposed to the changing portion.

A description will now be given of the noise addition process according to the present invention.

In the 4-level error diffusion of the present invention, each is made into the blank dot (vacancy), the small dot, the middle dot, and the large dot for the quantization output values 0, 85, 170, and 255, and the threshold values are set to 43, 128, and 213.

The part where the gradation level difference poses the problem is the two places (the quantization output value changing portions) of the gradation values 85 and 170 as which the same gradation value as the output value is inputted.

The problem in the gradation value 85 is the same also in the gradation value 170.

A description will now be given of the gradation value 85.

Figure 11:
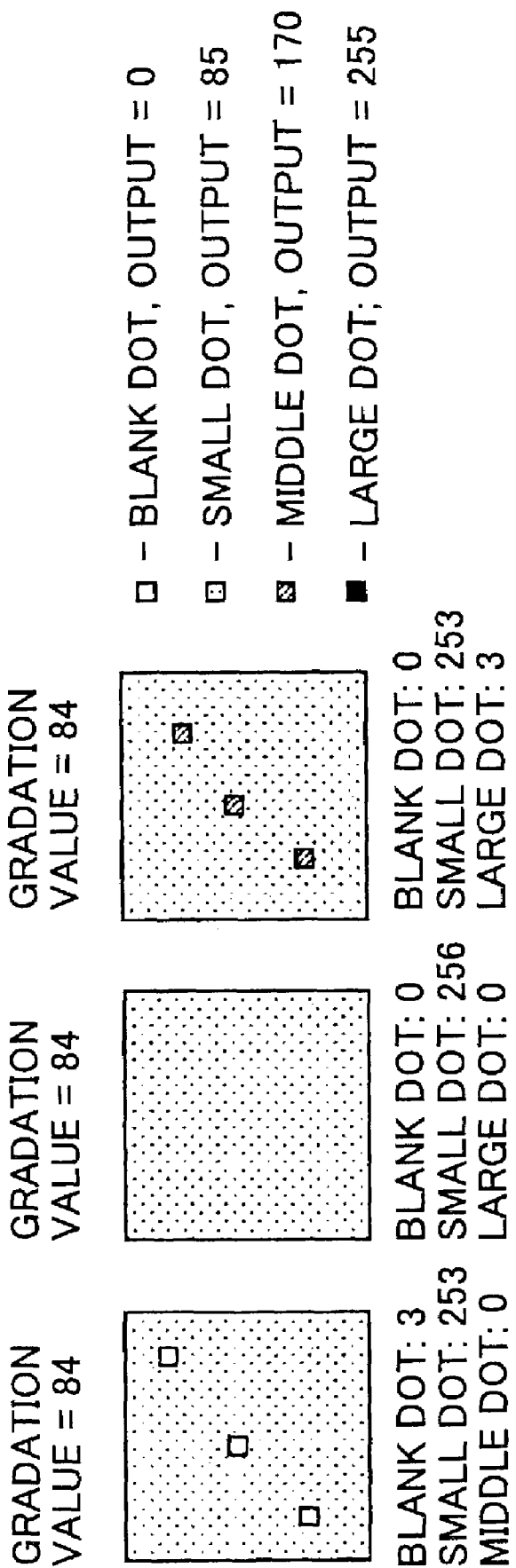
FIG. 11 is a diagram for explaining the probability of different dots (blank, small, middle and large dots) which appears per 256 pixels in the gradation values 84, 85 and 86.

In the gradation representation of the gradation values 84, 85, and 86, the dot which appears per 256 pixels is as shown in FIG. 11.

The gradation representation is carried out by blank dots and 253 small dots in the gradation value 84, and the gradation representation is carried out by 253 small dots and middle dots of the three pieces in the gradation value 86.

The noise (random number) is added to the gradation value 85, by making the middle dot and the blank dot appear, it is not conspicuous and the level difference takes place.

In this case, rather than the gradation values 86 and 87, the middle dot will appear mostly and the gradation will be reversed.

By the present invention, it is prescribed that the frequency of occurrence does not exceed the number of the dots while the dot generating number of the gradation value 85 can set to the number and the gradation value 86 of the blank dot in the gradation value 84.

Figure 12:
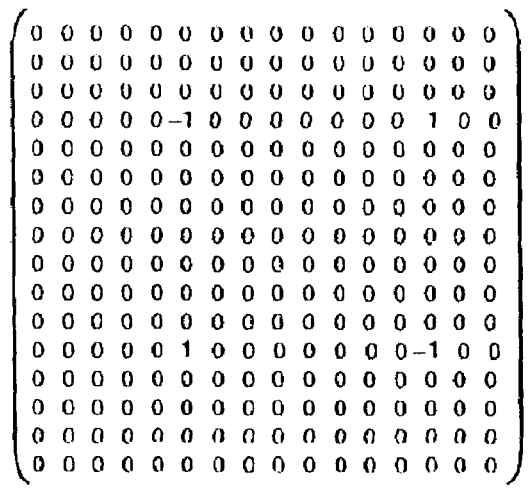
FIG. 12 is a diagram showing an example of the mask of 16×16 size which specifies the occurrence position and the number of the dots.
Figure 13:
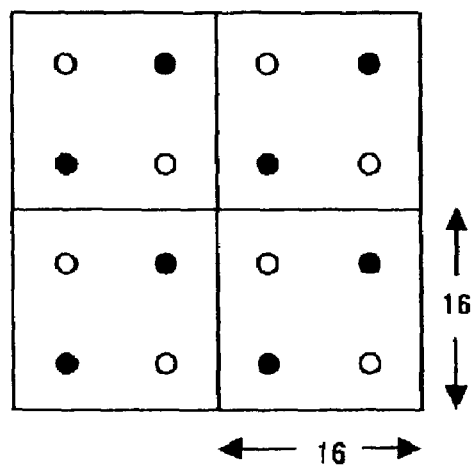
FIG. 13 is a diagram for explaining the arrangement of each dot when the gradation value 85 is inputted continuously.

This is desirable from the continuity of the spatial frequency of the image by the dots. FIG. 12 shows an example of the mask of 16×16 size which specifies the occurrence position and the number of dots.

As shown in FIG. 12, the mask noise is provided to specify the number of blank dots, the number of middle dots and the occurrence position in the gradation value 85. In the case of the gradation value 85, −1 indicates the blank dot, 1 indicates the middle dot, and 0 indicates the small dot. The mask noise of FIG. 12 causes two blank dots (−1) to appear in the gradation value 85 that are fewer than three blank dots which will appear in the gradation value 84, and causes two middle dots (1) to appear in the gradation value 85 that are fewer than three middle dots which will appear in the gradation value 86.

The occurrence position can also be specified if the mask noise is made into the form as shown in FIG. 12. Thereby, when the gradation value 85 is inputted continuously, the optimal dot arrangement can be designed with the mask as shown in FIG. 12.

For example, two middle dots and two blank dots are made to appear in the gradation value 85 in the case of FIG. 12. When the gradation value 85 is inputted continuously, the respective dots can be arranged in the 45-degree direction, which will create a reconstructed image with good graininess.

FIG. 59 shows the mask of 16×16 size which specifies the occurrence position and the number of the dots.

With the mask of FIG. 59, when the gradation value 85 is continuously inputted as the input value, the arrangement of the blank dot in the gradation value 85 and the middle dot and the arrangement of the small dot in the gradation value 170 and the large dot can be designed so that a good image quality is attained.

When it seems that the blank dot and two middle dots are made to appear in the gradation value 85 in 4-level error diffusion process, respectively, the mask of FIG. 59 is put in order, respectively.

FIG. 60 shows the arrangement of the four masks as shown in FIG. 59.

In FIG. 60, P1 and P2 (the white circles) are the pixel positions where the addition compensation (+85) in FIG. 59 is performed. P3-P6 (the black dots) are the pixel positions where the subtraction compensation (−85) in FIG. 59 is performed. The dotted line "a" is the line which connects the subtraction compensation position P3 and the addition compensation position P2. The dotted line "b" is the line which connects the subtraction compensation position P4 and the addition compensation position P2. The dotted line "c" is the line which connects the addition compensation position P2 and the subtraction compensation position P5. The dotted line "d" is the line which connects the subtraction compensation position P6 and the addition compensation position P2. The dotted line "e" is the line which connects the addition compensation position P1 and the addition compensation position P2.

Assume that the lengths of the dotted lines "a", "b", "c" and "d" are the same length. The length of P1 and P3 sets up the addition compensation position (white circle) and the subtraction compensation position (black dot) within the mask so that the length of "d", P1 and P6 may be set to "a" (the crossing angle of the dotted line "d" and the dotted line "e" is 45 degrees).

In the arrangement of FIG. 60, the mutual relation between other white circles and black dots may serve as the tetragonal-lattice point similarly.

When the gradation value 85 is continuously inputted as an input value, it has arranged, as the blank dot in the gradation value 85 and the middle dot are described above, and the small dot and large dot in the gradation value 170 are described above.

By using the arrangement of FIG. 60, the graininess of the image can be improved. The reversal of the gradation can be prevented by prescribing that the occurrence number described above. However, the effect is lost if it is the noise in which the graininess deteriorates greatly like in the case of superimposing the random number as compared with other gradation.

Generally, the human vision property factor (VTF) can be expressed with the result of the multiplication to the spatial frequency characteristics of the image as a substitution property of the graininess of the image which is observed by the human eyes. The spatial frequency of the image explains the effect by mask processing of the present invention.

Figure 14:
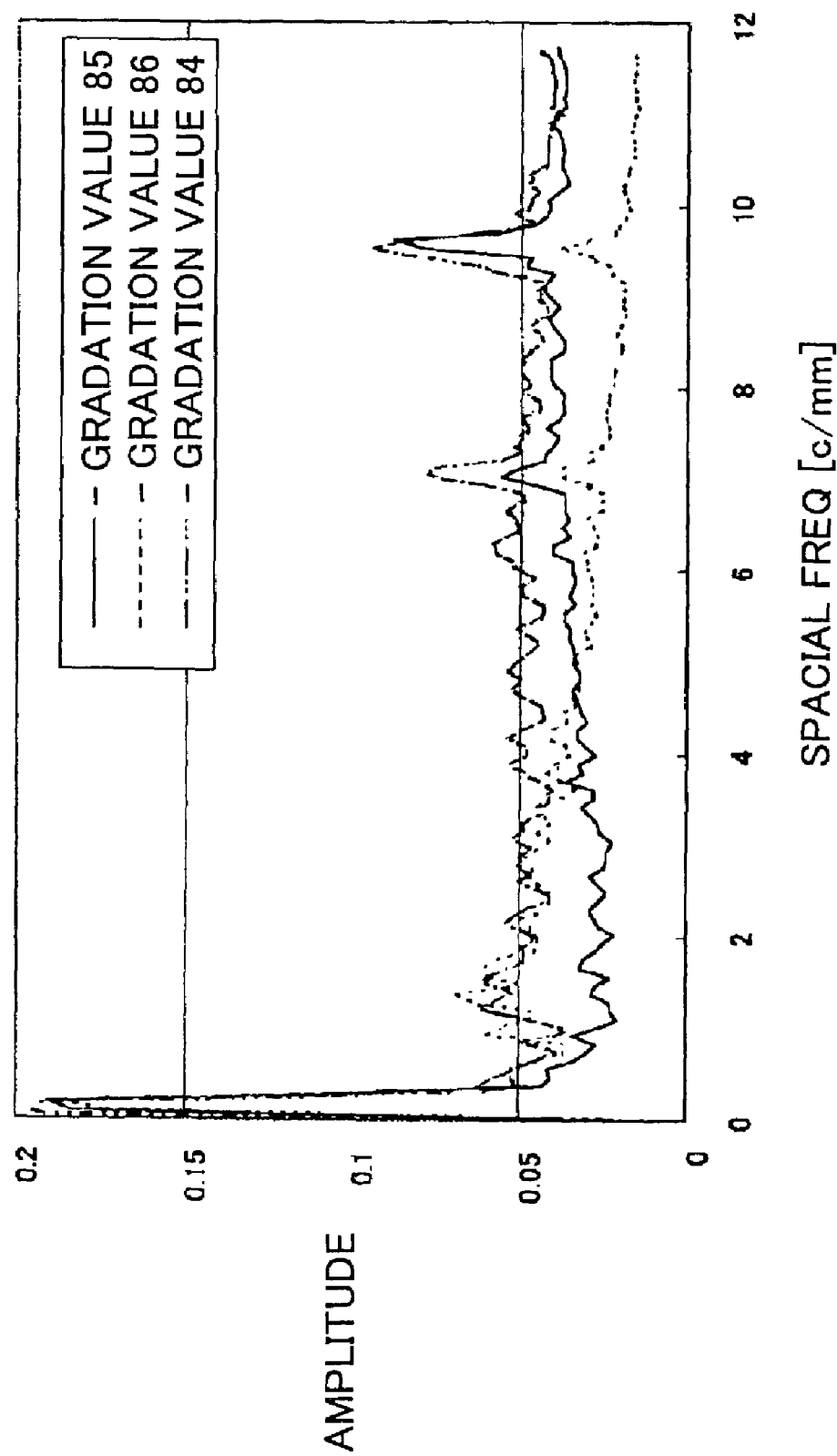
FIG. 14 is a diagram showing the spatial frequency of the image with the gradation values 84, 85 and 86 for which the 4-level error diffusion process is performed.

FIG. 14 shows the spatial frequency of the image of the gradation values 84, 85 and 86 for which the 4-level error diffusion process is performed.

Figure 15:
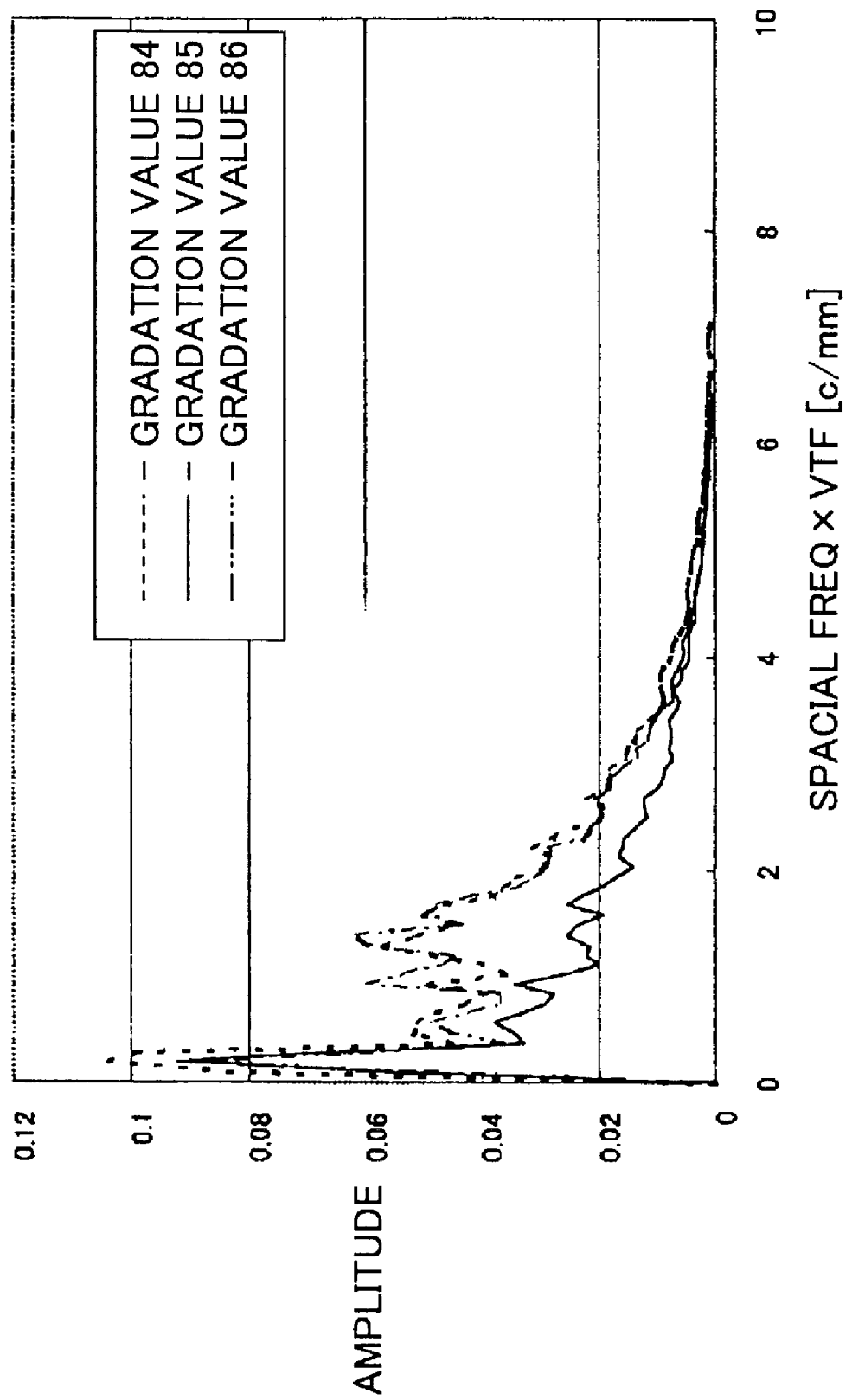
FIG. 15 is a diagram showing the result of the multiplication of the human vision property factor to the spatial frequency of the image with the gradation values 84, 85 and 86 for which the 4-level error diffusion process is performed.

FIG. 15 shows the result of the multiplication of the human vision property factor (VTF) to the spatial frequency of the image with the gradation values 84, 85, and 86 for which the 4-level error diffusion process is performed.

Although the gradation values 84 and 86 serve as the same curve (the curve on which the frequency characteristic is confused), the gradation value 85 has the frequency characteristic (uniform property) lower than the gradation values 84 and 86.

Figure 16:
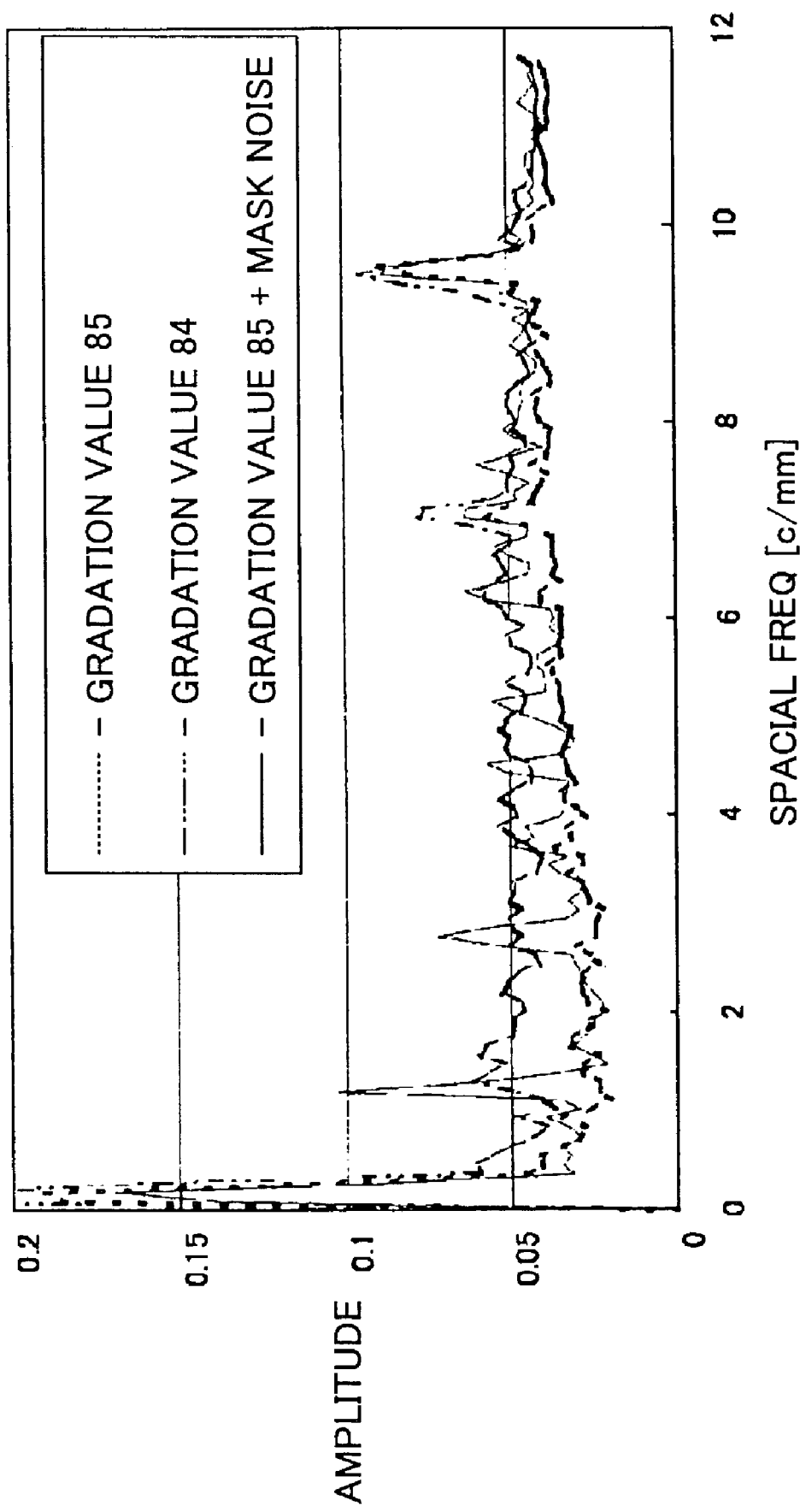
FIG. 16 is a diagram showing the result of the addition of the mask noise to the spatial frequency of the image with the gradation value 85 when the 4-level error diffusion process is performed, and the spatial frequency of the image with the gradation values 84 and 85 for which the 4-level error diffusion process is performed.

FIG. 16 shows the result of the addition of the mask noise to the spatial frequency of the image with the gradation value 85 when the 4-level error diffusion process is performed, and the spatial frequency of the image with the gradation values 84 and 85 for which the 4-level error diffusion process is performed.

The image after the mask noise addition processing contains many peaks and low frequency components which are not in the graph of the spatial frequency of the image with the gradation value 85. The peaks are produced with the dot arrangement of the superimposed mask noise.

FIG. 17 shows the result of the multiplication of the human vision property factor (VTF) to the spatial frequency of the image shown in FIG. 16.

Many low frequency components which have not appeared before the multiplication will appear in the gradation value 85 due to the low frequency components with the superimposed mask noise.

Although it has the value which exceeds the contiguity gradation 84 since it has the peak in part, the value is generally lower than the gradation value 84 will be taken, and it is the image with the graininess more sufficient than the gradation value 84.

Thus, it is necessary to make it the noise which the quantization output value changes and is superimposed on the portion have to become lower than the spatial frequency of the image with the gradation values 84 and 86 neighboring the gradation value 85, and the spatial frequency of the image of the gradation value 85 of the result which superimposed the noise.

As for the mask noise, it is possible for the quantization output value to change and to make it superimpose not only on the portion but on the neighboring portions, and, thereby, the suppression of the gradation level difference is attained.

For example, the noise which serves as low frequency from the spatial frequency which the image of the gradation value 83 has in the gradation value 84 (the neighboring gradation value 85) is added, and the noise which serves as low frequency from the spatial frequency which the image of the gradation value 87 has is added to the gradation value 86 (the neighboring gradation value 85).

FIG. 18 shows the mask noise which is added to the image with the gradation value 84 when the 4-level error diffusion process is performed. FIG. 19 shows the mask noise which is added to the gradation value 86 when the 4-level error diffusion process is performed.

In the case of FIG. 18, the mask noise of only subtraction is added to the gradation value 84 (−O2 indicates the blank dot and 0 indicates the small dot). In the case of FIG. 19, the mask noise of only addition is added to the gradation value 86 (O2 indicates the middle dot and 0 indicates the small dot).

The mask with the ideal occurrence number with which the reversal phenomenon of the gradation is not caused is designed, and it can apply also to the gradation values 85±2 (in the gradation value 83 six blank dots are made to appear, and in the gradation value 87 six middle dots are made to appear).

In the above examples, the mask size is 16×16, but the present invention is not limited to such examples. It is only necessary to set the mask size to a 2's exponential size. Moreover, the present invention is not limited to the occurrence position of the above examples, and it is possible to set an arbitrary occurrence position of the dots.

The noise position which appears in the gradation value 85 is specified by the matrix mask. In the gradation value 84, the occurrence position of the blank dot and the small dot is shifted by the error diffusion process. However, in the gradation value 85, the blank dot, the small dot and the middle dot are aligned in the position specified with the matrix mask. Depending on the image, the gradation value 85 may be inputted continuously widely, only as for this area, these dots will be aligned, and the sense of incongruity will arise.

This is because the dot occurrence position is limited within the mask. If two or more masks with which the dot occurrence positions differ are prepared and one of the masks is selected suitably, it is possible to change the dot occurrence position accordingly. Specifically, choosing two or more masks by the random number, or rotation or symmetric transformation of one mask may be used to generate the occurrence position, and there is the same effect.

In the case of a color image, the CMYK color image is separated into the respective color components (the error diffusion process is also performed for each color component). It is possible to change the dot occurrence position for every color component, by preparing two or more masks and choosing the mask according to the color component.

In the above example, the mask which cause two blank dots and two middle dots to appear equally in the gradation value 85. However, there is a case the arrangement of the blank dot and the middle dot appearing equally is not suitable depending on the characteristics (the dot gain) of the printer. FIG. 20 shows the mask which causes one blank dot and two middle dots to appear.

It is possible to superimpose the mask noise as shown in FIG. 20 to the gradation value 85 in order to make one blank dot (−O2) and two middle dots (O2) appear. In the error diffusion process, there are two cases: one the mask noise is superimposed to the input value; and the other the mask noise is superimposed to the threshold.

When superimposed to the input value, the result of the addition of the mask noise to the input value is as follows.

Gradation Value 85:

$$\text{Input value} + (\text{result of mask processing} \times 85) = 85 + (1 \times 85) = 170$$
$$85 + (0 \times 85) = 85$$
$$85 + (-1 \times 85) = 0$$

Gradation Value 170:

$$\text{Input value} + (\text{result of mask processing} \times 85) = 170 + (1 \times 85) = 255$$
$$170 + (0 \times 85) = 170$$
$$170 + (-1 \times 85) = 85.$$

Thus, the large mask noise which makes the middle dot and the blank dot appear in the gradation value 85 and makes the small dot and the large dot appear in the input value 170 can be added by correcting the input value by the result of mask processing.

This noise addition value is a size which generates the dot certainly, and it is necessary to set it as the value out of which the influence on the error value does not come.

What is necessary is to subtract [just] and add 85 to each threshold (43, 128 213) required for multi-level quantization similarly, when it superimposes the noise on the threshold.

85 is subtracted from each threshold to 170 (middle dot) to appear, and 170 (middle dot) is made to appear by making the threshold low.

It adds to 0 (blank dot) to each threshold the 85 times to appear, and 0 (blank dot) is made to appear by making the threshold high.

When the threshold is fluctuated greatly and the middle dot, blank dot, and size dot is made to appear, it will leave the gross errors to the position of the output result, and the circumference pixel will be affected.

FIG. 21 shows the result of the error diffusion process in which the mask noise of FIG. 12 is superimposed to the input value. In this case, the input value is corrected. As shown in FIG. 21, when the input value is corrected, the dot appears suitable for the position specified with the mask.

Therefore, like the ink jet printer, the multi-level quantum of the requests, such as the large minor dot and shade ink, is stabilized, and especially when the output is possible, it is effective.

Figure 22:
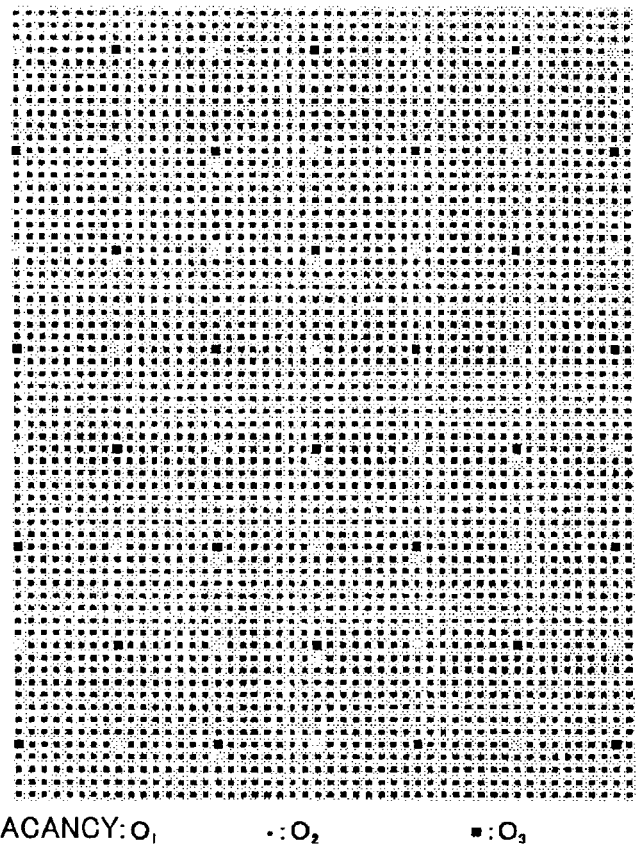
FIG. 22 is a diagram showing the result of the error diffusion process in which the mask noise of FIG. 12 is superimposed on the threshold.

FIG. 22 shows the result of the error diffusion process in which the mask noise of FIG. 12 is superimposed to the threshold. In this case, the threshold is corrected. As shown in FIG. 22, when the threshold is corrected, other gradation values appear in the predetermined position. Another gradation value appears according to the error which leaves the gross errors to the target-pixel position and remains. Therefore, it is suitable, when the middle dot is stabilized in the middle dot by the way which the blank dot is made to adjoin and it outputs to it by the edge effect like the electro-photographic process (the image is stabilized).

Figure 23:
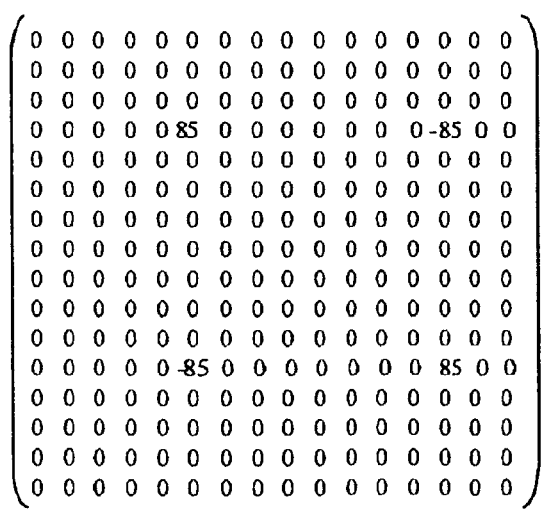
FIG. 23 is a diagram showing another example of the mask which causes the input value to be corrected.

What is necessary is just to use the mask which corrects the input value shown in FIG. 23, in order to simplify the result of mask processing×85) operation.

In order to obtain the image as shown in FIG. 21, it is necessary to add the mask of FIG. 23 to the input value to attain high-speed processing. The noise specified with the mask as shown in FIG. 23 is added, and this technique is called the mask addition process according to the present invention.

Figure 3:
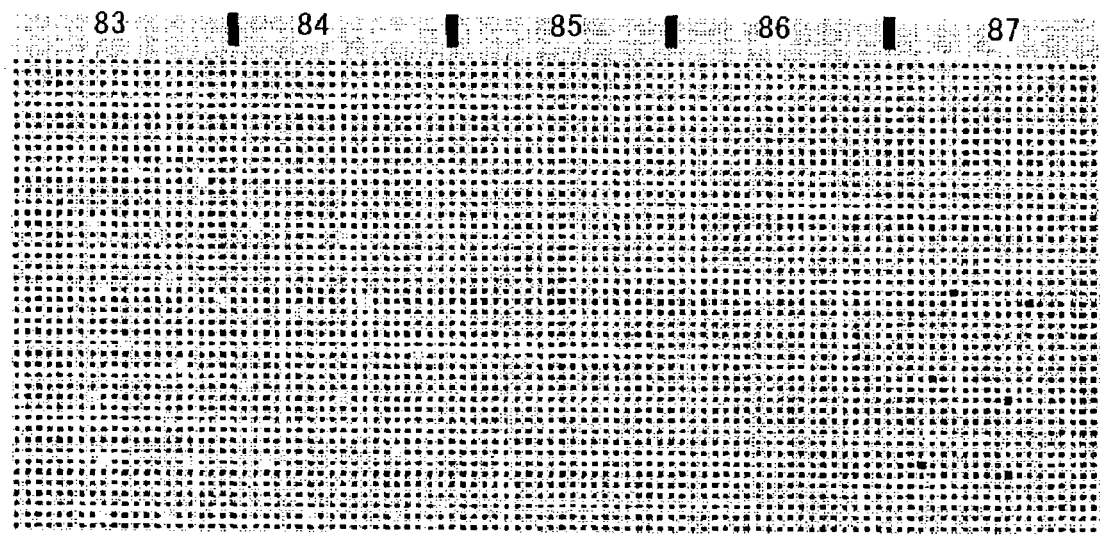
FIG. 3 is a diagram showing the result of a simple 4-level error diffusion process which is performed for each pixel of a 128-level gradation image.
Figure 4:
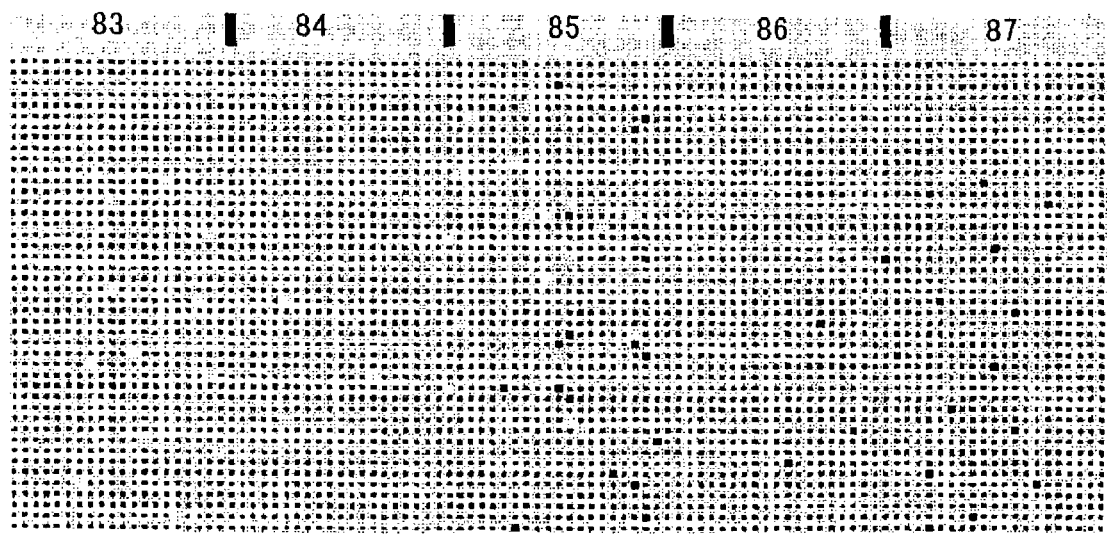
FIG. 4 is a diagram showing the result of adding a random number with the amplitude ±32 to the gradation value 85 when the error diffusion process is performed.
Figure 24:
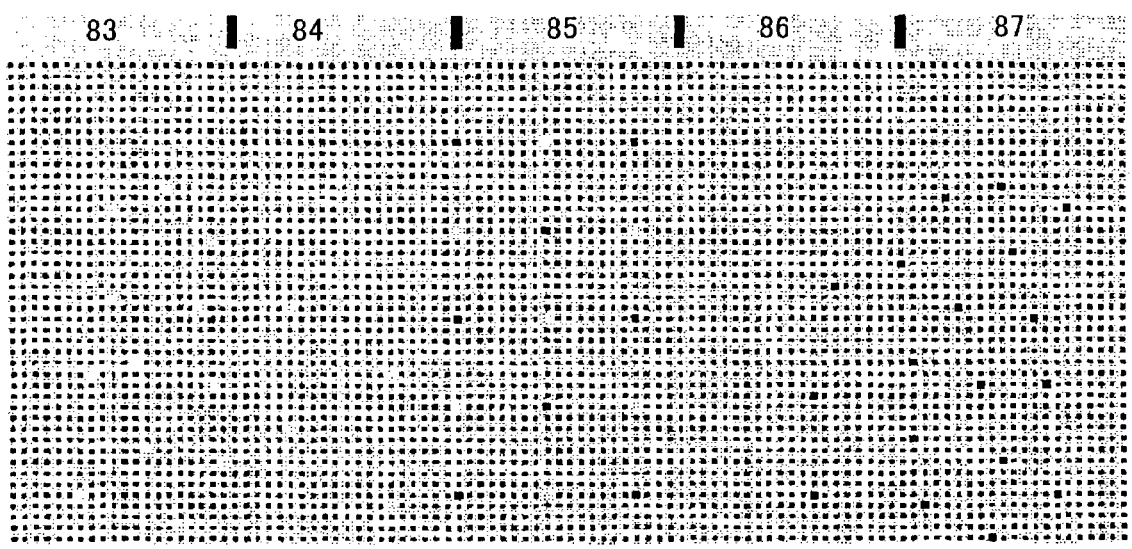
FIG. 24 is a diagram showing the result of the mask addition process which is performed for the image of FIG. 3.

FIG. 3 shows the result of the simple 4-level error diffusion process which is performed for each pixel of a 128-level gradation image. In contrast, FIG. 24 shows the result of the mask addition process which is performed for the image of FIG. 3.

The pseudo outline which the quantization output value changes and is generated in the portion by superimposing the noise specified with the mask can be suppressed.

The mask adding method can abolish the delay of the dot generation near the solidly shaded portion near the highlight portion.

The mask noise turns into the effective noise in binary error diffusion process also to the delay of the dot generation of the gradation value 1, and the delay of generation of the vacancy (blank dot) with the gradation value 254.

The delay of the dot generation is abolished by adding the noise which serves as low frequency from the spatial frequency which the image of the gradation value 2 has to the gradation value 1.

FIG. 19 shows the mask noise which is added to the input value, and makes the large dot appear in the position of O2.

The position of 0 is the occurrence position of the blank dot.

The delay of the blank dot generation is abolished by adding the noise which serves as low frequency from the spatial frequency which the image of the gradation value 253 has to the gradation value 254.

FIG. 18 shows the mask noise which is added to the input value, and makes the blank dot appear in the position of −O2. The position of 0 is the occurrence position of the large dot.

Figure 25:
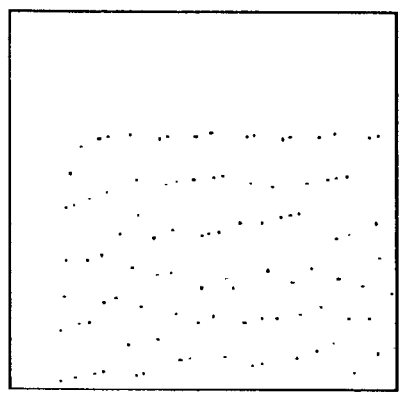
FIG. 25 is a diagram showing the result of the 2-level error diffusion process which is performed for the image with the gradation value 1.
Figure 26:
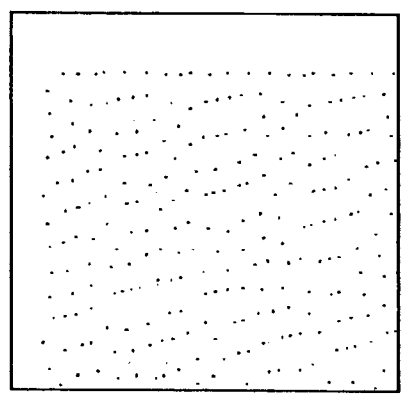
FIG. 26 is a diagram showing the result of the 2-level error diffusion process which is performed for the image with the gradation value 2.

FIG. 25 and FIG. 26 show the results of the 2-level error diffusion process which is performed for the images with the gradation values 1 and 2, respectively.

The delay of the dot generation has produced any image at the screen upper left.

Figure 27:
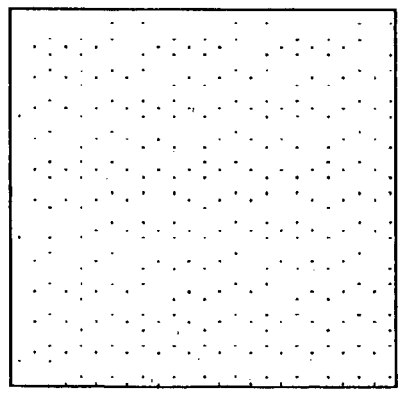
FIG. 27 is a diagram showing the result of the 2-level error diffusion process and the mask addition process which are performed for the image with the gradation value 1.

FIG. 27 shows the result of the 2-level error diffusion process and mask addition process which are performed for the image with the gradation value 1.

In FIG. 27, the delay of the dot generation has decreased compared with FIG. 25 and FIG. 26.

When the delay of the dot generation of FIG. 26 performs mask processing also to the gradation value 2 on the image design in the case which is not desirable, the delay of the dot generation is lost.

Figure 28:
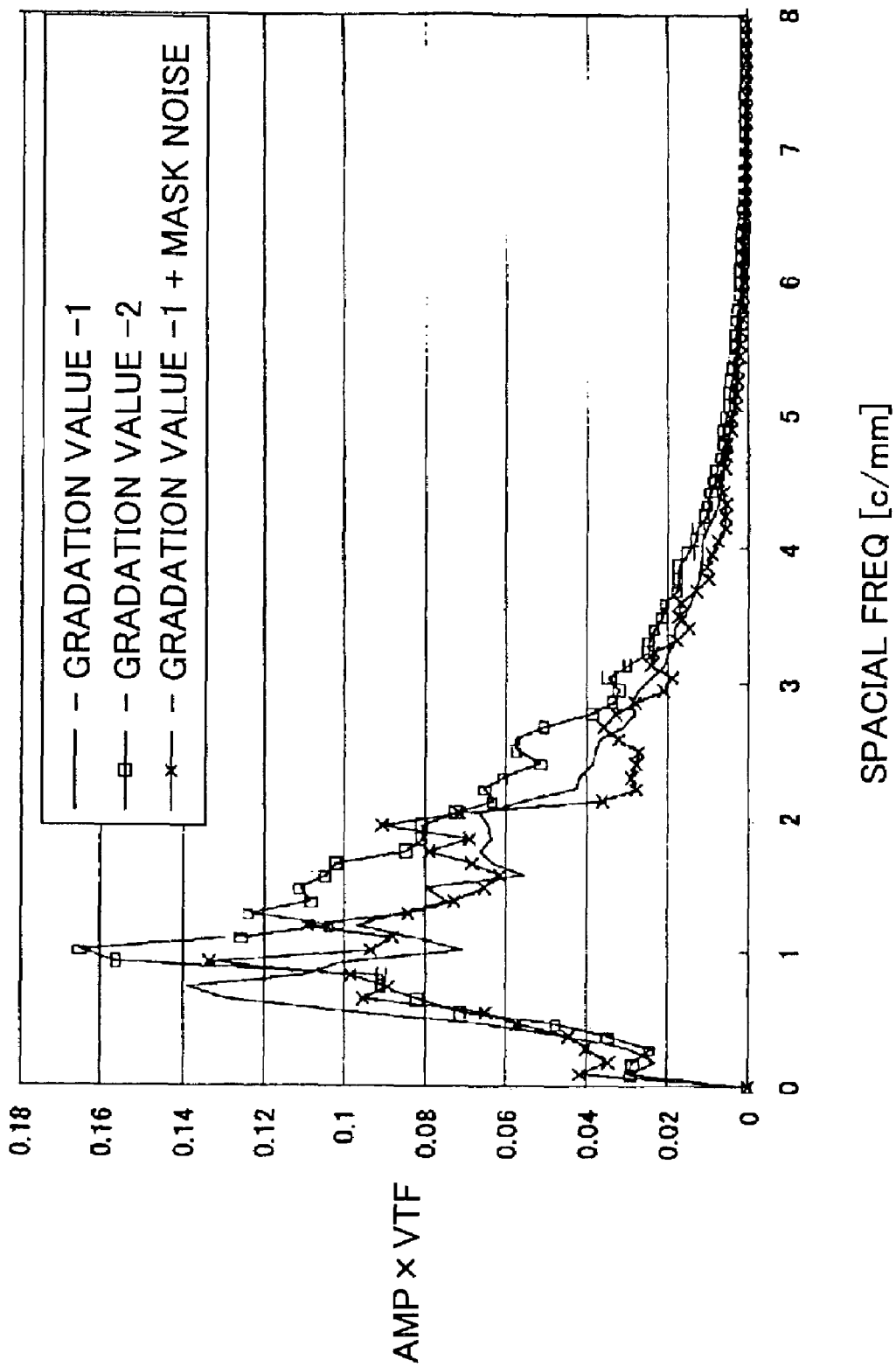
FIG. 28 is a diagram showing the result of the multiplication of the vision property factor to the spatial frequency of the image with the gradation value 1 for the mask process is performed.

FIG. 28 shows the result of the multiplication of the vision property factor (VTF) to the spatial frequency of the image with the gradation value 1 for which the mask processing is performed.

The image of the gradation value 2 contains many low frequency components rather than the spatial frequency characteristics contained in the image of the gradation value 1.

Although the spatial frequency characteristics contained in the image of the gradation value 1 for which the mask processing is performed will contain many low frequency components rather than the gradation value 1, they are lower than the spatial frequency characteristics of the gradation value 2.

As for the number of the blank dots (vacancy) or the number of the dots which appear by the mask noise added to the gradation value 1 or the gradation value 254, it is desirable from the viewpoint of the image design to make it equal, respectively.

In FIG. 24, by superimposing the suitable noise, the blank dot and the middle dot intermingle and change, and they become conspicuous and the level difference of the portion does not easily appear in the gradation value 85. However, in the gradation value 86, it is filled with the small dot and this area serves as the pseudo outline.

In the present invention, by using the mask addition process and the threshold gradient method, it changes, and it is not further conspicuous and the level difference of the portion does not easily appear.

A description will be given of the threshold gradient method according to the present invention.

FIG. 24 shows a 128-level gradation image in which the gradation value changes in the range of 0-128, but it is in the occurrence of the middle dot in the gradation value 86, and the pseudo outline is produced in the gradation value 86.

In the gradation image which changes to the gradation values 128-0, in the gradation value 85, the blank dot and the middle dot appear appropriately by the mask addition process. In the gradation value 84, the occurrence of the blank dot will be overdue, and the pseudo outline will occur in the gradation value 84. Similarly, in the neighboring gradation values 169 and 171 of the gradation value 170, the pseudo outline by the delay of the dot generation will arise.

Furthermore, the delay of the dot generation while being able to set to the delay and the gradation value 254 of the small dot generation in the gradation value 1 is also the same delay problem.

Next, a description will be given of the processing which is not in the dot generation concerning the quantization output value.

It considers controlling the amount of delay of the quantization output value by asking for the parameter which controls the amount of delay in error diffusion process.

Figure 29:
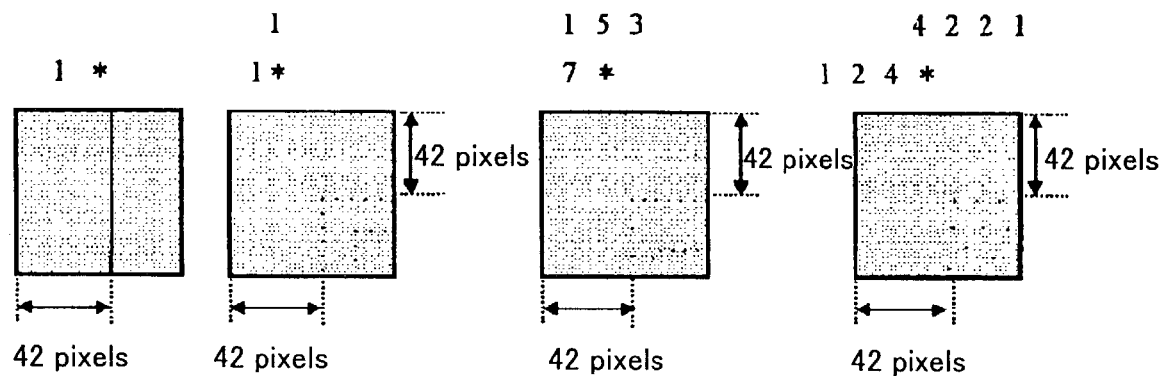
FIG. 29 is a diagram showing the result of the 4-level error diffusion process which is performed for the image with the gradation value 1/255 by using four kinds of error diffusion matrices.

FIG. 29 shows the result of the 4-level error diffusion process which is performed for the image with the gradation value 1/255 by using four kinds of error diffusion matrices.

The quantization output values are set to 0, 85, 170 and 255, and the threshold values are set to 43, 128 and 213.

It turns out that about 42 pixels are overdue and the small dot has appeared also in which the error diffusion matrix only by the directions of the propagation of errors differing by the error diffusion matrix.

Figure 30:
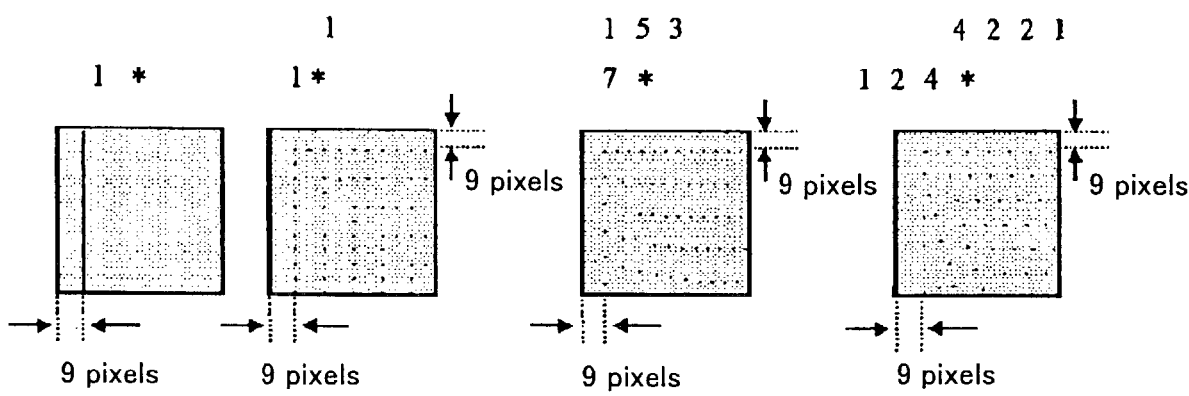
FIG. 30 is a diagram showing the result of the 4-level error diffusion process when the threshold is set to 10, 128 and 213 in the processing of FIG. 29.

FIG. 30 shows the result of the 4-level error diffusion process when the threshold is set to 10, 128 and 213 in the processing of FIG. 29.

In the case of FIG. 30, it turns out that about 9 pixels are overdue in which the error diffusion matrix, and the small dot has appeared.

Since the error will collect quickly twice and it will become easy to come out of the dot if the input image is with the gradation value 2/255, it is behind, and the quantity is decreased.

Thus, it can be behind by operating the threshold in the error diffusion process, and the quantity can be controlled.

Generally, the threshold is set up to the middle of each of the quantization output values 0, 85, 170 and 255.

However the threshold may be set up in the error diffusion process, since the amount of delay of the dot occurrence is only changed and the error has spread, and the concentration is saved.

It turns out that the amount of delay can be approximated with the value of the threshold for the input value.

Figure 31:
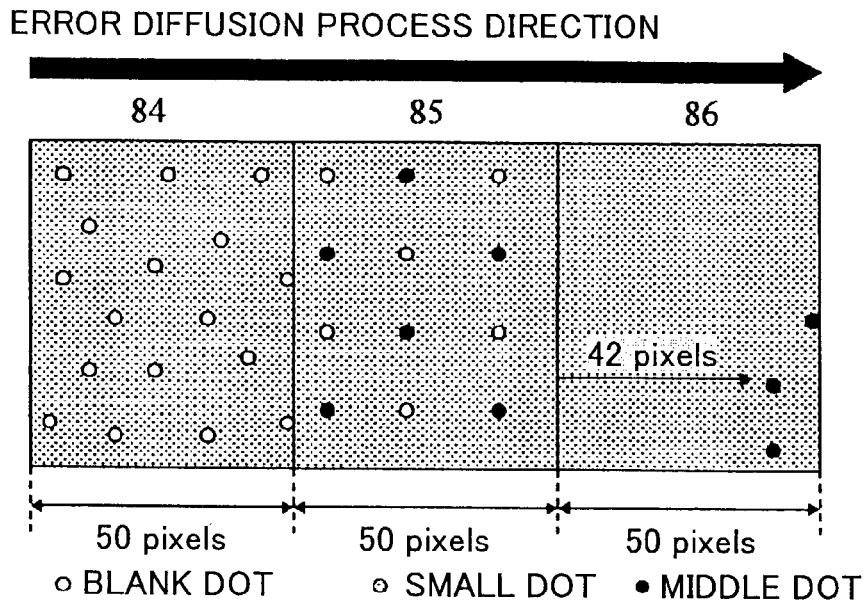
FIG. 31 is a diagram for explaining the delay of generating the middle dots in the image with the gradation value 86.

FIG. 31 is a diagram for explaining the delay of generating the middle dots in the gradation image with the gradation value 86.

The threshold needed for the formation of 4 quantization levels is set to Thr1, Thr2 and Thr3, and the compensation input value is set to the sum.

Since the amount of delay in each of the gradation values 86 and 171 is the same as the amount of delay in the gradation value 1, it serves as the gradation value 1: Thr1/sum.

The amount of delay of the small dot in the blank dot in the gradation value 84 and the gradation value 169 or the middle dot in the gradation value 254 may be set up similarly.

Figure 32:
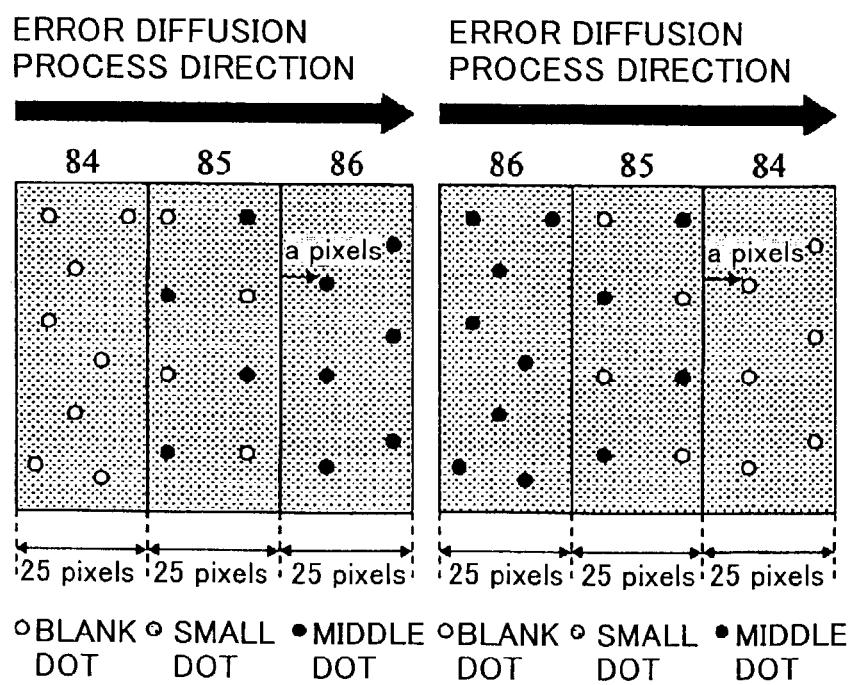
FIG. 32 is a diagram for explaining the delay of generating the dots in the images with the gradation values 86 and 84 when the amount of the delay is set to "a" pixels.
Figure 33:
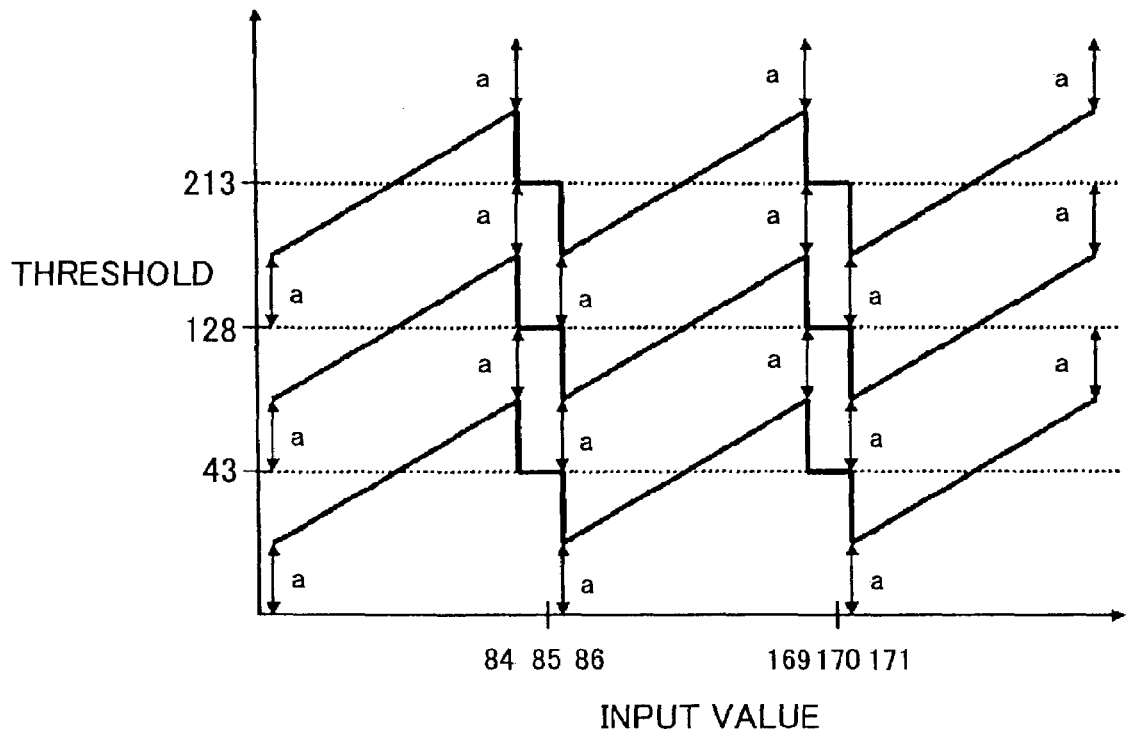
FIG. 33 is a diagram showing the threshold which is constituted to increase according to the input value when the amount of the delay is set to "a" pixels.

The threshold is obtained by dividing the input value into two or more portions, as shown in FIG. 33, lowering near the starting point of the portion from the predetermined threshold, raising near the end point of the portion, and connecting for the two points in a straight line to make the amount of the delay into the "a" pixels, as shown in FIG. 32, it is behind by the gradation value 86 or 84.

Here, since it is 4-level output, as shown in FIG. 33, it is dividing into the three portions. In the N-level error diffusion process, the quantization output value changes, and the delay is generated in such changing portion, and it turns into the (N−2) portions. Therefore, the input value is divided into the (N−1) portions, the threshold is made low at the starting point of each portion in order to make the dot easily appear, and the threshold is made high at the end point of each portion in order to make the dot not easily appear. The middle dot easily appears in the gradation value 86 when the delay amount "a" is set to 0. In this case, the blank dot may appear by the mask addition processing depending on the image, and the middle dot may be adjoined, and it is not desirable. In the gradation value 85, the middle dot has appeared at intervals of the 16 pixels in the direction of horizontal scanning by the mask addition processing.

After becoming the gradation value 86, it is not desirable that the 17 pixels or more are overdue and the middle dot appears. Then, it is behind and the delay amount "a" is desirably about 6-12 pixels.

When the error diffusion process is performed using the threshold which increases according to the input value as shown in FIG. 33, the sharpness may deteriorate.

For example, when the delay amount "a" is made small with the 6 pixels, the slope of the threshold becomes sudden in the portion and there is the tendency for the sharpness to deteriorate.

In the case of the error diffusion process with the function which controls the sharpness like the edge threshold changing method, the arbitrary setup of the delay amount "a" can be carried out.

In the case of the error diffusion process which does not carry the sharpness control function, it needs to be behind, and it is necessary to take into consideration the delay amount and the sharpness degradation.

As shown in FIG. 33, the gradation value 85 or 70 is set as the same value as the fixed threshold so that the desired dot may tend to appear in the regular position by the mask addition processing.

Near the starting point of the portion, it sets up lower than the fixed threshold. Near the end point of the portion, it sets up more highly than the fixed threshold. It is set as the sloped threshold according to the input value.

Figure 34:
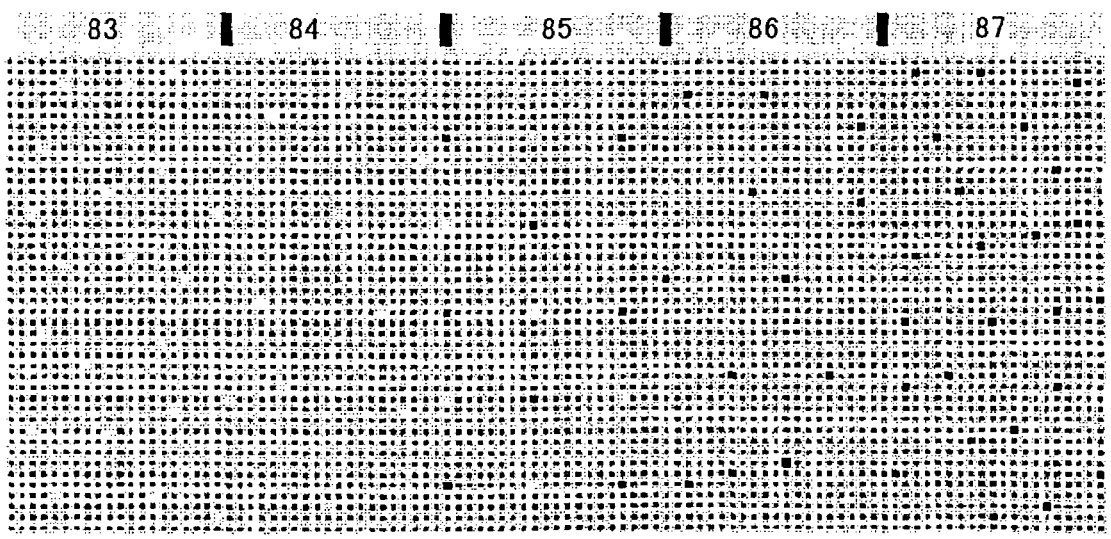
FIG. 34 is a diagram showing the result of the 4-level error diffusion process which is performed by using the mask addition process and the threshold of FIG. 33.

FIG. 34 shows the result of the 4-level error diffusion process which is performed by using the mask addition process and the sloped threshold of FIG. 33.

As shown in FIG. 34, the quantization output value changes and the level difference of the portion is suppressed In the present invention,-since the sloped threshold of FIG. 33 is used, it is called the threshold gradient method.

The example of some threshold properties without the delay of the dot occurrence will be described.

The 4-level quantization output value after the error diffusion of the four values is set to O1, O2, O3 and O4 from the 256 gradation, the gradation of the four value each quantization output value is set to 0, 85, 170 and 255, and the middle of each output value is set to 43, 128 and 213 for the threshold.

Figure 35:
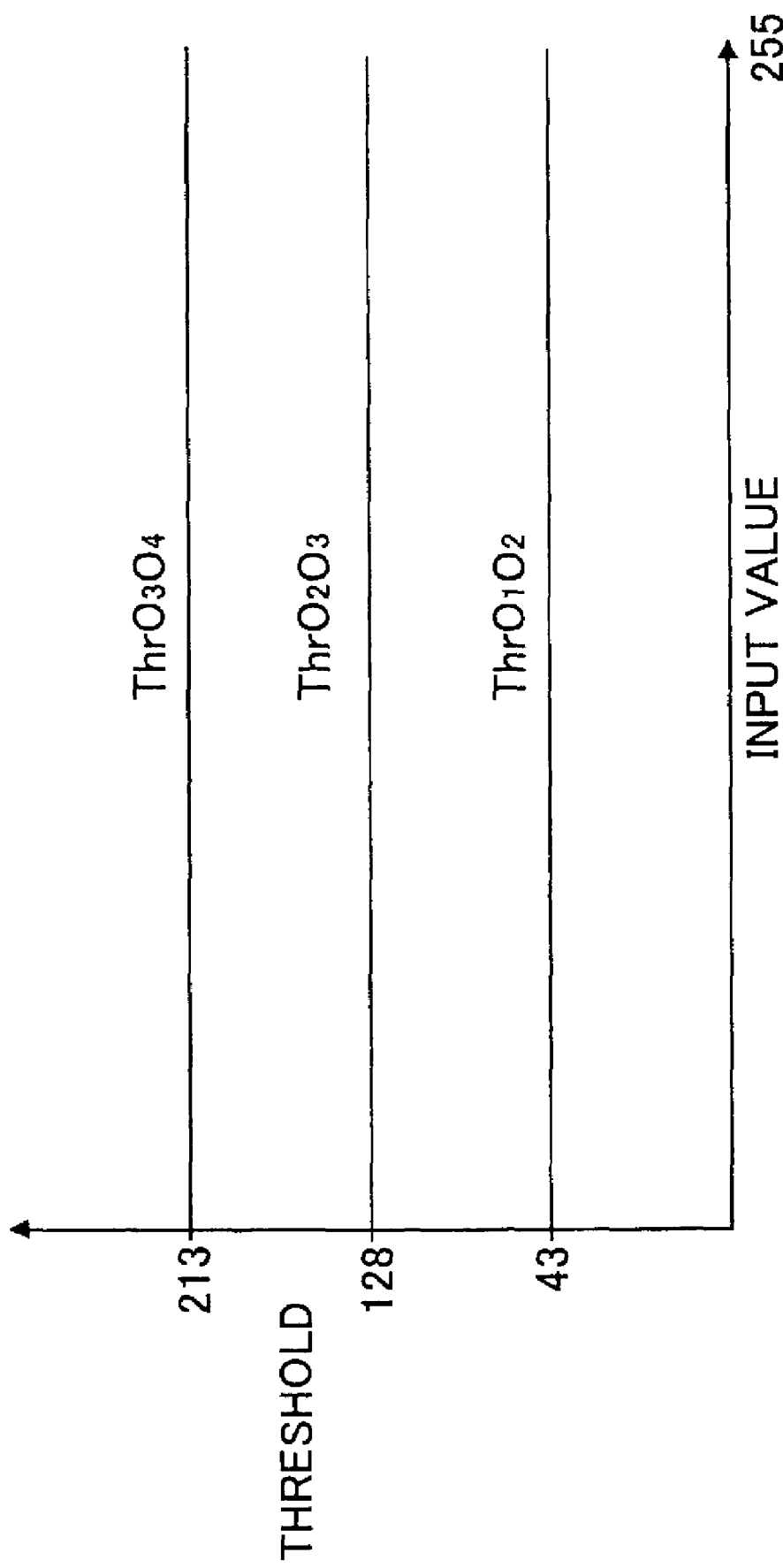
FIG. 35 is a diagram showing a relation between the fixed threshold and the input value in the 4-level error diffusion process.

The relation of the general threshold of the 4-level error diffusion process and the general input value becomes the fixed threshold as shown in FIG. 35. FIG. 35 shows the relation between the fixed threshold and the input value in the 4-level error diffusion process.

The portion of the input value is divided into the three portions of 0-85, 86-170 and 171-255, and let each portion be the portion 1, the portion 2 and the portion 3.

The quantization output values which appear in the portion 1 are only O1 and O2, and the threshold which determines the occurrence of O1 and O2 in the portion 1 is set to Thr1O1O2.

Similarly, the threshold which determines the occurrence of the quantization output values O2 and O3 in the portion 2 is set to Thr2O2O3, and the threshold which determines the occurrence of the quantization output values O3 and O4 in the portion 3 is set to Thr3O3O4.

The delay of the dot occurrence is produced near the end point near the starting point of each portion. As a countermeasure against the delay of the quantization output value O2 near the starting point of the portion 1, the dot easily appears with the threshold Thr1O1O2 by making it lower than the value set up in the middle of the quantization output values O1 and O2.

The O2 does not appear easily since it is made higher as a countermeasure against the delay of the quantization output value O1 near the end point of the portion 1 than the value which is set up the threshold Thr1O1O2 in the middle of the quantization output values O1 and O2. The O1 tends to appear. Thus, the threshold which is set up to Thr2O2O3 and Thr3O3O4 is shown in FIG. 36.

Figure 36:
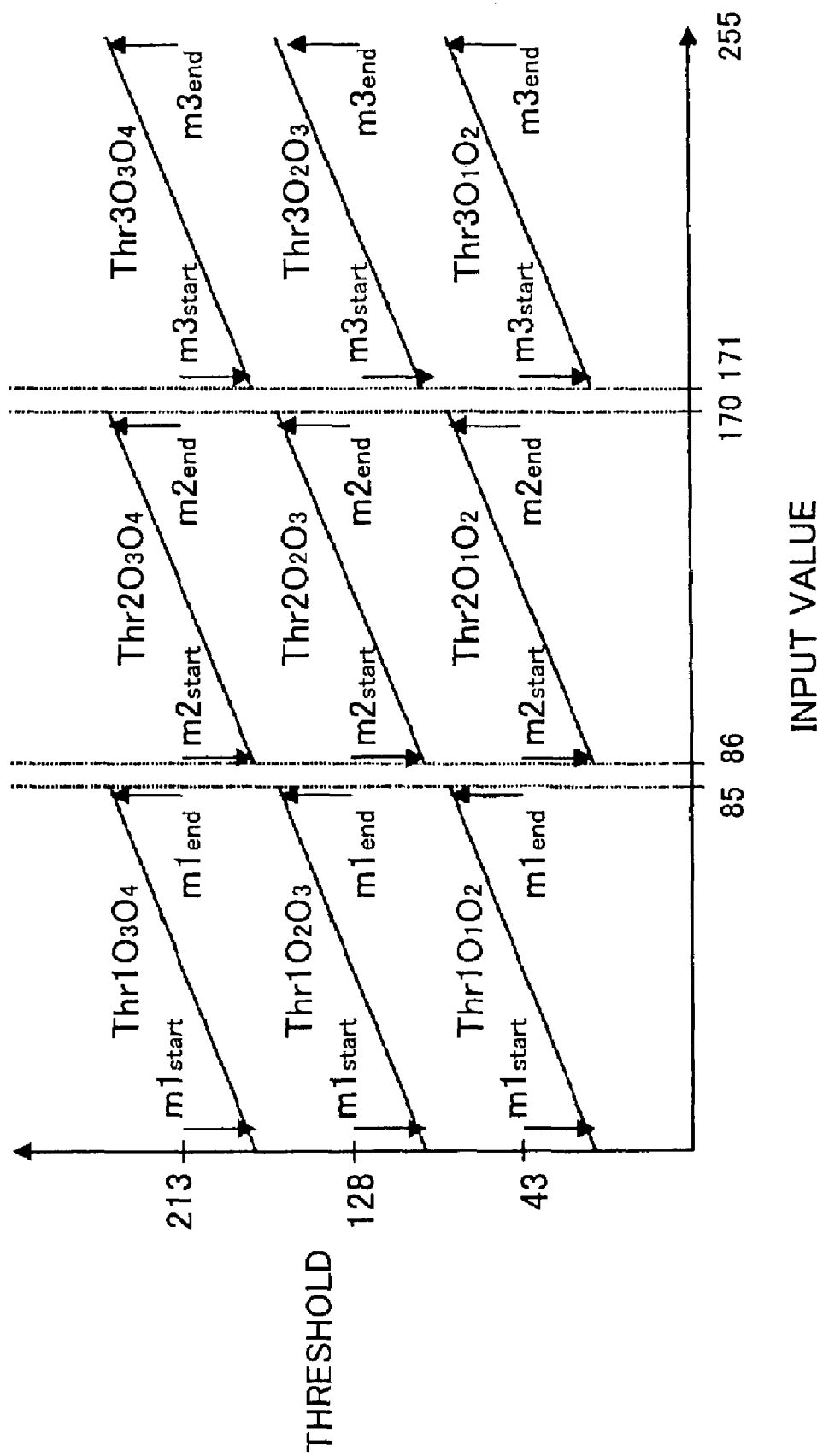
FIG. 36 is a diagram showing a straight-line definition of the threshold and the input value in which the input value is divided into four sections, the threshold near the starting point of each section is lower than a fixed threshold value, and the threshold near the end point of each section is higher than a fixed threshold value.

FIG. 36 shows a straight-line definition of the threshold and the input value in which the input value is divided into the four portions, the threshold near the starting point of each portion is lower than a fixed threshold value, and the threshold near the end point of each portion is higher than a fixed threshold value.

In FIG. 36, "m1start" (m1s) indicates the amount of lowering of the threshold Thr1O1O2 at the starting point of the portion 1, and "m1end" (m1e) indicates the amount of raising of the threshold Thr1O1O2 at the end point of the portion 1. When the above parameters satisfy the conditions: m1s≦M/2N and m1e≦M/2N, the image generally will become a good image.

O2 is outputted at the starting point when m1s>M/2N, and the negative error will be held so much. When there is a change of concentration like the gradation, the problem arises. Although based also on the amount of steps of each concentration of gradation, when m1s>M/2N, O2 appears with the time of the gradation value 1 being inputted.

There is the state where it will be in the state where O2 cannot appear even if the gradation value 2 is inputted, in order to hold a lot of negative errors, it becomes the gradation value 3, and O2 appears, and the gradation may be reversed.

Therefore, as for the parameters mns and mne of the threshold in each portion n, it is desirable to make it smaller than M/2N.

Since the quantization output values differ for each image output device, the mns and the mne are set up according to the output device. It is possible to set up the mns and the mne individually. Moreover, in a certain portion n, it is good also as mns=mne. It adjusts in each portion and is in at least one or more portions: mn1s=mn1e and mn2s=mn2e. It is possible to set up with mn1s=mn2s and mn1e=mn2e.

Furthermore, it adjusts for every portion and is in at least one or more portions: mn1s=mn1e and mn2s=mn2e. Alternatively, it is possible to set up with mn1s≠mn2s and mn1e≠mn2e.

The delay problem will be lost by applying the line which connects the parameters mns and mne of the portion near the starting point and the end point of the portion by considering as the threshold.

Here, it is possible to combine the parameters mns and mne of the portion with the straight line or the curve.

If it is the straight line, a simple formula for the straight line which connects the two points can be used, and when implemented, it is possible to attain high-speed processing.

Figure 37:
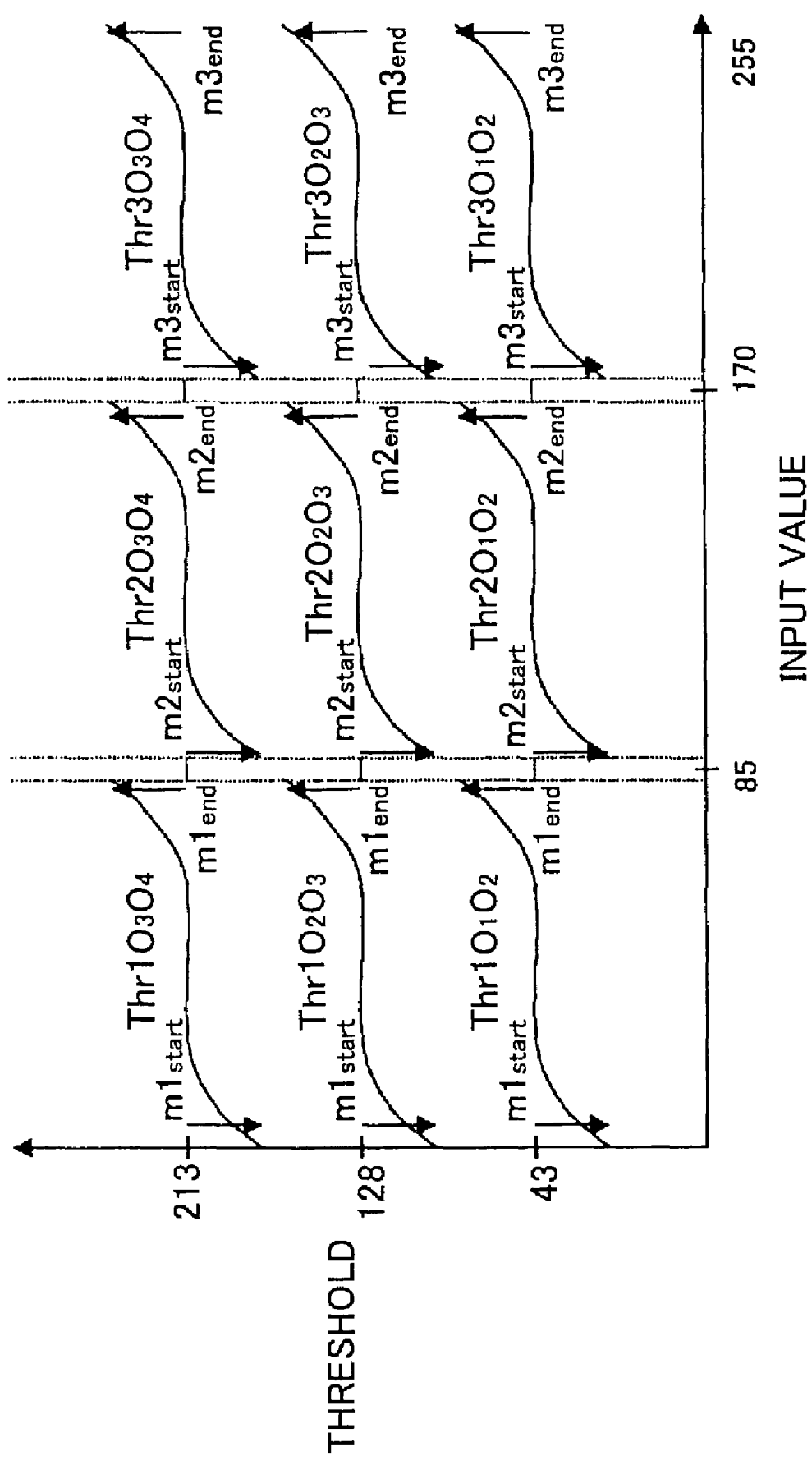
FIG. 37 is a diagram showing a curved-line definition of the threshold and the input value in which the input value is divided into four sections, the threshold near the starting point of each section is lower than a fixed threshold value, and the threshold near the end point of each section is higher than a fixed threshold value.

When it cannot respond to the threshold changing rapidly according to concentration depending on the image output machine inside the portion, as shown in FIG. 37, according to the "raw γ" of the output device, it is possible to carry out like the curve or the tan theta function. FIG. 37 shows a curved-line definition of the threshold and the input value in which the input value is divided into the four portions, the threshold near the starting point of each portion is lower than a fixed threshold value, and the threshold near the end point of each portion is higher than a fixed threshold value.

The value of the threshold according to each concentration may be calculated according to the given formula. However, when the calculation is complicated like a curve-line definition, the threshold is stored into a LUT (lookup table) and it is possible to speedily obtain a desired threshold value by accessing the LUT.

The gradation change depends on the image. In some cases, the gradation may change from 255 to 0 and in other cases it may change from 0 to 255 depending on the image. Preferably, the threshold line linking the parameters mns and mne of the portion is formed to be symmetric about the central point of the portion.

It is desirable to set up mns of each portion and mne so that it may be set to Thr2O1O2≦Thr1O1O2≦Thr2O2O3 near the adjacent point of the portions 1 and 2 in the combination of the threshold of each portion, when the threshold of the portions 1 and 2 is set to Thr1O1O2, Thr2O1O2 and Thr2O2O3.

Since it is set up near the end point of the portion 1 more highly than the threshold set up in the middle of the quantization output values O1 and O2 and is set up near the starting point of the portion 2 lower than the threshold set up in the middle of the quantization output values O1 and O2, it is set to Thr2O1O2≦Thr1O1O2.

Moreover, when Thr1O1O2≦Thr2O2O3, the gradation jump does not occur between the portion 1 and the portion 2.

On the contrary, when Thr2O2O3≦Thr1O1O2, O1 will be outputted superfluously near the end point of the portion 1, O3 will be outputted superfluously near the starting point of the portion 2, and the continuity of the gradation will be spoiled.

When processing is divided for every portion according to the gradation value of the input, since only two exist, the quantization output value of each portion does not need to have two or more thresholds.

Figure 38:
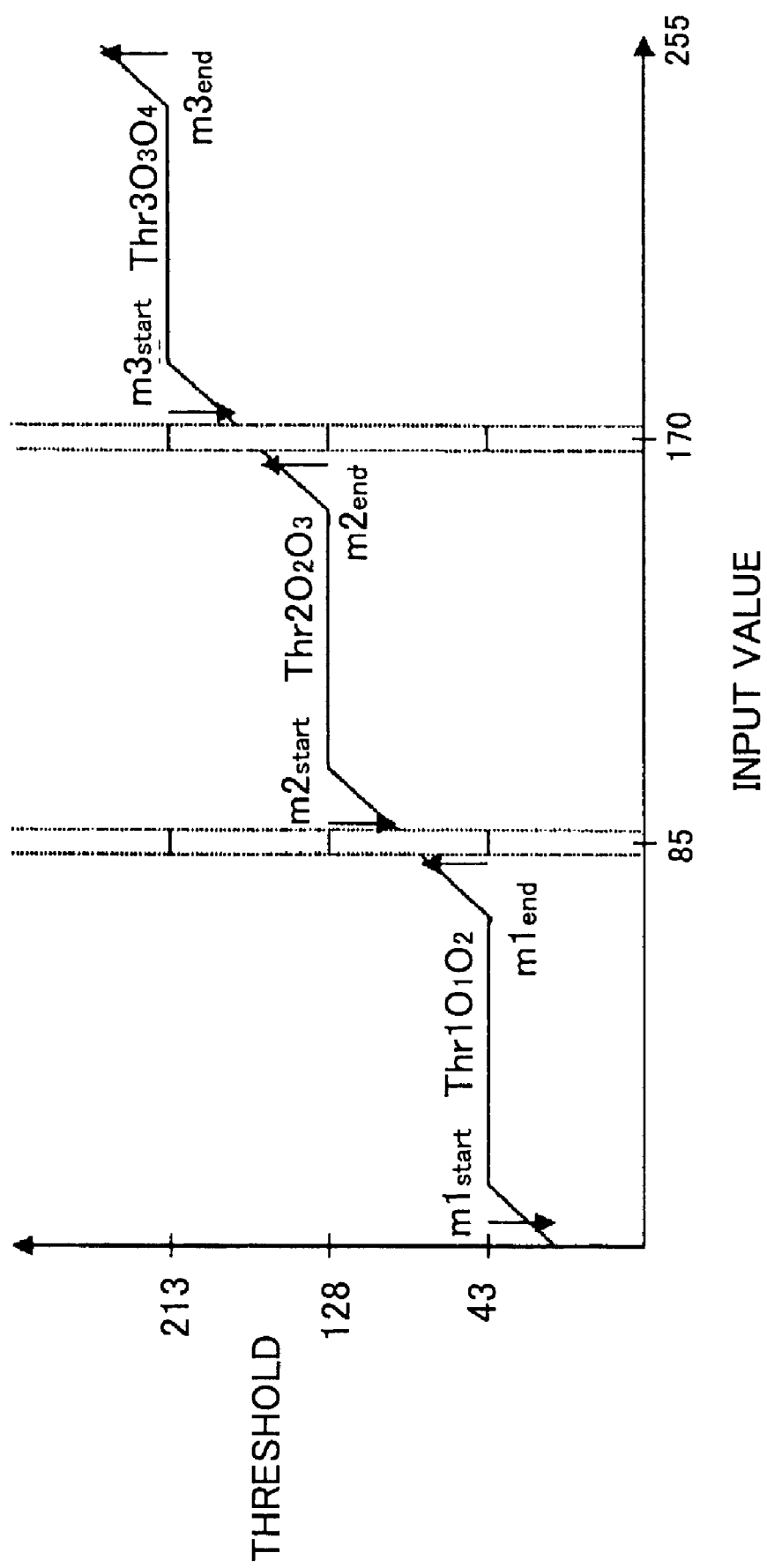
FIG. 38 is a diagram showing an example of the threshold in which only the fixed threshold values needed for the quantization determination are set up for each section of the input value.

The setup of the threshold is simplified as shown in FIG. 38. FIG. 38 shows an example of the threshold in which only the fixed threshold values needed for the quantization determination are set up for each portion of the input value.

As shown in FIG. 36, it is possible to make all the thresholds in the portion into the form of the threshold needed for the quantization output value which appears in the portion. portion 1 are only O1 and O2.

In this example, the quantization values outputted in the Based on Thr1O1O2, it is possible to create the threshold Thr1O2O3 which determines the occurrence of the quantization output values O2 and O3 in the portion 1, and the threshold Thr1O3O4 which determines the occurrence of the quantization output values O3 and O4 in the portion 1.

Specifically, the difference of Thr1O1O2 in the case of the fixed threshold which does not fluctuate the threshold according to concentration, and Thr1O2O3 is set up by adding to Thr1O1O2.

Since this technique is easily searched for when the threshold Thr1O1O2 which becomes the origin is the complicated curve, it is effective.

When the threshold Thr1O1O2 is the straight line and Thr1O2O3 and Thr1O3O4 are calculated, they are the quantization output values O2 and O3 and the quantization output values O3 and O4 about the parameters mns and mne.

When the width of the portion n1 where the parameter mn1s of the threshold which connects the starting point and the end point of the portions n1 and n2, mn1e, mn2s and mn2e satisfy and are divided the next related mn1s=mn2s and mn1e=mn2e, and the width of the portion n2 are equal. In this example, the quantization output values O1, O2, O3 and O4 are 0, 85, 170 and 255, and the width of the portion 1 is 85.

Moreover, what is necessary is just to read the same value, when the threshold is stored in the LUT 15.

The memory space of the LUT 15 can be made small.

As mentioned above, the sense of incongruity to which the N-level quantization output value changes except for the white ground and the solidly shaded portion when the input value is the same concentration as the quantization output value, and the graininess becomes good specifically by the portion O2 (85) and O3 (170) arises.

Figure 39:
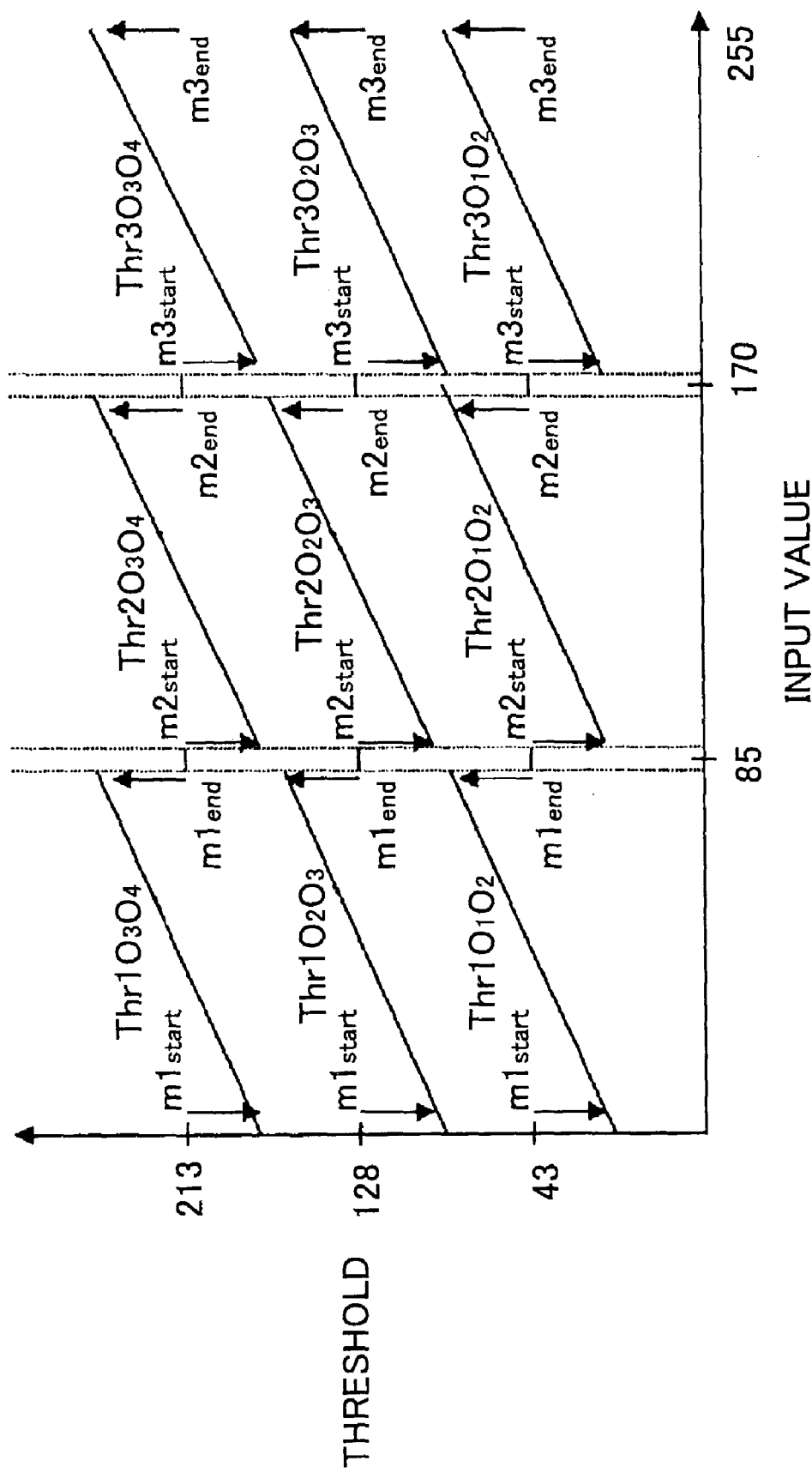
FIG. 39 is a diagram showing an example of the threshold in which a fixed threshold value is set up only for the portion of the input value where the gradation level difference arises.

However, in order to perform the processing (the mask addition processing mentioned above) and the processing which fluctuates the threshold mentioned later) for suppressing the sense of incongruity in the changing portion as shown in FIG. 37 and FIG. 39, only the changing portion (the gradation value 85 or 170) in which the sense of incongruity occurs may set up the threshold independently (the fixed threshold values 43, 128 and 213).

In the present embodiment, the delay of the dot occurrence near the starting point and the end point of each portion is solved by dividing the M-level gradation into the (N−1) portions and setting up the threshold in each portion according to the concentration.

Alternatively, only the specific portion may be good when the threshold is set up in the middle of the quantization output values O1 and O2, for example.

In the output device, such as the ink-jet printing device, the multi-gradation representation is carried out using the dot modulation or shade ink. In this case, when the "raw γ" is measured and the "raw γ" changes rapidly in the solidly shaded portion, even if it is processed by using the fixed threshold, the quality of image does not deteriorate so much.

In the portion where the fixed threshold is set up, in order that there may be no processing which determines the threshold with reference to concentration, the processing speed becomes high, and the total throughput is improved.

Figure 40:
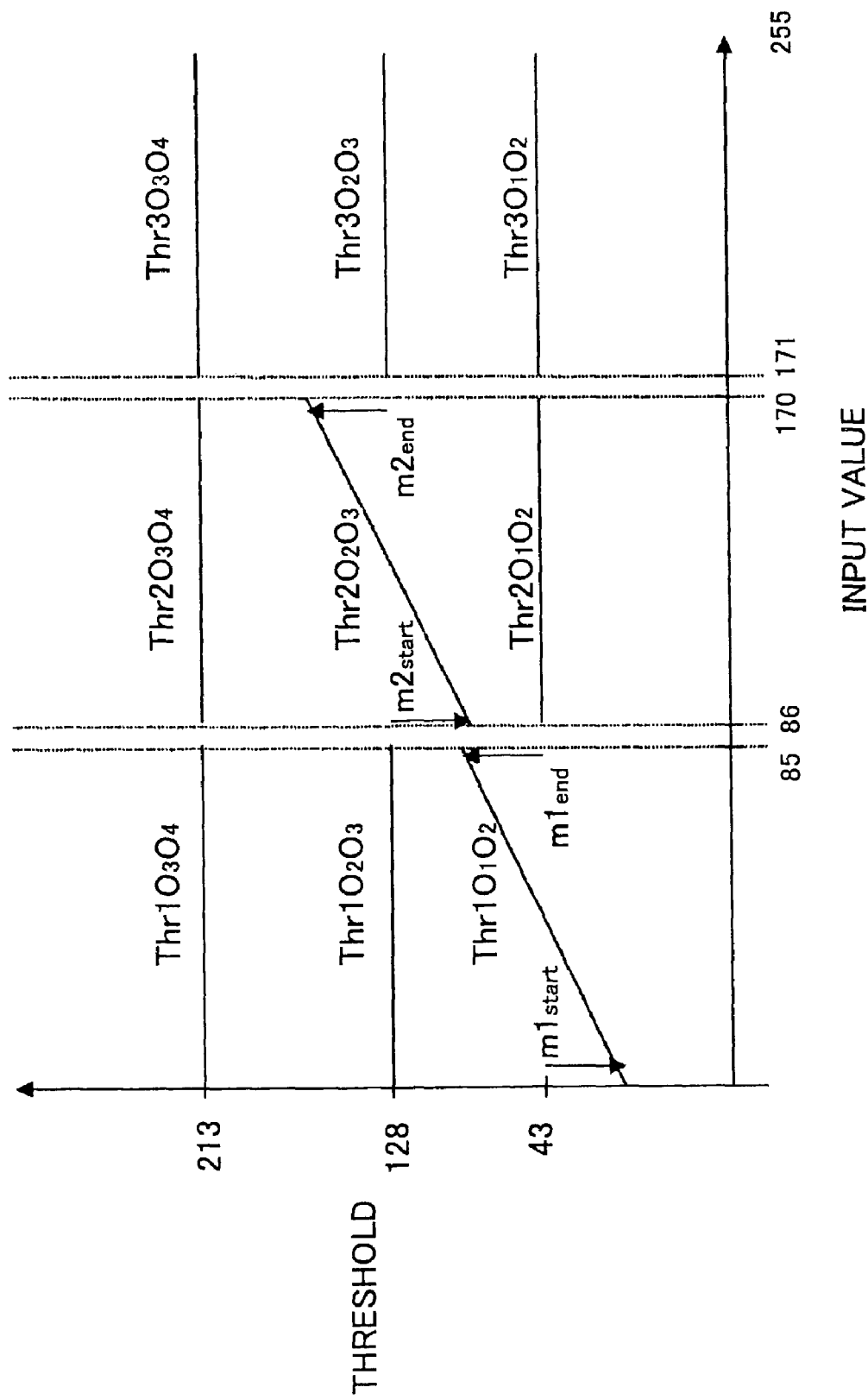
FIG. 40 is a diagram showing an example of the threshold in which a sloped threshold is set up for a specific section of the input value.

In the ink-jet printing device using shade ink, only the gradation portion of the small dot output of light ink and dark ink is made into the threshold according to concentration, and the middle dot of dark ink and the gradation of the large dot output are good also as a fixed threshold. The threshold in this case is shown in FIG. 40. FIG. 40 shows an example of the threshold in which a sloped threshold is set up for a specific portion of the input value.

Figure 41:
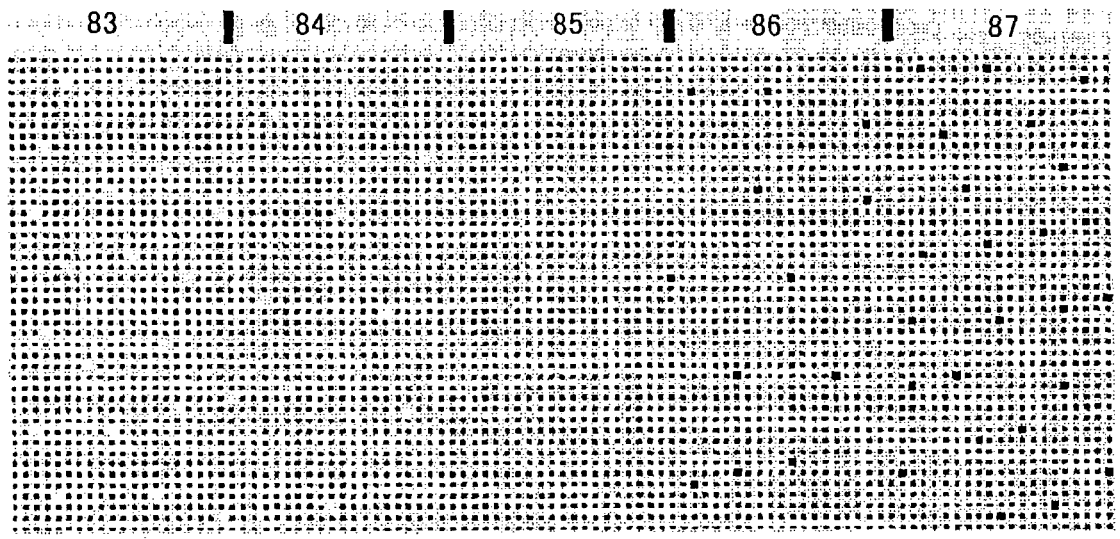
FIG. 41 is a diagram showing the result of the 4-level error diffusion process which is performed by using the threshold shown in FIG. 39.

FIG. 41 shows the result of the 4-level error diffusion process which is performed by using the sloped threshold shown in FIG. 39. As shown in FIG. 41, the O3 appears without delay in the gradation value 86.

Figure 42:
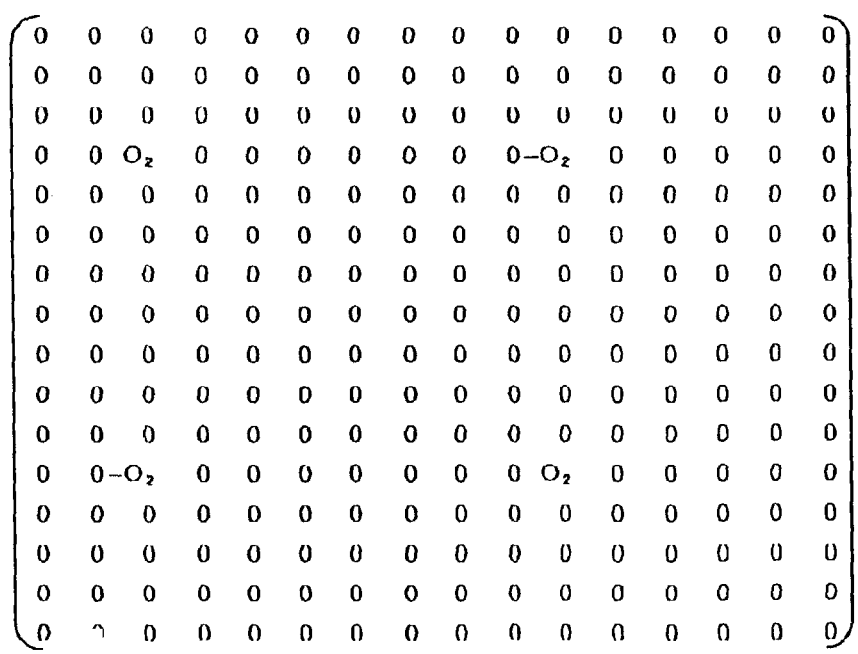
FIG. 42 is a diagram showing the mask noise which is overlapped to the image with the gradation value 85.

FIG. 42 shows the mask noise which is overlapped to the image with the gradation value 85. In the example of FIG. 34, there is shown the processing result in which the mask noise (O2, −O2) is added which the reversal phenomenon of the gradation does not occur as shown in FIG. 42 to the gradation value 85.

The pseudo outline in which the quantization output value specific to the multi-level error diffusion changes is produced in the portion and it does not become conspicuous as shown in FIG. 34.

Next, a description will be given of the edge threshold changing method.

In the error diffusion process using the threshold changed according to the concentration, the fault that the sharpness of the image fell arose and it has become clear to cause the fall of subjectivity evaluation.

Figure 43:
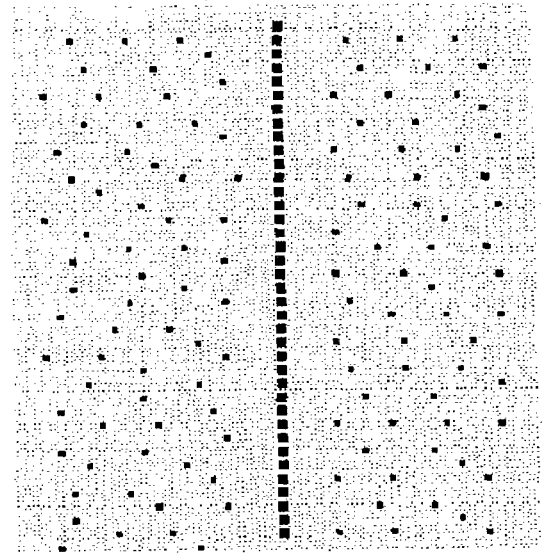
FIG. 43 is a diagram showing the result of the 4-level error diffusion process which is performed by using the fixed threshold of FIG. 35.
Figure 44:
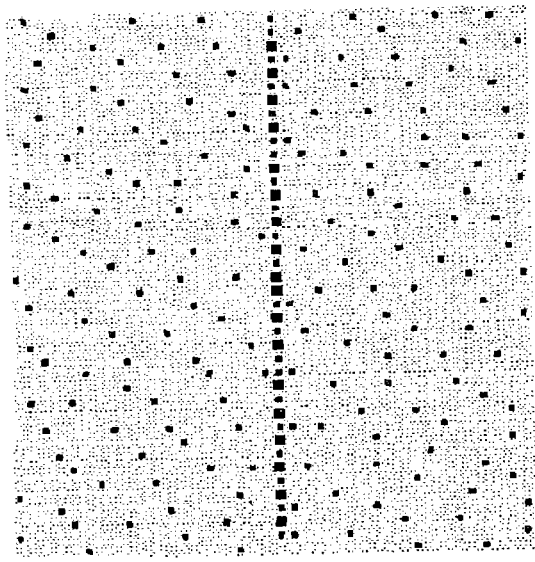
FIG. 44 is a diagram showing the result of the 4-level error diffusion process which is performed by using the varied threshold of FIG. 39.

FIG. 43 shows the result of the 4-level error diffusion process which is performed by the fixed threshold of FIG. 35. FIG. 44 shows the result of the 4-level error diffusion process which is performed by using the varied threshold) of FIG. 39.

In the result of the processing using the change threshold, the dot has not gathered for the line portion compared with the result of the processing which used the fixed threshold.

Although the line portion consists of only O3 at the fixed threshold, the line portion is constituted from the change threshold by O2 and O3.

The dots neighboring on the edge portion do not appear in the fixed threshold. The thin line image is buried in the dots of the natural complexion and the conspicuous effect is prevented for the changed threshold. Thus, as for the changed threshold, the sharpness falls rather than the fixed threshold.

Then, the intensity emphasis processing is performed in order to prevent the degradation of the sharpness of the image produced in the error diffusion process using the threshold changed according to concentration.

The subtraction is performed from the threshold with the value which extracted the amount of edges with the 3×3 Laplacian filter focusing on the target pixel, is made to reverse the agreement of the value which carried out the division in the suitable quantity, and added to the threshold, namely, carried out the division in the suitable quantity, and degradation of the sharpness is prevented.

Figure 45:
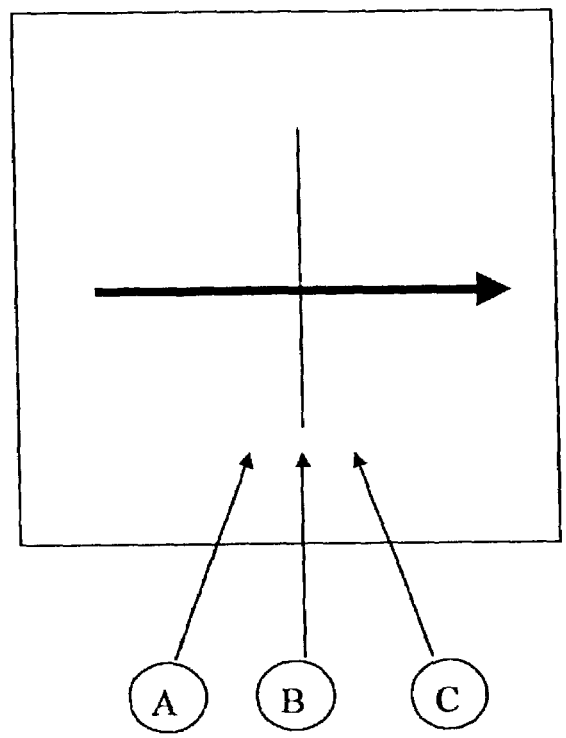
FIG. 45 is a diagram showing an example of a thin-line image.
Figure 46:
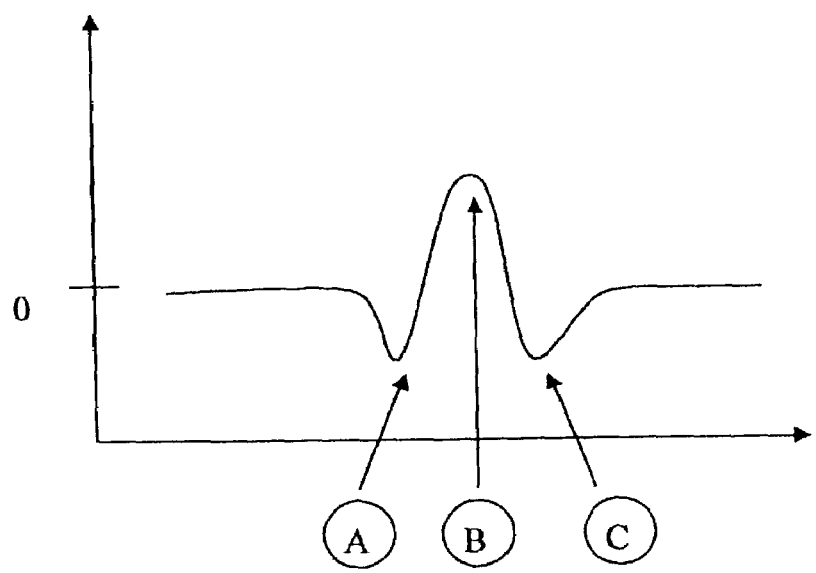
FIG. 46 is a diagram for explaining the result of the processing for the image of FIG. 45 by using the Laplacian filter.

FIG. 45 shows an example of a thin-line image. FIG. 46 is a diagram for explaining the result of the Laplacian processing which is performed for the image of FIG. 45 by using the Laplacian filter. In the image of a 1-pixel thin line with the background concentration 10 (A and C in FIG. 45) and the concentration 128 (B in FIG. 45), the result of the Laplacian process which is performed with the Laplacian filter is shown in FIG. 46.

The A, B and C shown in FIG. 46 are the output values outputted from the Laplacian filter for the positions of the A, B and C of FIG. 45. The output values of the Laplacian filter take the positive value for the edge portion B of the pixel and take the negative value for the portions A and C before and behind the edge portion of the thin line.

It is necessary to make the dots easily appear in the edge portion, and make the dots not easily appear adjacent to the edge portion, in order to make the edge portion conspicuous. By this method, it considers as the sharp image the edge like a thin line.

The ratio of the occurrence of the dots is changed by controlling the threshold using the polarity and the size of the edge portion of the image which are extracted with the Laplacian filter.

In FIG. 46, the amount of edges is changed in a pattern of negative->positive->negative, and it is changed in a pattern of positive->negative->positive by reversing the polarity.

The division of this is carried out by the suitable number, and it is added to a predetermined threshold. The dots neighboring on the edge portion do not easily appear because of the addition of the amount of edges to the predetermined threshold.

In the edge portion (the value according to the predetermined amount of threshold-edges), the dot becomes easy to appear. The degradation of the sharpness is prevented.

This technique is realized even if the gradation value 0 is reversed to the gradation value 255.

The above method only operates the threshold and the overflow does not produce it like edge emphasis processing.

Figures 47, 48:
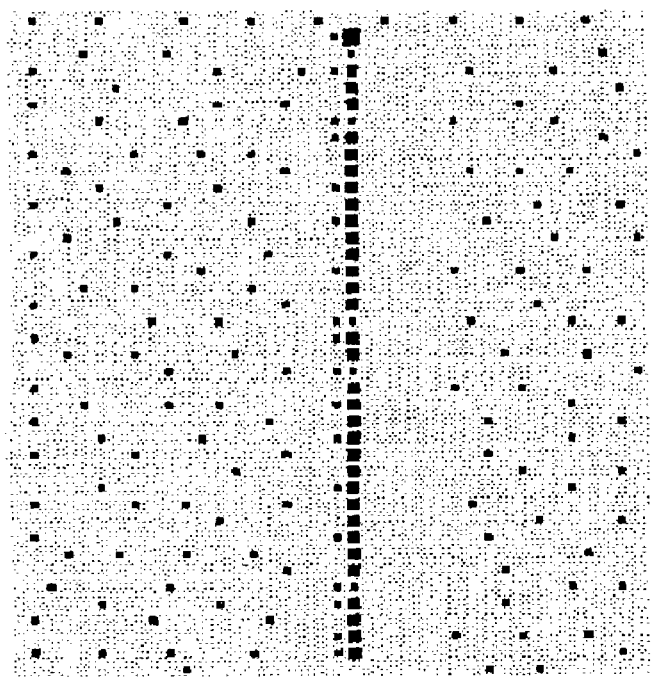
FIG. 47 is a diagram of an example of the 3×3 Laplacian filter.
FIG. 48 is a diagram showing the result of the 4-level error diffusion process which is performed by controlling the threshold of FIG. 39 by using the 3×3 Laplacian filter L8 (x y).

FIG. 47 shows an example of the 3×3 Laplacian filter. The Laplacian filter serves to extract the amount of edges. The image forming device performs the division of the value according to the amount of edges by a suitable number (the value 2 or above), and performs the subtraction of the division result from the threshold which is calculated according to the concentration of the target pixel.

Thereby, in the rising area of the edge portion, the threshold before and after the edge portion by one pixel becomes high, and the dot does not easily appear. In the edge portion, the threshold becomes low, and the dot easily appears. In the falling area of the edge portion, the threshold before and after the edge portion by one pixel becomes low, and the dot does not easily appear. In the edge portion, the threshold becomes high, and the dot easily appears.

FIG. 48 shows the result of the 4-level error diffusion process which is performed by controlling the threshold of FIG. 39 by applying the 3×3 Laplacian filter L8 (x y) thereto. In contrast, FIG. 44 shows the result of the 4-level error diffusion process which is performed by using the threshold of FIG. 39.

As is apparent from FIG. 48, the O3 more concentrates on the line portion when compared with FIG. 44, and the dot does not appear in the second half of the line portion so that the line portion becomes conspicuous.

In the present embodiment, the amount of edges is extracted and the threshold is controlled by the extracted amount of edges. Thus, the dots more concentrate on the edge portion and the dots neighboring on the edge portion do not appear when compared with the image obtained by the threshold gradient method, and therefore the edge portion is conspicuous. Since the amount of edges is extracted and the threshold is changed thereby, this technique is called the edge threshold changing method.

When the 5×5 Laplacian filter is used, the ON (occurrence)/OFF(non-occurrence) of the dots which are located in the vicinity (2 pixels before and after) of the edge portion of a thin line image can be controlled, and it is possible to make the edge portion more conspicuous. However, the line memory having the capacity of five lines is needed for this technique.

Figures 49, 50:
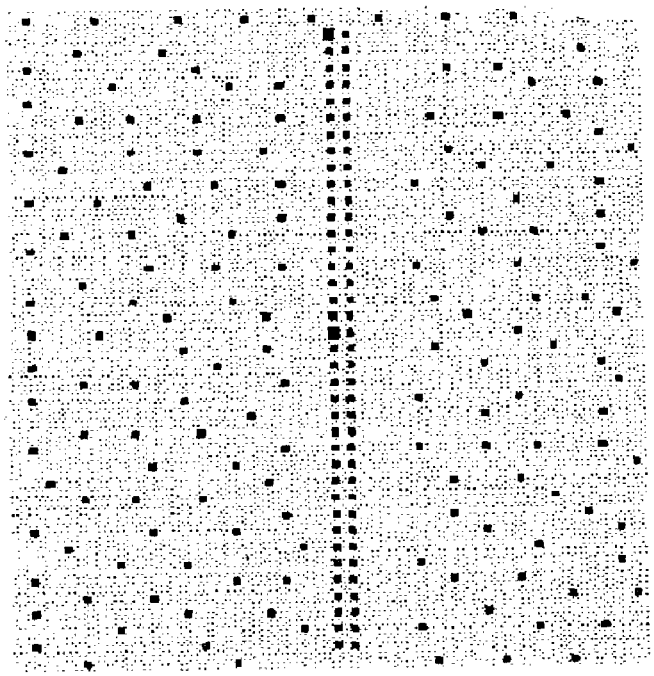
FIG. 49 is a diagram showing an example of the anisotropic Laplacian filter.
FIG. 50 is a diagram showing the result of the 4-level error diffusion process in which the threshold of FIG. 39 is controlled by using the anisotropic Laplacian filter.

Since the 3×3 Laplacian filter also require the capacity of three lines, if the cost reduction is desired and a slight picture quality deterioration is permitted, the sharpness can be recovered by making the Laplacian filter of FIG. 47 into the form of FIG. 49. However, compared with the picture quality that is attached with the 3×3 Laplacian filter, it is slightly inferior in this case.

The anisotropic Laplacian filter shown in FIG. 49 can also detect the edge of a specific direction. When performing the edge detection of the specific direction, the capability of detection of the anisotropic Laplacian filter deteriorates when compared with the 3×3 Laplacian filter.

As for a conspicuous edge portion, such as the gradation values 0 and 128 in the 256-gradation representation, the difference between the anisotropic Laplacian filter and the 3×3 Laplacian filter is negligible in the visual inspection. However, as for an unclear edge portion, such as the gradation values 0 and 10, the anisotropic Laplacian filter has the problem in that the dot becomes easy to appear only in the direction wherein the direction of the propagation of weighted errors by the error diffusion matrix and the direction of the edge detection by the anisotropic Laplacian filter interfere with each other.

However, in any case, with the anisotropic Laplacian filter, the capacity of the line memory needed for the edge detection cam be made to one or two lines from three lines. Therefore, this technique is effective when the amount of recovery of the sharpness is retained, without needing edge extraction capacity so much, and the cost of the line memory is reduced and the computational complexity is reduced from the case of the 3×3 Laplacian filter, in order to attain high speed processing.

FIG. 50 shows the result of the 4-level error diffusion process at the time of controlling the threshold of FIG. 39 by using the anisotropic Laplacian filter L4 (x, y) to the threshold of FIG. 39.

Although the sharpness is not recovered when compared with FIG. 48, the O2 concentrates on the line portion when compared with FIG. 44, and the dot does not appear in the second half of the line portion so that the line portion becomes conspicuous.

The edge threshold changing method is not limited to the N-level error diffusion process, but it can be applied to the 2-level error diffusion process.

The sharpness can be emphasized, even when the sharpness falls by threshold processing according to concentration, as shown in FIG. 36 and FIG. 37.

Even when the threshold used by the output device is in the form of a special curve, the sharpness can be emphasized similarly.

A description will be provided of the preferred embodiments of the present invention with reference to the accompanying drawings.

First, the image forming device and method in the first preferred embodiment will be explained with reference to FIG. 51 and FIG. 52.

Figure 51:
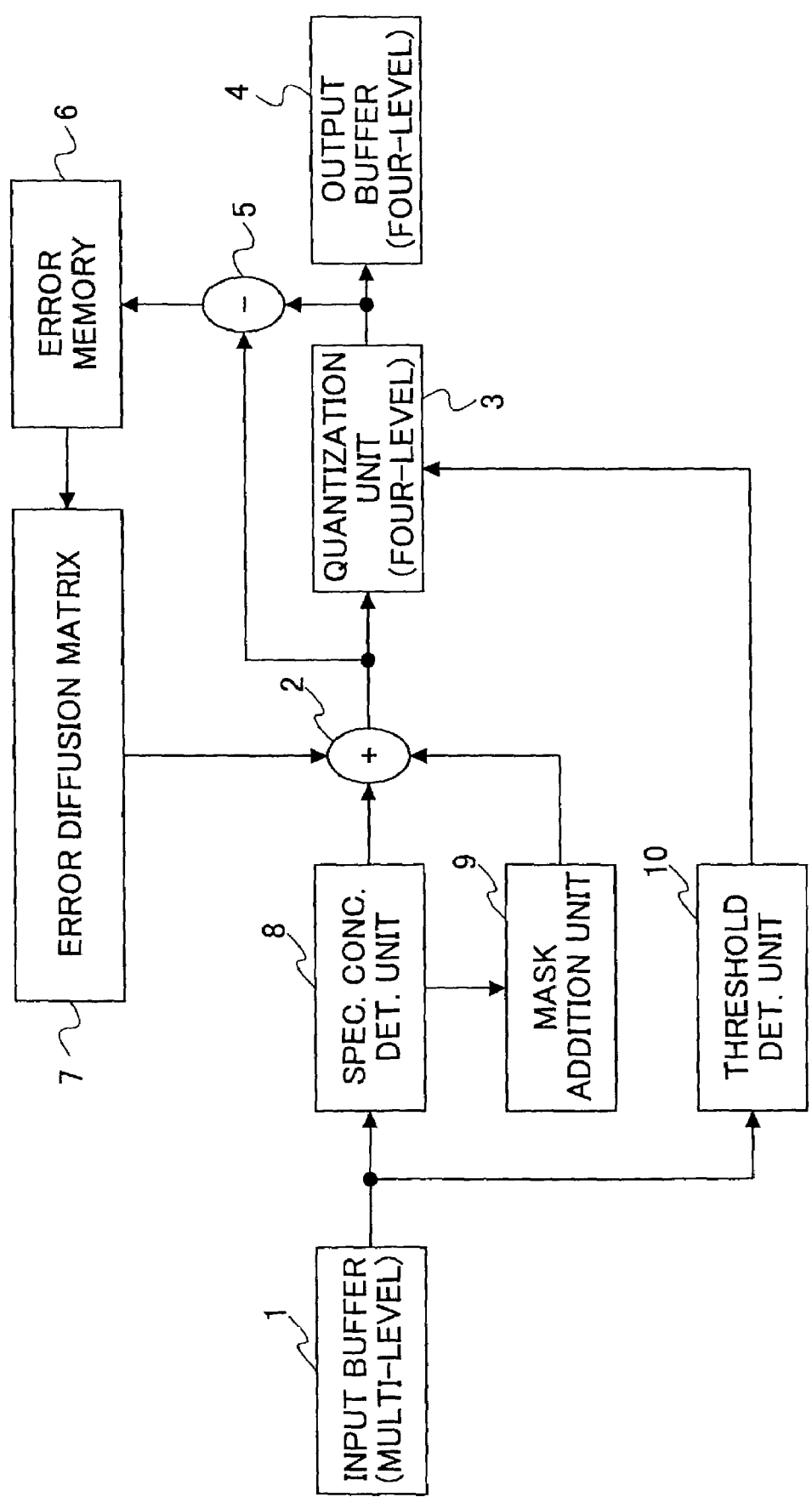
FIG. 51 is a block diagram of the first preferred embodiment of the image forming device of the present invention which performs a multi-level error diffusion process.

FIG. 51 shows the composition of the first preferred embodiment of the image forming device which performs the multi-level error diffusion process according to the present invention.

Figure 1:
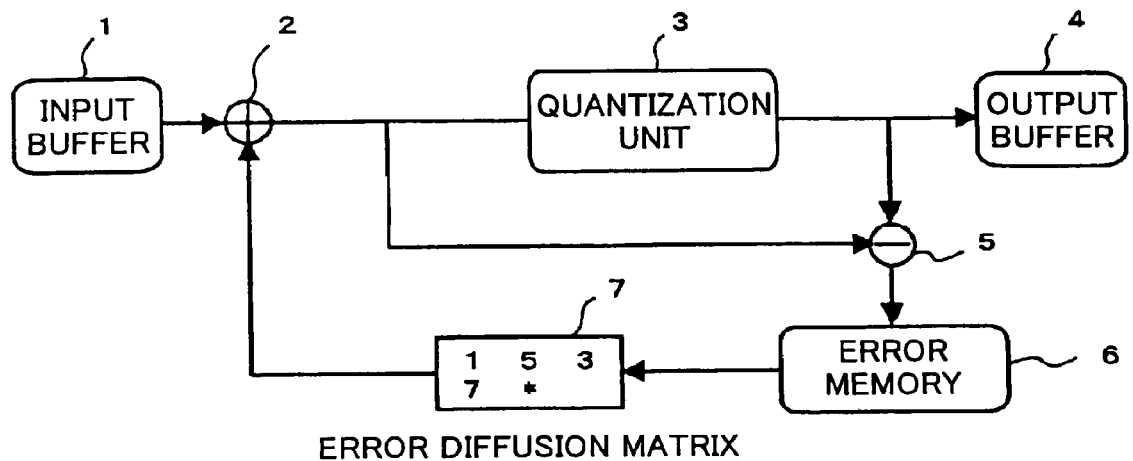
FIG. 1 is a block diagram showing a conventional image forming device which performs an error diffusion process.
Figure 2:
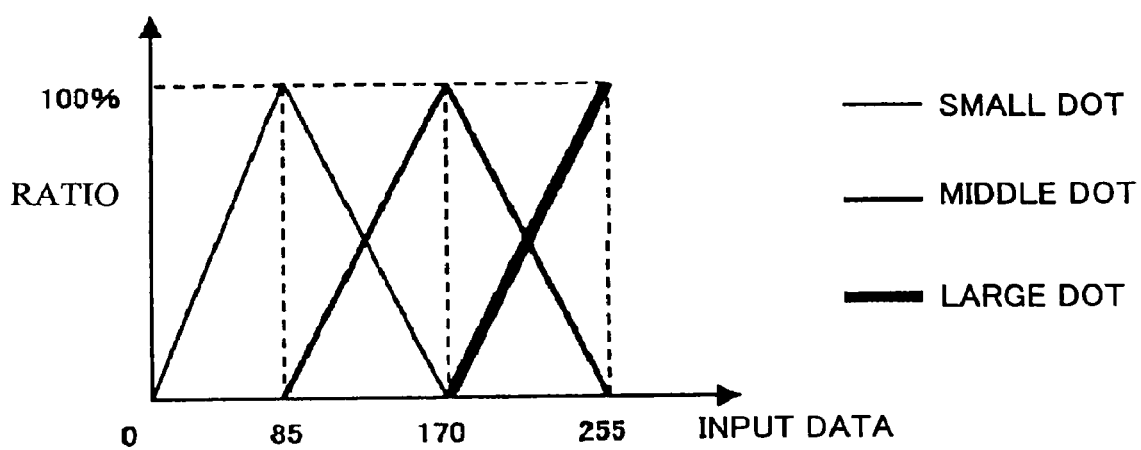
FIG. 2 is a diagram for explaining the ratio of output dots in the case of the 4-level error diffusion process.

In FIG. 51, the input buffer (multi-level) 1, the adder 2, the quantization unit (four-level) 3, the output buffer (four-level) 4, the subtractor 5, the error memory 6, and the error diffusion matrix 7 in the present embodiment are essentially the same as the corresponding elements in the previous embodiment of FIG. 1, and a description thereof will be omitted.

In the present embodiment, the specific concentration determination (SPEC. CONC. DET.) unit 8, the mask addition unit 9, and the threshold determination (DET.) unit 10 are provided further.

Figure 52:
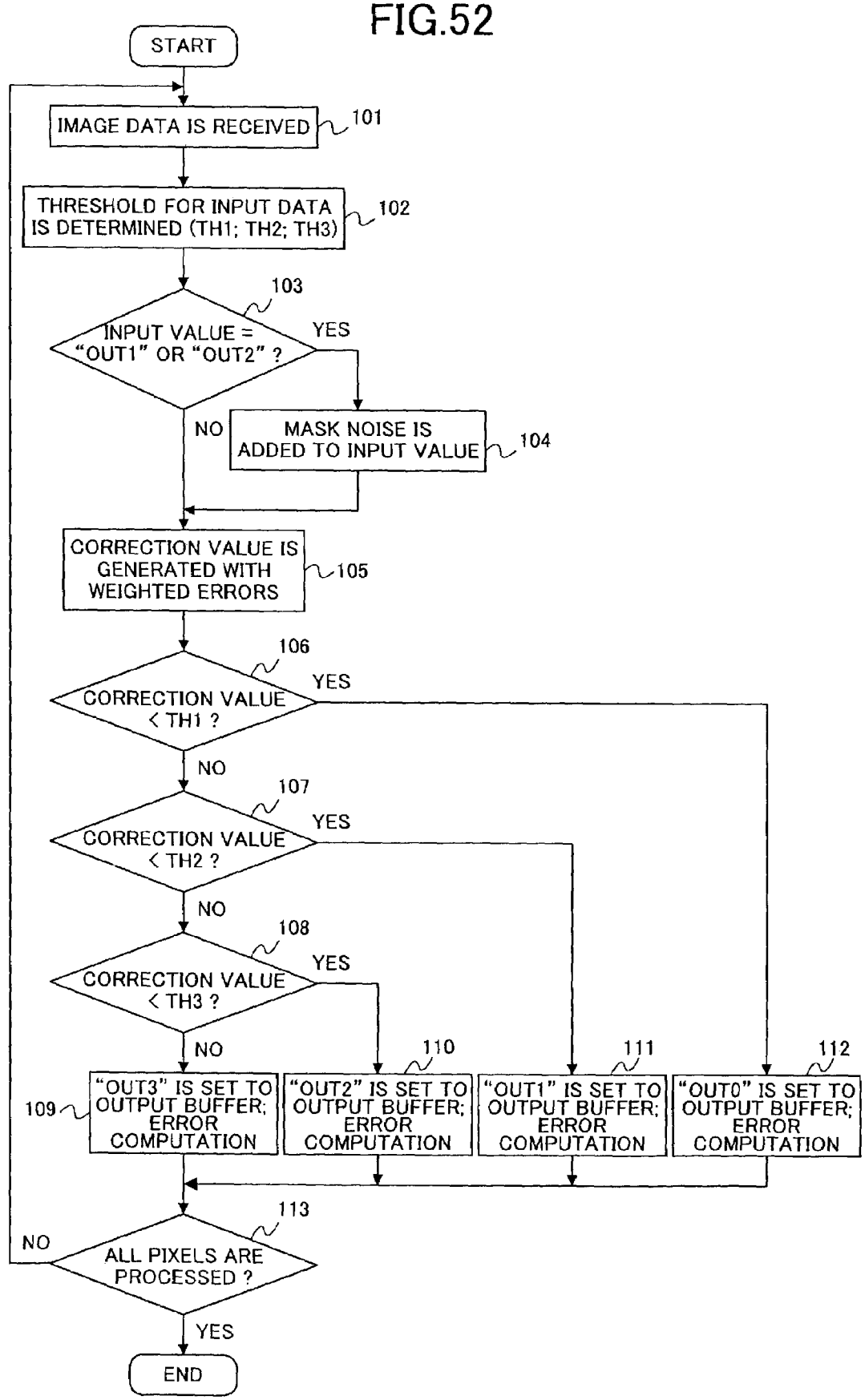
FIG. 52 is a flowchart for explaining operation of the image forming device of the present embodiment.

FIG. 52 is a flowchart for explaining operation of the image forming device of the present embodiment. The multi-level error diffusion process shown in FIG. 52 is carried out by the CPU (not shown) of the image forming device of the present embodiment.

The CPU causes the input buffer 1 to receive the image data (step 101). The CPU causes the threshold determination unit 10 to determine the thresholds Th1, Th2, and Th3 according to the input value for every input pixel (target pixel) by controlling the threshold determination unit 10 (step 102). The amount of the thresholds is determined based on the threshold gradient method which is previously described with FIG. 33, FIG. 39, etc.

Figure 53:
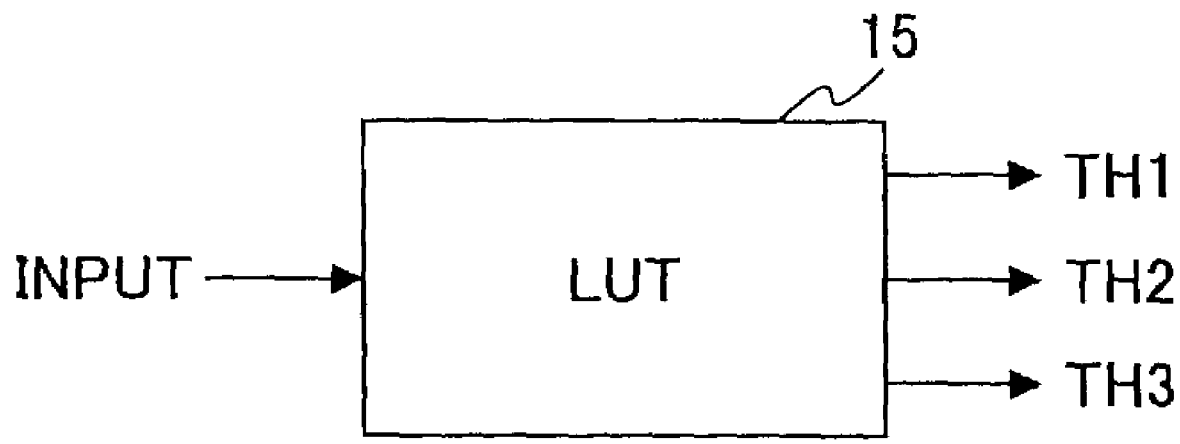
FIG. 53 is a block diagram of a threshold determination unit which is constituted by the lookup table (LUT).

For example, when the threshold determination unit 10 is provided with the LUT (lookup table) 15 as shown in FIG. 53, the correspondence between the input value IN and the thresholds Th1, Th2 and Th3 is defined in the LUT 15. The address of the LUT 15 is obtained by taking the input value (IN) from the received image data. When the input value (IN) is supplied to the LUT 15, the thresholds Th1, Th2 and Th3 corresponding to the input value (IN) are outputted from the LUT 15. Then, the thresholds Th1, Th2 and Th3 are supplied from the threshold determination unit 10 to the quantization unit 3.

| IN | Th1 | Th2 | Th3 |
|----|-----|-----|-----|
| 0  | 10  | 96  | 180 |
| 1  | 11  | 97  | 214 |
| 2  | 12  | 98  | 215 |
| 3  | 13  | 99  | 216 |
| ... | ... | ... | ... |
| 85 | 43  | 128 | 213 |
| 86 | 10  | 96  | 180 |
| ... |     |     |     |

After the step 102 is performed, the CPU causes the specific concentration determination unit 8 to determine whether the input value (the gradation value) of the target pixel is equal to 85 or 170 (step 103). In this case, the specific concentration "OUT1"=85 and the specific concentration "OUT2"=170.

When the input value (In) is equal to 85 or 170 (the result at step 103 is affirmative), the CPU causes the mask addition unit 9 to add the mask noise to the input value according to the mask addition method (step 104). In the mask addition unit 9, the calculations X1=X mod 16 and Y1=Y mod 16 are performed from the position (X, Y) of the target pixel. The mask addition unit 9 makes reference to the 16×16 memory (ROM) which stores the contents of FIG. 12, by using the calculated X1 and Y1 as the memory address.

Any of 0, 1 and −1 is outputted from the 16×16 memory, and the output value of the memory is multiplied by 85 into any of 0, 85 and −85. The result of the multiplication (the mask noise) output from the mask addition unit 9 is supplied to the adder 2, and it is added to the input value (IN=IN+Mask (X1, Y1)) in the adder 2.

Specifically, when the input value is equal to 85, the mask addition unit 9 outputs any of 170, 85 and 0 to the adder 2, and, when the input value is equal to 170, the mask addition unit 9 outputs any of 255, −170 and 85 to the adder 2.

Alternatively, the contents of FIG. 23 or FIG. 59 may be stored in the 16×16 memory (ROM), and the mask addition process may be performed in the same manner also in such alternative embodiment. FIG. 59 shows the mask which specifies the apperance position and the number of the dots. If the size of the mask as shown in FIG. 23 and FIG. 59 is set up with the 2's exponential size (or, 2×2, 4×4, 8×8, 16×16, 32×32 - - ), the address computation can be performed at high speed.

Figures 61, 62:
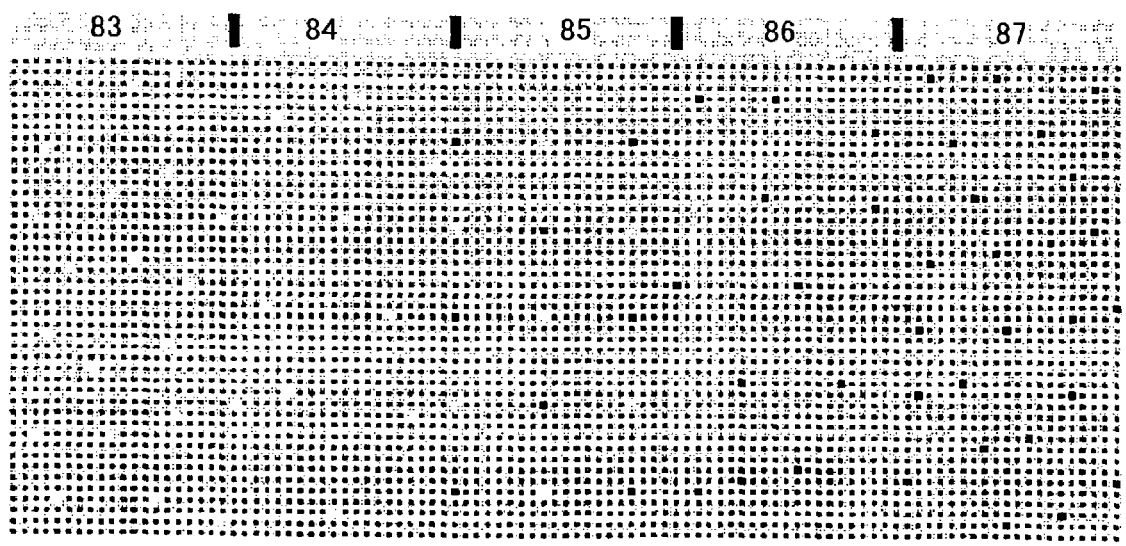
FIG. 61 is a diagram showing the 8×8 mask.
FIG. 62 is a diagram showing the result of the four-level error diffusion process in which the mask of FIG. 59 and the sloped threshold of FIG. 33 or FIG. 39 are used.

FIG. 61 shows the mask of 8×8 size. When the mask of FIG. 61 is used, it is possible that one blank dot and one middle dot appear for every 64 pixels in the image with the gradation value 85. As is described previously, if the size of the mask is set up with the 2's exponential size, the address computation can be performed at high speed. It is necessary to set up the mask size such that the phenomenon of the gradation reversal does not occur according to the number of the multi-level quantization.

Referring back to FIG. 52, when the specific concentration determination unit 8 determines that the input value is not equal to the specific concentration 85 or 170 (or when the result at the step 103 is negative), the input value is supplied to the adder 2 without adding the mask noise.

In the adder 2, the weighted errors, which are already calculated with the error diffusion matrix 7 with respect to the neighboring pixels of the target pixel, and the input value are added together, so that a correction value is generated (step 105).

Specifically, when the input value is equal to the specific concentration, in the adder 2, the weighted errors from the error diffusion matrix 7 and the output value from the mask addition unit 9 are added together. When the input value is not equal to the specific concentration, in the adder 2, the weighted errors from the error diffusion matrix 7 and the input value are added together.

The correction value from the adder 2 is supplied to the quantization unit 3. In the quantization unit 3, the correction value is compared with the thresholds Th1, Th2 and Th3 that are determined by the threshold determination unit 10. As shown in FIG. 52, the CPU causes the quantization unit 3 to determine whether the correction value is less than each of the thresholds Th1, Th2 and Th3 (steps 106, 107 and 108).

When the correction value is less than Th1 (or when the result at step 106 is affirmative), the output value 0 ("OUT0"; the blank dot) is set to the output buffer 4, and the difference between the value before quantization and the value after quantization is calculated by the subtractor 5, and the resulting error from the subtractor 5 is stored into the error memory 6 at the position of the target pixel (step 112).

When the correction value is larger than Th1 (or the result at the step 106 is negative) and it is less than Th2 (or the result at the step 107 is affirmative), the output value 85 ("OUT1"; the small dot) is set to the output buffer 4, and the error computation that is the same as that of the step 112 is performed (step 111).

When the correction value is larger than Th2 (or the result at the step 107 is negative) and it is less than Th3 (or the result at the step 108 is affirmative), the output value 170 ("OUT2"; the middle dot) is set to the output buffer 4, and the error computation that is the same as that of the step 112 is performed (step 110).

When the correction value is larger than Th3 (or the result at the step 108 is negative), the output value 255 ("OUT3"; the large dot) is set to the output buffer 4, and the error computation tat is the same as that of the step 112 is performed (step 109)

When one of the steps 109 through 112 is performed, the CPU determines whether the processing of all the pixels of the input image is performed (step 113). When the result at the step 113 is negative, the control of the CPU is returned to the above step 101. Otherwise the multi-level error diffusion process of FIG. 52 ends.

By adding the mask noise to the input value, the similar process may be carried out for the 2-level error diffusion process without the delay of the dot generation near the solidly shaded portion or the highlight portion.

In the case of the 2-level error diffusion process, the processing flow of FIG. 52 may be modified as follows. In the step 102, the threshold Th1 (=128) is determined for the input data. In the step 103, the input value is determined as being equal to 1 or 254. When the input value is equal to 1, the matrix of FIG. 19 is selected. When the input value is equal to 254, the matrix of FIG. 18 is selected. In the step 104, the value (O2 or −O2) of the matrix position corresponding to the input pixel position is read. In the step 105, it is added to the input value. In the following steps, the correction value is compared with the threshold Th1, and the output value 0 or 255 is set to the output buffer 4, and the error is calculated.

FIG. 62 shows the result of the 4-level error diffusion process which is performed according to the flowchart of FIG. 52 by using the sloped threshold of FIG. 33 or FIG. 39 and the mask of FIG. 59.

In the gradation value 85, the middle dot and the blank dot have appeared-in the position shown in FIG. 59. In addition, the sloped threshold is used in the present embodiment, but it is possible to carry out the mask addition processing using the fixed threshold.

A general-purpose computer system may be used to implement the image forming device and method of the present embodiment, and it is possible to carry out the same by software.

When carrying out the by software, a computer program which realizes the image forming device and process (FIG. 52) of the present embodiment may be stored onto a computer-readable storage medium or recording medium. The computer program is read from this recording medium and loaded into the computer system, and then the error diffusion process of the present embodiment may be executed by the CPU of the computer system according to the program.

The image forming device and the method of the present invention is carried out. The image data is the image data read from the scanner or the like, or the image data which is beforehand prepared and stored in the hard disk or the like. Or the image data may be the image data that is received through the network. The processing result is outputted to the printer, the hard disk or the like, and it may be transmitted to an external device (the printer, etc.) through the network.

Next, a description will be given of the second preferred embodiment of the image forming device and method of the invention.

In the previous embodiment, the position where the mask noise is added to the input value is predetermined in advance, and the regularity of the addition position is held. However, in the present embodiment, the addition position is determined at random by using a random number.

Figure 54:
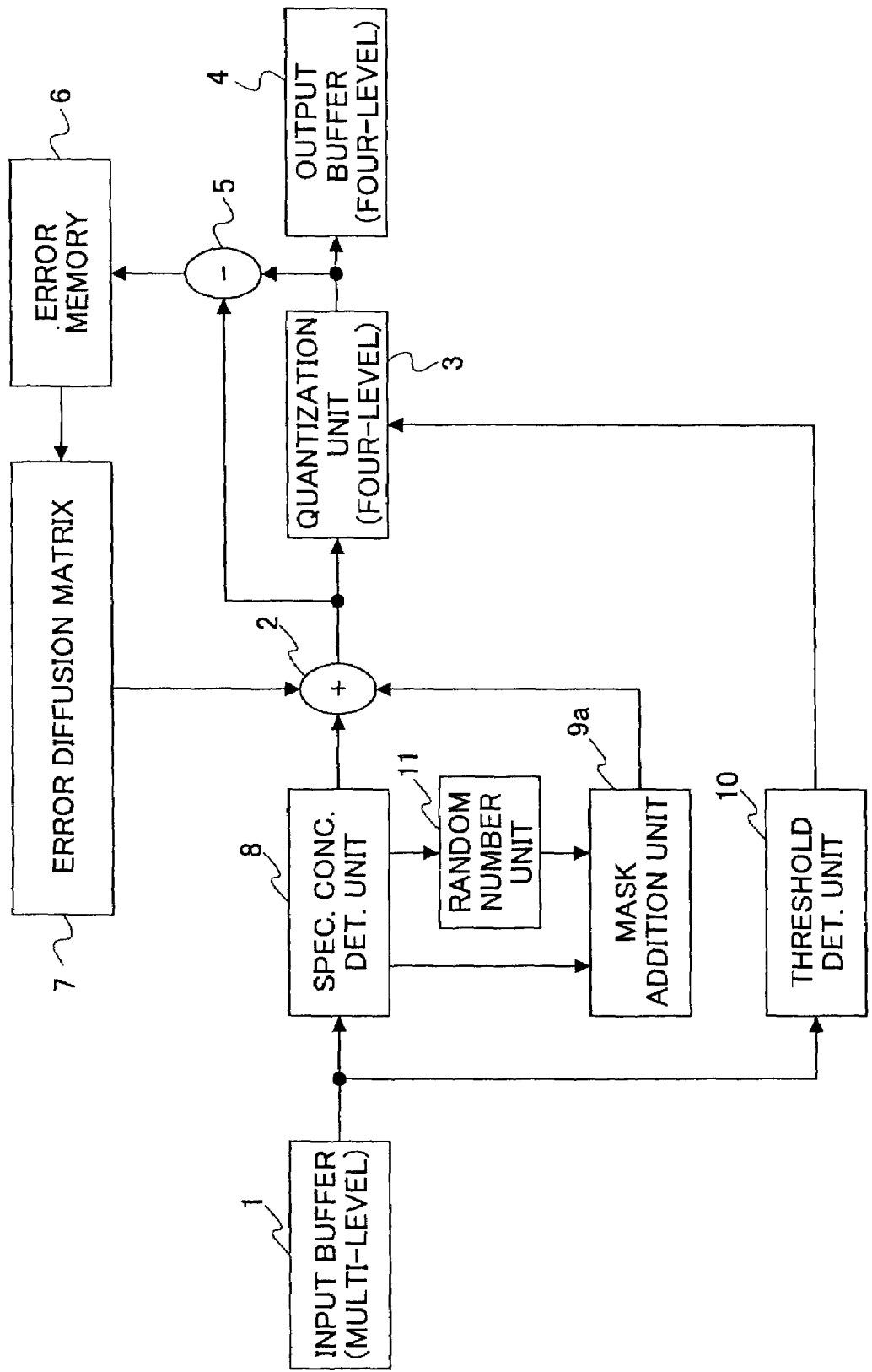
FIG. 54 is a block diagram of the second preferred embodiment of the image forming device of the invention which performs a multi-level error diffusion process.

FIG. 54 shows the composition of the second preferred embodiment of the image forming device. As shown in FIG. 54, in the present embodiment, the random number unit 11 is further provided in addition to the composition of the embodiment of FIG. 51. The mask addition unit 9a is modified to receive both the output of the specific concentration determination unit 8 and the random number output by the random number unit 11.

Figure 55:
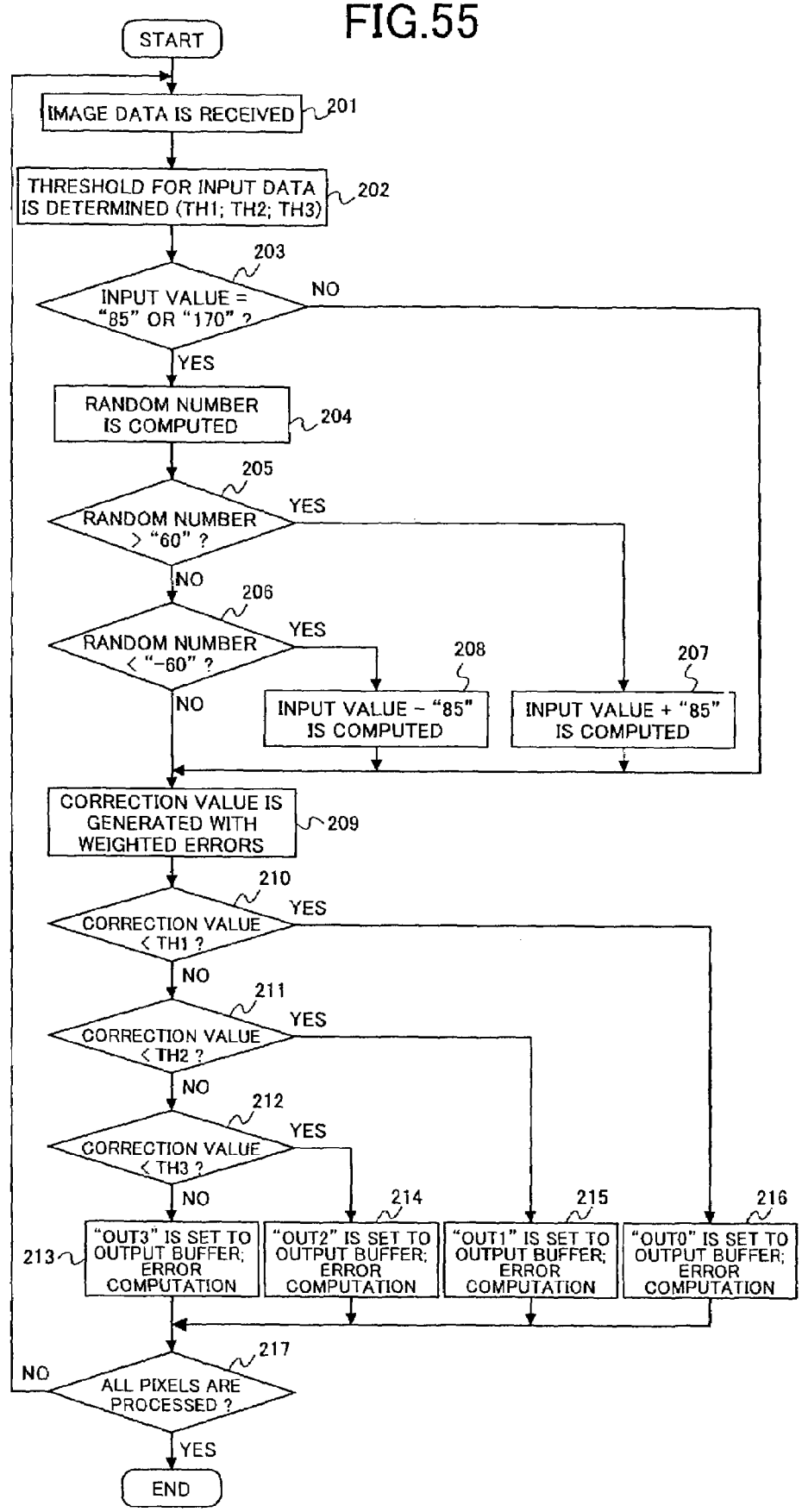
FIG. 55 is a flowchart for explaining operation of the image forming device of the present embodiment.

FIG. 55 is a flowchart for explaining operation of the image forming device of the present embodiment. The multi-level error diffusion process shown in FIG. 55 is carried out by the CPU (not shown) of the image forming device of the present embodiment.

As shown in FIG. 55, the steps 201 to 203 in the present embodiment are the same as the steps 101 to 103 in the previous embodiment of FIG. 53, and a description thereof will be omitted.

When the input value is equal to 85 or 170 (or when the result at the step 203 is affirmative), the CPU causes the random number unit 11 to calculate a random number and output the same to the mask addition unit 9a (step 204).

The random number unit 11 in the present embodiment is a circuit which outputs the value of a random number in a range of −64 to +64. For the sake of convenience, it is assumed that the random number output by the random number unit 11 takes the distribution of occurrence probability as shown in FIG. 56.

When it is desired to make two middle dots and two blank dots appear per every 256 pixels of the image with the gradation value 85 the occurrence probability of each of the blank dot and the middle dot in the case of the gradation value 85 is set to 2/256.

Figure 56:
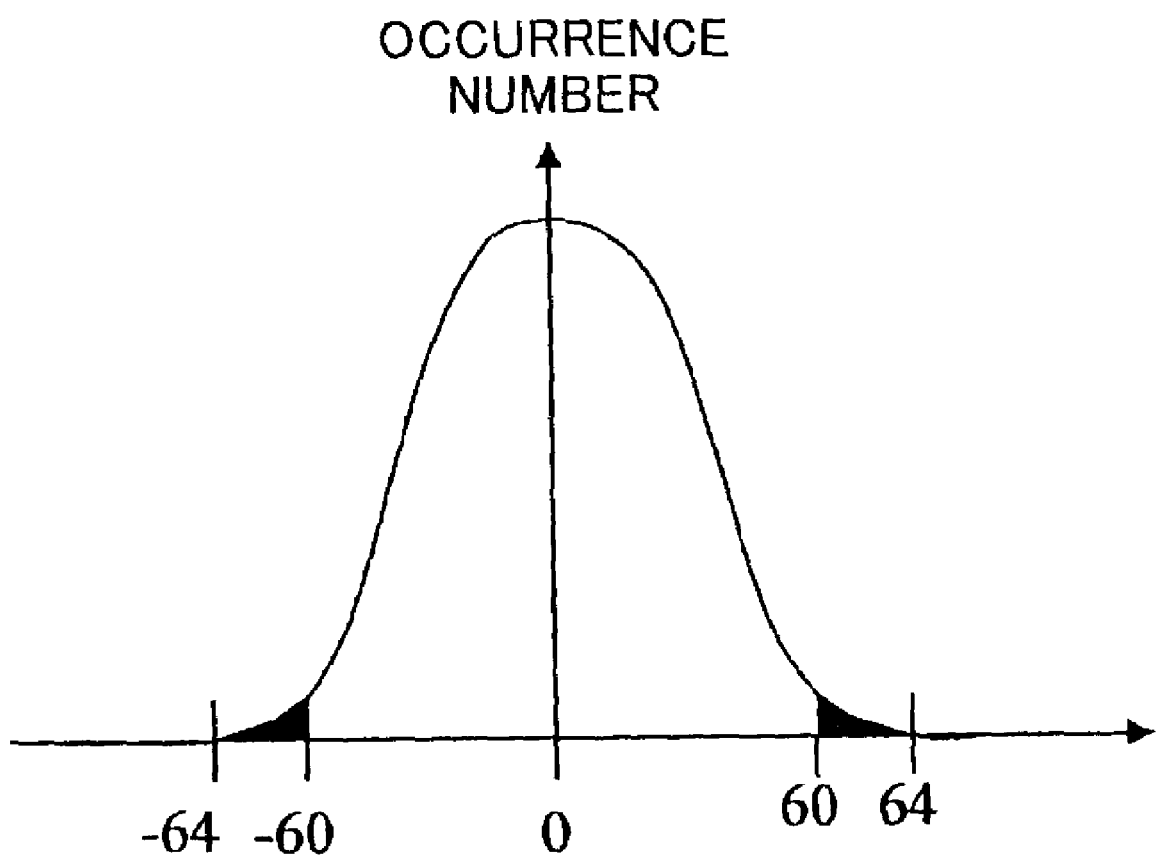
FIG. 56 is a diagram showing the occurrence probability distribution of the random number which returns the value in a range of −64 to +64.

Therefore, the random number unit 11 which takes the occurrence distribution shown in FIG. 56 is provided such that (the area of the solidly shaded portion)/(the whole area of the distribution)=2/256. As shown in FIG. 56, if the probability which outputs the random number ranging from +60 to +64, and the probability which outputs the random number ranging from −64 to −60 are set to 2/256, respectively, the middle dot and the blank dot will be outputted to the position indicated by the random number as the result of the error diffusion process.

When the output value of the random number unit 11 is larger than +60 (or when the result at the step 205 is affirmative), the CPU causes the mask addition unit 9a to perform the addition of the value 85 to the input value (step 207). In this case, the calculated input value from the mask addition unit 9a is supplied to the adder 2 so that the middle dot will appear. When the input value is 85, the middle dot (170) will be outputted, and when the input value is 170, the large dot (255) will be outputted.

When the output value of the random number unit 11 is less than +60 (or the result at the step 205 is negative) and larger than −60 (or the result at the step 206 is affirmative), the CPU causes the mask addition unit 9a to perform the subtraction of the value 85 from the input value (step 208). In this case, the calculated input value from the mask addition unit 9a is supplied to the adder 2 so that the blank dot will appear.

When the result at the step 206 is negative or when one of the steps 207 and 208 is performed, the control of the CPU is transferred to the following step 209. Since the subsequent steps 209 through 217 in the present embodiment are the same as the steps 105 through 113 in the previous embodiment of FIG. 52, a description thereof will be omitted.

Next, a description will be given of the third preferred embodiment of the image forming device and method of the invention.

Figure 57:
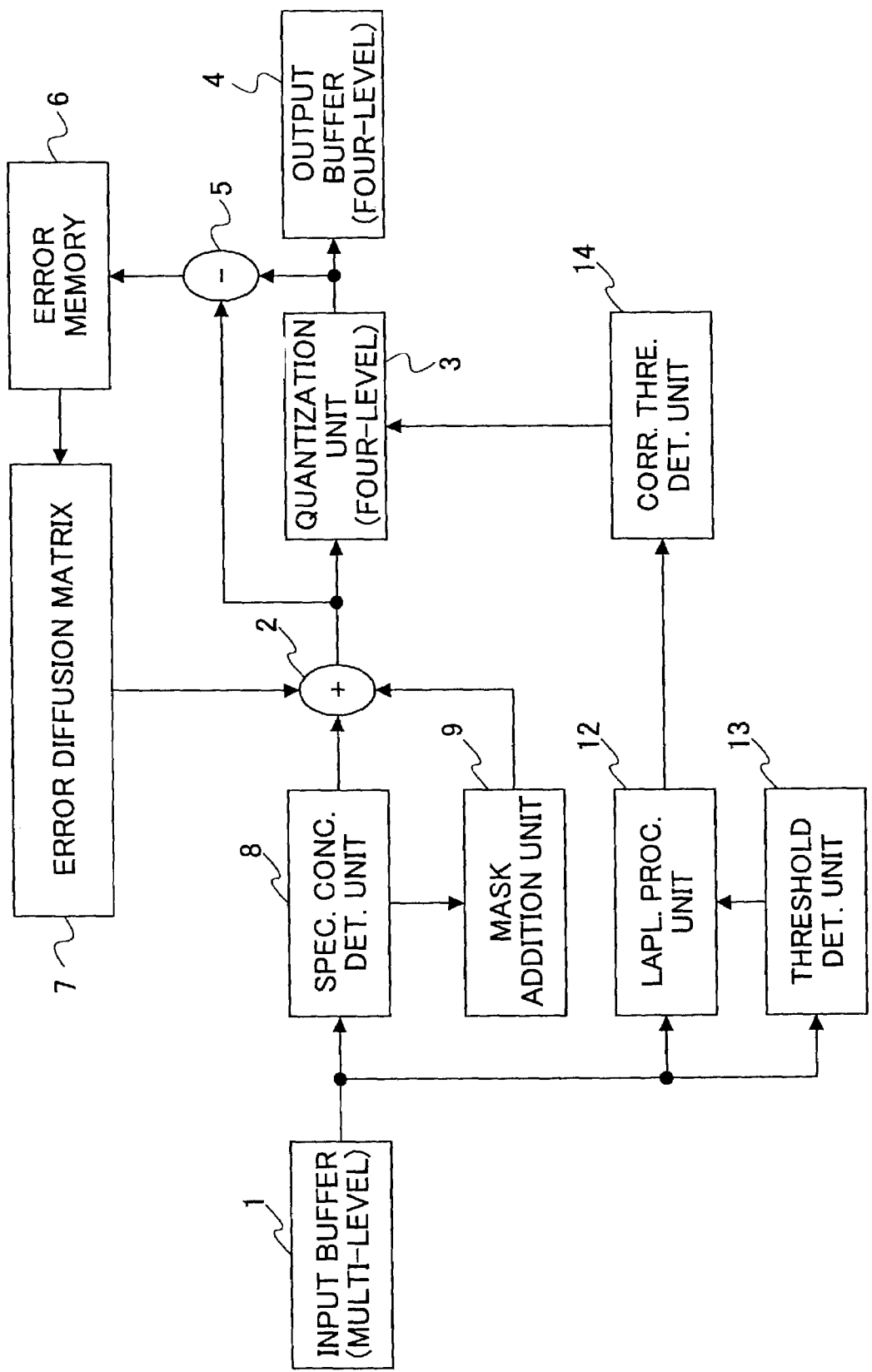
FIG. 57 is a block diagram of the third preferred embodiment of the image forming device of the invention.

FIG. 57 shows the composition of the present embodiment of the image forming device of the invention.

In the embodiment of FIG. 57, the threshold determination unit 10 in the previous embodiment is replaced by the Laplacian processing (LAPL. PROC.) unit 12, the line memory (or the threshold determination unit) 13, and the corrected threshold determination (CORR. THRE. DET.) unit 14.

Figure 58:
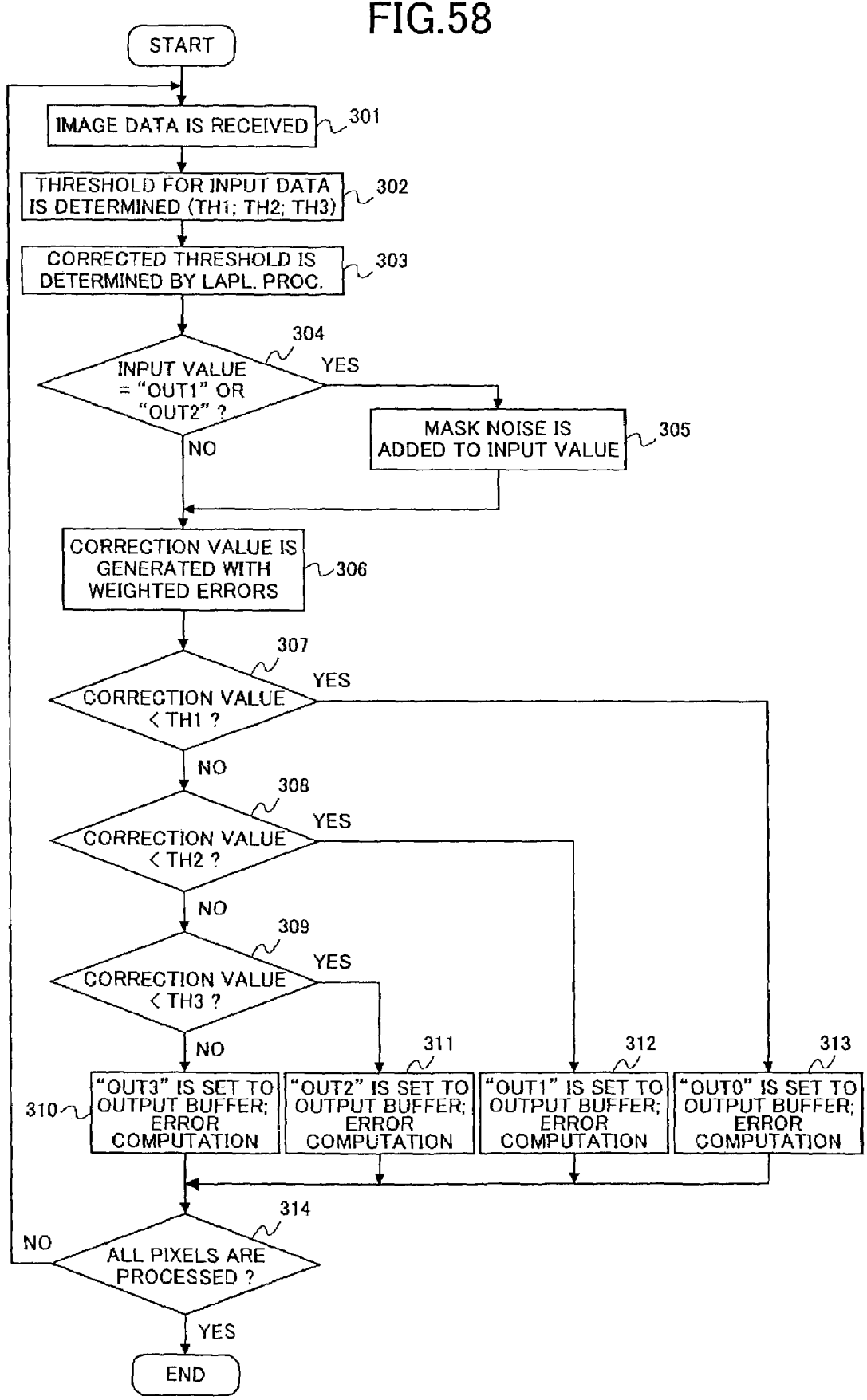
FIG. 58 is a flowchart for explaining operation of the image forming device of the present embodiment.

FIG. 58 is a flowchart for explaining operation of the image forming device of the present embodiment. The multi-level error diffusion process shown in FIG. 58 is carried out by the CPU (not shown) of the image forming device of the present embodiment.

In the present embodiment, the steps 301 and 302 are the same as the steps 101 and 102 in the previous embodiment of FIG. 52, and a description thereof will be omitted.

The CPU causes at the step 302 the threshold determination unit 13 to determine the threshold Th of the target pixel similarly as in the previous embodiment.

After the step 302 is performed, the CPU causes at the step 303 the Laplacian processing unit 12 to calculate the value (the value according to the edge amount) of the Laplacian processing by performing the convolution processing with the Laplacian filter of FIG. 47 while accessing the line memory 13 in which the image data for the three lines focused on the target pixel is stored.

The value of the Laplacian processing is subtracted from the threshold which is determined at the step 302, so that the amount of corrected threshold is determined at the step 303. Such corrected threshold is used in the subsequent steps in FIG. 58.

Since the subsequent steps 304 through 314 in the present embodiment are the same as the steps 103 through 113 in the previous embodiment of FIG. 52, a description thereof will be omitted.

As previously described with FIG. 46, in the edge portion B, the value of the Laplacian processing is positive. When the target pixel lies in the edge portion, the amount of the corrected threshold (which is equal to the threshold Th minus the value of the Laplacian processing) is used, and it is smaller than the threshold Th determined at step 302. The above-mentioned value is determined by the corrected threshold determination unit 14 in the present embodiment, and the dot in the edge portion becomes easy to appear.

On the other hand, in the edge portion circumferences A and C (FIG. 46), the value of the Laplacian processing is negative. When the target pixel lies in the edge portion circumference, the amount of the corrected threshold (which is equal to the threshold Th plus the value of the Laplacian processing) is used, and it is larger than the threshold Th which is determined at the step 302. The above-mentioned value is determined by the corrected threshold determination unit 14 in the present embodiment, and the dots neighboring on the edge portion do not easily appear.

In the foregoing, the preferred embodiments of the present invention has been described, and it is a matter of course to easily extend the 4-level error diffusion process to the N-level error diffusion process-according to the present invention.

As described in the foregoing, it is possible to carry out the present invention by hardware. Moreover, a general-purpose computer system may be used and it is possible to carry out the present invention by software. When carrying out the present invention by software, the program which realizes the image forming function and procedure of the present invention (FIGS. 52, 55, and 58) is recorded on the record medium etc., and the image forming function of the present invention is carried out by reading the program into the computer system from this record medium etc., and performing by the CPU.

The image data is the image data read from the scanner etc., and the image data beforehand prepared for the hard disk etc. Or the image data may be the image data received through the network.

The processing result is outputted to the printer, the hard disk, etc., or is outputted to the external devices (printer etc.) through the network.

The present invention is not limited to the above-described embodiments, and variations and modifications may be made without departing from the scope of the present invention.

Further, the present invention is based on Japanese priority application No. 2002-15862, filed on Jan. 24, 2002, Japanese priority application No. 2002-15863, filed on Jan. 24, 2002, and Japanese priority application No. 2002-73014, filed on Mar. 15, 2002, the entire contents of which are hereby incorporated by reference.

What is claimed is:

1. An image forming device in which each pixel of an M-level gradation input image is quantized into one of N levels (M>N≧2) through an error diffusion process, comprising:
- a threshold determination unit determining a threshold value according to a gradation value of a target pixel of the M-level gradation input image before quantization;
- a specific concentration determination unit determining whether the gradation value of the target pixel is equal to a specific concentration which indicates one of the N levels after quantization;
- a mask addition unit adding a mask noise value to the gradation value of the target pixel when the gradation value of the target pixel is equal to the specific concentration before quantization, wherein the mask noise value is determined according to a position of the target pixel; and
- a quantization unit performing the quantization through the error diffusion process by using the threshold value and the gradation value of the target pixel to which the mask noise value is added.

2. The image forming device according to claim 1 wherein the mask addition unit comprises a memory that stores a plurality of masks each in a matrix formation, one of the plurality of masks, stored in the memory, being selected and accessed when the mask noise value is added.

3. The image forming device according to claim 1 wherein the mask addition unit includes a memory that stores a mask in a matrix formation, the memory being accessed when the mask noise value is added.

4. The image forming device according to claim 3 wherein the matrix mask stored in the memory of the operation unit has a two's exponential size.

5. The image forming device according to claim 3 wherein the quantization unit is provided to output one of four quantization output values including 0 for a blank dot, 85 for a small dot, 170 for a middle dot, and 255 for a large dot, and the mask stored in the memory of the operation unit has a 16×16 size, and the operation unit is provided to assign two blank dots and two middle dots for the quantization output value 75 and assign two small dots and two large dots for the quantization output value 170.

6. An image forming method in which each pixel of an M-level gradation input image is quantized into one of N levels (M>N≧2) through an error diffusion process, comprising the steps of:
- determining a threshold value according to a gradation value of a target pixel of the M-level gradation input image before quantization;
- determining whether the gradation value of the target pixel is equal to a specific concentration which indicates one of the N levels after quantization;
- determining, before quantization, a mask noise value according to a position of the target pixel and adding the determined mask noise value to the gradation value of the target pixel when the gradation value of the target pixel is equal to the specific concentration; and
- performing the quantization through the error diffusion process by using the threshold value and the gradation value of the target pixel to which the mask noise value is added.

7. A computer-readable storage medium storing a computer program embodied therein for causing a computer to execute an image forming method in which each pixel of an M-level gradation input image is quantized into one of N levels (M>N≧2) through an error diffusion process, the method comprising the steps of:
- determining a threshold value according to a gradation value of a target pixel of the M-level gradation input image before quantization;
- determining whether the gradation value of the target pixel is equal to a specific concentration which indicates one of the N levels after quantization;
- determining, before quantization, a mask noise value according to a position of the target pixel and adding the determined mask noise value to the gradation value of the target pixel when the gradation value of the target pixel is equal to the specific concentration; and
- performing the quantization through the error diffusion process by using the threshold value and the gradation value of the target pixel to which the mask noise value is added.

* * * * *